(12) United States Patent
Dhonde

(10) Patent No.: US 11,386,388 B2
(45) Date of Patent: Jul. 12, 2022

(54) SYSTEM, METHOD, AND COMPUTER PROGRAM FOR ONLINE TRANSPORT LOGISTICS SERVICE MANAGEMENT

(71) Applicant: Anil Tukaram Dhonde, Mountain View, CA (US)

(72) Inventor: Anil Tukaram Dhonde, Mountain View, CA (US)

(73) Assignee: Kokeroo Holdings B.V., Utrecht (NL)

( * ) Notice: Subject to any disclaimer, the term of this patent is extended or adjusted under 35 U.S.C. 154(b) by 133 days.

(21) Appl. No.: 16/755,025

(22) PCT Filed: Oct. 10, 2018

(86) PCT No.: PCT/CA2018/051278
§ 371 (c)(1),
(2) Date: Apr. 9, 2020

(87) PCT Pub. No.: WO2019/071347
PCT Pub. Date: Apr. 18, 2019

(65) Prior Publication Data
US 2020/0349510 A1    Nov. 5, 2020

(30) Foreign Application Priority Data
Oct. 10, 2017 (CA) .................................. CA 2982228

(51) Int. Cl.
*G06Q 10/00* (2012.01)
*G06Q 10/08* (2012.01)
(Continued)

(52) U.S. Cl.
CPC ... *G06Q 10/08355* (2013.01); *G06K 7/10366* (2013.01); *G06K 7/1413* (2013.01); *G06K 7/1417* (2013.01); *G06K 19/06028* (2013.01); *G06K 19/06037* (2013.01); *G06K 19/0723* (2013.01); *G06N 5/04* (2013.01); *G06N 20/00* (2019.01); *G06Q 10/047* (2013.01); *G06Q 10/06312* (2013.01); *G06Q 10/0833* (2013.01); *G06Q 10/0838* (2013.01); *G06Q 10/08345* (2013.01); *G06Q 10/107* (2013.01); *G06Q 20/027* (2013.01); *G06Q 20/14* (2013.01); *G06Q 30/04* (2013.01); *H04L 63/08* (2013.01); *H04L 67/10* (2013.01); *G01S 19/42* (2013.01)

(58) Field of Classification Search
CPC .. G06Q 10/08355; G06Q 10/087; G06N 7/06; G06K 19/0723
USPC ........................................................ 705/7.22
See application file for complete search history.

(56) References Cited

U.S. PATENT DOCUMENTS 9,134,426 B1 *   9/2015   Siris .................... G06N 5/04
10,936,992 B1 *  3/2021   Rusnak ................ G06Q 50/30
(Continued)

*Primary Examiner* — Ahshik Kim
(74) *Attorney, Agent, or Firm* — Ellenoff Grossman & Schole LLP; James M. Smedley; Alex Korona

(57) ABSTRACT

There is provided a system, method, and computer program for providing online transport logistics management for separate entities (e.g., car owners, office renters, homeowners) to their smartphone devices, facilitated by a simple front end that dynamically adjusts to various parameters, the adjustments being made seamlessly via an application server. The disclosed system, method, and computer program provide for these separate smartphone devices to be linked to others to automate the storing, delivery, and pick-up of goods and/or services.

20 Claims, 34 Drawing Sheets

(51) Int. Cl.
*G06N 20/00* (2019.01)
*G06K 7/10* (2006.01)
*G06K 7/14* (2006.01)
*G06K 19/06* (2006.01)
*G06K 19/07* (2006.01)
*G06N 5/04* (2006.01)
*G06Q 10/04* (2012.01)
*G06Q 10/06* (2012.01)
*G06Q 10/10* (2012.01)
*G06Q 20/02* (2012.01)
*G06Q 20/14* (2012.01)
*G06Q 30/04* (2012.01)
*H04L 9/40* (2022.01)
*H04L 67/10* (2022.01)
*G01S 19/42* (2010.01)

(56) References Cited

U.S. PATENT DOCUMENTS

| | | | | |
|---|---|---|---|---|
| 2013/0198060 A1* | 8/2013 | Whitehouse | ............ | G06Q 20/22 705/39 |
| 2015/0278758 A1* | 10/2015 | Kim | ................. | G06Q 10/0835 705/338 |
| 2016/0042320 A1* | 2/2016 | Dearing | .................... | B07C 3/00 705/338 |
| 2019/0362311 A1* | 11/2019 | Bolha | .............. | G06Q 10/08355 |

* cited by examiner

SYSTEM, METHOD, AND COMPUTER PROGRAM FOR ONLINE TRANSPORT LOGISTICS SERVICE MANAGEMENT

TECHNICAL FIELD

The following relates generally to online transport logistics service management, and more particularly, to the systems, methods, and computer programs for creating and managing an online network of private carriers and private transit hubs.

BACKGROUND

In the age of internal based e-commerce, the shipping costs of goods and packages over land is an expensive addition to the total cost of delivering a product or service.

The transportation of goods and packages over roads is being handled by freight and courier service companies like FedEx™ and UPS™ that have logistics networks of their own and of their partners, which include dedicated transport vehicles, warehousing, and service staff. E-commerce companies like Amazon™ use a mix of their own dedicated logistics network and companies like UPS™ to ship packages.

Since these companies handle the booking, transportation, handling, and warehousing of the goods all by themselves and through corporate partners, they have to maintain dedicated staff, a fleet of vehicles, corporate warehousing, and infrastructure for support and service. The cost of maintaining this dedicated corporate infrastructure and network is quite high and is eventually passed on to the customers as shipping and service charges.

Private citizen vehicles such as cars and pick-up trucks that ferry passengers over roads have a trunk with storage space that frequently goes unused during travel. Also, most cars carry fewer passengers than their seating capacity, hence providing additional space for carrying packages. The empty and otherwise unused space in these private vehicles, if put to use for carrying packages, comes at a fractional cost of extra fuel compared to a dedicated corporate transport vehicle used for the same.

Private citizen home garages, private shops, and commercial offices usually have extra space that goes unused. This space, that is otherwise unused, if put to use for storing packages while in transit, can come at a fractional cost compared to a dedicated corporate warehouse used to store goods while in transit.

There is a need for a logistics platform that can connect and put to use these private vehicle and private storage spaces to create an online transportation logistics network that can ship and warehouse packages at a lower cost than traditional freight or courier services offered by corporations.

SUMMARY

In an aspect, there is provided a system for transport logistics service management to communicate with a plurality of user devices for shipping of one or more packages, the system comprising at least one processing unit and a data storage, the at least one processing unit in communication with the data storage and configured to execute: a package routing module in communication with at least one of the user devices to: receive an origin transit node and a destination transit node for a subject package comprising one of the one or more packages; direct at least one of the user devices to the origin transit node to drop-off the subject package; using one or more artificial intelligence techniques, determine a route between the origin transit node and the destination transit node, the route comprising one or more intermediate transit nodes; for each step between the origin transit node, the one or more intermediate transit nodes, and the destination node, using the one or more artificial intelligence techniques, dynamically determining which of the user devices to ship the package for such step, the determination based on at least preferences associated with the respective user devices; and when the package arrives at the destination transit node, directing the respective user device to drop-off the package.

In another aspect, there is provided a system for transport logistics service management, the system comprising at least one processing unit and a data storage, the at least one processing unit in communication with the data storage and configured to execute: a user module to communicate with a plurality of user devices, the plurality of user devices comprising one or more shipper devices, one or more carrier devices, one or more transit hub devices, and one or more receiver devices; a web server module to communicate with the plurality of user devices via a network; a shipping module to communicate with the one or more shipper devices, and calculate shipment options; a carrier module to communicate with the one or more carrier devices, register trips, and check available packages to carry on the trips; a transit hub module to communicate with the one or more transit hub devices, register new transit hub devices, and check available packages that need storage; and a package routing module to: track packages in real time using tracking technology, the tracking technology comprising at least one of shipping label with barcode, QR code, IOT tracker, RFID tracker, GPS tracker, and smartphone GPS; process package data from shipping labels that are scanned by one or more of the plurality of user devices involved at each pick-up and drop-off point in a shipper query route leg, and update package data derived from the shipping labels in a database; periodically retrieve shipper query route legs that are due for pick-up or drop-off, and send pick-up and drop-off notifications to the plurality of user devices involved in each of the shipper query route legs; provide the plurality of user devices with real-time package positions, estimated pick-up and drop-off times, locations, and carrier information for package pick-up, drop-off, and handover; periodically check for deviation of every shipper query route leg from a previous known estimated time of pick-up and arrival, and notify the plurality of user devices associated with a shipper query route leg exhibiting deviation and subsequent shipper query route legs; periodically re-route one or more delayed shipper query route legs via one or more carrier devices or one or more transit hub devices based on rules, the rules comprising at least one of statistical methods, artificial neural networks, stochastic methods, and machine learning; update the plurality of user devices requiring updating by at least one of a smartphone app message, a voice call, an email, or a text message; periodically update and share GPS locations in real time on at least one of the plurality of user devices associated with a pick-up or drop-off for every shipper query route leg; coordinate pick-up and drop-off for every shipper query route leg for each one or more of the plurality of user devices involved in a pick-up or drop-off; predict and suggest one or more pick-up times and locations for the one or more shipper devices based on the rules; predict and suggest a drop-off time and location for the one or more receiver devices based on the rules; provide flexibility of pick-up in real time at a location of the one or more shipper devices using GPS technology; provide flexibility of drop-off in real-time at a location of the one or more receiver devices using GPS technology; dynamically compute a position of a transfer point in real time for at least two carrier devices involved in a carrier-to-carrier direct transfer or multi-way exchange based on real-time GPS tracking and the rules; and a billing/payments module to calculate shipping estimates and calculate payments due to the plurality of user devices.

In a particular case, the user module is further executable to: designate which of the plurality of user devices are shipper devices, carrier devices, transit hub devices, and receiver devices; and register new user devices, authenticate the new user devices, register the new user devices that got authenticated, store user device data in the database, and log in registered user devices.

In another case, the shipping module is further executable to: provide a shipping estimate by: obtaining package data from a user interface of a smartphone app of the one or more shipper devices; storing the package data in the database; obtaining one or more shipper query routes and associated shipper query route steps for each of the one or more shipper query routes from one or more network cloud mapping services; storing the one or more shipper query routes and the associated shipper query route steps in the database; and update the shipper query status by: periodically checking if all the associated shipper query route steps have an assigned carrier trip of a carrier device; periodically checking if one or more of the associated shipper query route steps that need storage at an end of one of the associated shipper query route steps have one or more assigned transit hub devices among the one or more transit hub devices; periodically updating a shipper status of every shipper query based on assigned carrier trips of carrier devices and the one or more assigned transit hub devices for each associated shipper query route step, and storing the shipper status in the database; and periodically, in communication with the carrier module, updating a carrier status of every carrier trip route of carrier devices that carries one or more associated carrier trip route steps of one of a plurality of booked shipper query routes for the shipper query of shipper devices, and storing the carrier status in the database.

In yet another case, the carrier module is further executable to: obtain upcoming carrier trip data from the one or more carrier devices, and store the upcoming carrier trip data in a database; obtain one or more carrier trip routes and associated carrier trip route steps for each carrier trip route of the one or more carrier devices from one or more network cloud mapping services, and store the one or more carrier trip routes and the associated carrier trip route steps in the database; find carrier trip routes for carrying shipper query route legs by: periodically checking if any of the associated carrier trip route steps of carrier devices can carry a shipper query route step by applying rules, the rules comprising at least one of statistical methods, artificial neural networks, stochastic methods, and machine learning; computing a shipper query route leg that consists of one or more consecutive shipper query route steps for a given shipper query route, that can be carried by one or more carrier trip route steps of a carrier device, and storing the shipper query route leg in the database; periodically computing shipper query route legs that can be carried on carrier trips of carrier devices, and storing the shipper query route legs in the database; periodically identifying one or more packages from different shipper query routes that can be carried on a carrier trip of a carrier device; dynamically compute, select, and update a most efficient carrier trip route among all the carrier trip routes of one or more carrier devices that are available, including newly available carrier trip routes of carrier devices, for all available shipper query route steps based on the rules; compute and coordinate a carrier-to-carrier direct transfer of a package from a first one or more carrier trip routes of carrier devices to a next one or more carrier trip routes of carrier devices without intermediate storage with a transit hub device; compute and coordinate a multi-way exchange of two or more packages between at least two of the one or more carrier trip routes of carrier devices without intermediate storage with a transit hub device; compute and communicate a carrier hold time for a shipper query route leg carried on a carrier trip route of a carrier device and availability of the carrier trip route of the carrier device; compute one or more shipper query legs that can be carried by the one or more carrier devices identified as a regular carrier within a zone of operation associated with the regular carrier; compute one or more shipper query route legs that can be carried by recurring carrier trips of one or more carrier devices; temporarily designate one of the one or more shipper devices as a carrier device for a first shipper query route leg of a package during drop-off with a carrier device or transit hub device; temporarily designate one of the one or more receiver devices as a carrier device for a last shipper query route leg of a package during pick-up from a carrier device or a transit hub device; provide one or more carrier devices with available shipper query route legs to carry on trips and an estimate for payment based on the rules; and proactively predict and suggest when the one or more carrier devices can be available for a carrier trip based on rules.

In yet another case, the transit hub module is further executable to: obtain new transit hub data from the user interface of the smartphone app of the one or more transit hub devices, and store the new transit hub data in the database; find transit hub devices for storage at the end of shipper query route legs by: periodically computing whether an end of every shipper query route leg needs storage with a transit hub device at least in part based on a next shipper query route leg; periodically checking availabilities of the one or more transit hub devices for a shipper query route leg that needs storage, and select a transit hub device among the one or more transit hub devices that are available by applying rules, the rules comprising at least one of statistical methods, artificial neural networks, stochastic methods, and machine learning; periodically updating a transit hub status for each of the one or more transit hub devices assigned to a shipper query route leg, and storing the transit hub status in the database; periodically compute a best position at a given time for the one or more transit hub devices identified as a mobile transit hub device within a zone of operation of the mobile transit hub device, based on the rules; and provide the user interface of the smartphone app of the one or more transit hub devices with incoming packages for storage and an estimate for payment based on the rules; and proactively predict and suggest when the one or more transit hub devices can be available for storage based on the rules.

In yet another case, the billing/payments module is further executable to: estimate a shipping charge for a shipper query of one or more shipper devices based on package details and rules; compute a payment for at least one of: the one or more carrier devices that has recorded successfully carrying one or more packages through one or more shipper query route legs assigned to the one or more carrier devices based on rules, the rules comprising at least one of statistical methods, artificial neural networks, stochastic methods, and machine learning; the one or more transit hub devices that have successfully stored and transferred one or more packages on an onward journey based on the rules; the one or more carrier devices based on bulk capacity offered on a carrier trip for carrying shipments; the one or more transit hub devices based on bulk capacity offered by the one or more transit hub devices for storing shipments; the one or more carrier devices identified as a regular carrier device based on a zone of operation of the regular carrier device; the one or more transit hub devices identified as a mobile transit hub device based on a zone of operation of the mobile transit hub device; the one or more receiver devices for carrying a package on a last shipper query route leg of the package; compute a concession to the one or more shipper devices for carrying a package on a first shipper query route leg of the package; dynamically compute shipping estimates for shipper queries of the one or more shipper devices based on supply and demand; dynamically compute payments of the one or more carrier devices and the one or more transit hub devices based on supply and demand; and communicate with the at least one payment gateway to receive payments from the plurality of user devices from which payment is due, send payments to the plurality of user devices to which payment is due, and store sensitive user information in communication with the at least one payment gateway.

In yet another case, the at least one payment gateway is further executable to: handle and store sensitive user information obtained from the one or more user devices; and process bills and payments for the plurality of user devices from and to which payment is due.

In yet another case, the carrier module is further executable to: give priority to eliminating need of storage at a transit hub device for the end of every shipper query route leg of a shipper device by: identifying a next one or more carrier devices in the carrier-to-carrier direct transfer of a package; identifying a next one or more carrier devices that has a possibility of carrier hold in the carrier-to-carrier direct transfer of a package; identify at least two carrier devices for the multi-way exchange of two or more packages.

In yet another case, the shipping module and the carrier module are further executable to: compute one or more routes, in communication with one or more network cloud mapping services, that are available for a shipper query of a shipper device or a carrier trip of a carrier device from origin to destination; compute route steps for a shipper query route of a shipper device or a carrier trip route of a carrier device, in communication with the one or more network cloud mapping services, based on route division, the route division comprising at least one of change in travel path, grid of squares on a map, travel distance, travel time, diversions, and rules, the rules comprising at least one of statistical methods, artificial neural networks, stochastic methods, and machine learning; and compute one or more route steps that can be common to the one or more shipper query routes of the one or more shipper devices or one or more carrier trip routes of the one or more carrier devices.

In yet another case, the shipping module is further executable to: obtain a selection of one of a plurality of booked shipper query routes from a user interface of a smartphone app of the one or more shipper devices; determine an original best route from the plurality of booked shipper query routes of one or more shipper devices based on rules, the rules comprising at least one of statistical methods, artificial neural networks, stochastic methods, and machine learning; periodically compute a better shipper query route for the shipper query of shipper devices, based at least in part on newly available carrier trip routes of carrier devices, newly available transit hubs of transit hub devices, shipper query routes of shipper devices, and the rules; provide from the one or more shipper devices an estimate and a discount for a recurring shipment query based on the rules; provide the one or more shipper devices with a selection of shipper query routes and an estimate for payment; provide flexibility of pick-up in real time at a location of the one or more shipper devices using GPS technology in communication with the package routing module; and proactively predict and suggest one or more pick-up times and locations for the one or more shipper devices, in communication with the package routing module, based on rules.

In another aspect, there is provided a method for transport logistics service management comprising: communicating via a user module with a plurality of user devices, the plurality of user devices comprising one or more shipper devices, one or more carrier devices, one or more transit hub devices, and one or more receiver devices; communicating via a web server module with the plurality of user devices via a network; communicate via a shipping module with the one or more shipper devices, and calculate shipment options; communicating via a carrier module with the one or more carrier devices, register trips, and check available packages to carry on the trips; communicating via a transit hub module with the one or more transit hub devices, register new transit hub devices, and check available packages that need storage; and operating a package routing module to: track packages in real time using tracking technology, the tracking technology comprising at least one of shipping label with barcode, QR code, IOT tracker, RFID tracker, GPS tracker, and smartphone GPS; process package data from shipping labels that are scanned by one or more of the plurality of user devices involved at each pick-up and drop-off point in a shipper query route leg, and update package data derived from the shipping labels in a database; periodically retrieve shipper query route legs that are due for pick-up or drop-off, and send pick-up and drop-off notifications to the plurality of user devices involved in each of the shipper query route legs; provide the plurality of user devices with real-time package positions, estimated pick-up and drop-off times, locations, and carrier information for package pick-up, drop-off, and handover; periodically check for deviation of every shipper query route leg from a previous known estimated time of pick-up and arrival, and notify the plurality of user devices associated with a shipper query route leg exhibiting deviation and subsequent shipper query route legs; periodically re-route one or more delayed shipper query route legs via one or more carrier devices or one or more transit hub devices based on rules, the rules comprising at least one of statistical methods, artificial neural networks, stochastic methods, and machine learning; update the plurality of user devices requiring updating by at least one of a smartphone app message, a voice call, an email, or a text message; periodically update and share GPS locations in real time on at least one of the plurality of user devices associated with a pick-up or drop-off for every shipper query route leg; coordinate pick-up and drop-off for every shipper query route leg for each one or more of the plurality of user devices involved in a pick-up or drop-off; predict and suggest one or more pick-up times and locations for the one or more shipper devices based on the rules; predict and suggest a drop-off time and location for the one or more receiver devices based on the rules; provide flexibility of pick-up in real time at a location of the one or more shipper devices using GPS technology; provide flexibility of drop-off in real-time at a location of the one or more receiver devices using GPS technology; dynamically compute a position of a transfer point in real time for at least two carrier devices involved in a carrier-to-carrier direct transfer or multi-way exchange based on real-time GPS tracking and the rules; and calculating via a billing/payments module shipping estimates and calculate payments due to the plurality of user devices.

In a particular case, the method further comprises: designating which of the plurality of user devices are shipper devices, carrier devices, transit hub devices, and receiver devices; and registering new user devices, authenticating the new user devices, registering the new user devices that got authenticated, storing user device data in the database, and logging in registered user devices.

In another case, the method further comprises: providing a shipping estimate by: obtaining package data from a user interface of a smartphone app of the one or more shipper devices; storing the package data in the database; obtaining one or more shipper query routes and associated shipper query route steps for each of the one or more shipper query routes from one or more network cloud mapping services; storing the one or more shipper query routes and the associated shipper query route steps in the database; and updating the shipper query status by: periodically checking if all the associated shipper query route steps have an assigned carrier trip of a carrier device; periodically checking if one or more of the associated shipper query route steps that need storage at an end of one of the associated shipper query route steps have one or more assigned transit hub devices among the one or more transit hub devices; periodically updating a shipper status of every shipper query based on assigned carrier trips of carrier devices and the one or more assigned transit hub devices for each associated shipper query route step, and storing the shipper status in the database; and periodically, in communication with the carrier module, updating a carrier status of every carrier trip route of carrier devices that carries one or more associated carrier trip route steps of one of a plurality of booked shipper query routes for the shipper query of shipper devices, and storing the carrier status in the database.

In yet another case, the method further comprises: obtaining upcoming carrier trip data from the one or more carrier devices, and storing the upcoming carrier trip data in a database; obtaining one or more carrier trip routes and associated carrier trip route steps for each carrier trip route of the one or more carrier devices from one or more network cloud mapping services, and storing the one or more carrier trip routes and the associated carrier trip route steps in the database; finding carrier trip routes for carrying shipper query route legs by: periodically checking if any of the associated carrier trip route steps of carrier devices can carry a shipper query route step by applying rules, the rules comprising at least one of statistical methods, artificial neural networks, stochastic methods, and machine learning; computing a shipper query route leg that consists of one or more consecutive shipper query route steps for a given shipper query route, that can be carried by one or more carrier trip route steps of a carrier device, and storing the shipper query route leg in the database; periodically computing shipper query route legs that can be carried on carrier trips of carrier devices, and storing the shipper query route legs in the database; periodically identifying one or more packages from different shipper query routes that can be carried on a carrier trip of a carrier device; dynamically computing, selecting, and updating a most efficient carrier trip route among all the carrier trip routes of one or more carrier devices that are available, including newly available carrier trip routes of carrier devices, for all available shipper query route steps based on the rules; computing and coordinating a carrier-to-carrier direct transfer of a package from a first one or more carrier trip routes of carrier devices to a next one or more carrier trip routes of carrier devices without intermediate storage with a transit hub device; computing and coordinating a multi-way exchange of two or more packages between at least two of the one or more carrier trip routes of carrier devices without intermediate storage with a transit hub device; computing and communicating a carrier hold time for a shipper query route leg carried on a carrier trip route of a carrier device and availability of the carrier trip route of the carrier device; computing one or more shipper query legs that can be carried by the one or more carrier devices identified as a regular carrier within a zone of operation associated with the regular carrier; computing one or more shipper query route legs that can be carried by recurring carrier trips of one or more carrier devices; temporarily designating one of the one or more shipper devices as a carrier device for a first shipper query route leg of a package during drop-off with a carrier device or transit hub device; temporarily designating one of the one or more receiver devices as a carrier device for a last shipper query route leg of a package during pick-up from a carrier device or a transit hub device; providing one or more carrier devices with available shipper query route legs to carry on trips and an estimate for payment based on the rules; and proactively predicting and suggesting when the one or more carrier devices can be available for a carrier trip based on the rules.

In yet another case, the method further comprises: obtaining new transit hub data from the user interface of the smartphone app of the one or more transit hub devices, and storing the new transit hub data in the database; finding transit hub devices for storage at the end of shipper query route legs by: periodically computing whether an end of every shipper query route leg needs storage with a transit hub device at least in part based on a next shipper query route leg; periodically checking availabilities of the one or more transit hub devices for a shipper query route leg that needs storage, and select a transit hub device among the one or more transit hub devices that are available by applying rules, the rules comprising at least one of statistical methods, artificial neural networks, stochastic methods, and machine learning; periodically updating a transit hub status for each of the one or more transit hub devices assigned to a shipper query route leg, and storing the transit hub status in the database; periodically computing a best position at a given time for the one or more transit hub devices identified as a mobile transit hub device within a zone of operation of the mobile transit hub device, based on the rules; and providing the user interface of the smartphone app of the one or more transit hub devices with incoming packages for storage and an estimate for payment based on the rules; and proactively predicting and suggesting when the one or more transit hub devices can be available for storage based on the rules.

In yet another case, the method further comprises: estimating a shipping charge for a shipper query of one or more shipper devices based on package details and rules; computing a payment for at least one of: the one or more carrier devices that has recorded successfully carrying one or more packages through one or more shipper query route legs assigned to the one or more carrier devices based on rules, the rules comprising at least one of statistical methods, artificial neural networks, stochastic methods, and machine learning; the one or more transit hub devices that have successfully stored and transferred one or more packages on an onward journey based on the rules; the one or more carrier devices based on bulk capacity offered on a carrier trip for carrying shipments; the one or more transit hub devices based on bulk capacity offered by the one or more transit hub devices for storing shipments; the one or more carrier devices identified as a regular carrier device based on a zone of operation of the regular carrier device; the one or more transit hub devices identified as a mobile transit hub device based on a zone of operation of the mobile transit hub device; the one or more receiver devices for carrying a package on a last shipper query route leg of the package; computing a concession to the one or more shipper devices for carrying a package on a first shipper query route leg of the package; dynamically computing shipping estimates for shipper queries of the one or more shipper devices based on supply and demand; dynamically computing payments of the one or more carrier devices and the one or more transit hub devices based on supply and demand; and communicating with the at least one payment gateway to receive payments from the plurality of user devices from which payment is due, sending payments to the plurality of user devices to which payment is due, and storing sensitive user information in communication with the at least one payment gateway.

In yet another case, the method further comprises: handling and storing sensitive user information obtained from the one or more user devices; and processing bills and payments for the plurality of user devices from and to which payment is due.

In yet another case, the method further comprises: giving priority to eliminating need of storage at a transit hub device for the end of every shipper query route leg of a shipper device by: identifying a next one or more carrier devices in the carrier-to-carrier direct transfer of a package; identifying a next one or more carrier devices that has a possibility of carrier hold in the carrier-to-carrier direct transfer of a package; identifying at least two carrier devices for the multi-way exchange of two or more packages.

In yet another case, the method further comprises: computing one or more routes, in communication with one or more network cloud mapping services, that are available for a shipper query of a shipper device or a carrier trip of a carrier device from origin to destination; computing route steps for a shipper query route of a shipper device or a carrier trip route of a carrier device, in communication with the one or more network cloud mapping services, based on route division, the route division comprising at least one of change in travel path, grid of squares on a map, travel distance, travel time, diversions, and rules, the rules comprising at least one of statistical methods, artificial neural networks, stochastic methods, and machine learning; and computing one or more route steps that can be common to the one or more shipper query routes of the one or more shipper devices or one or more carrier trip routes of the one or more carrier devices.

In yet another case, the method further comprises: obtaining a selection of one of a plurality of booked shipper query routes from a user interface of a smartphone app of the one or more shipper devices; determining an original best route from the plurality of booked shipper query routes of one or more shipper devices based on rules, the rules comprising at least one of statistical methods, artificial neural networks, stochastic methods, and machine learning; periodically computing a better shipper query route for the shipper query of shipper devices, based at least in part on newly available carrier trip routes of carrier devices, newly available transit hubs of transit hub devices, shipper query routes of shipper devices, and the rules; providing from the one or more shipper devices an estimate and a discount for a recurring shipment query based on the rules; providing the one or more shipper devices with a selection of shipper query routes and an estimate for payment; providing flexibility of pick-up in real time at a location of the one or more shipper devices using GPS technology in communication with the package routing module; and proactively predicting and suggesting one or more pick-up times and locations for the one or more shipper devices, in communication with the package routing module, based on rules.

BRIEF DESCRIPTION OF THE DRAWINGS

A greater understanding of the embodiments will be had with reference to the figures, in which.

DETAILED DESCRIPTION

Figure 1:
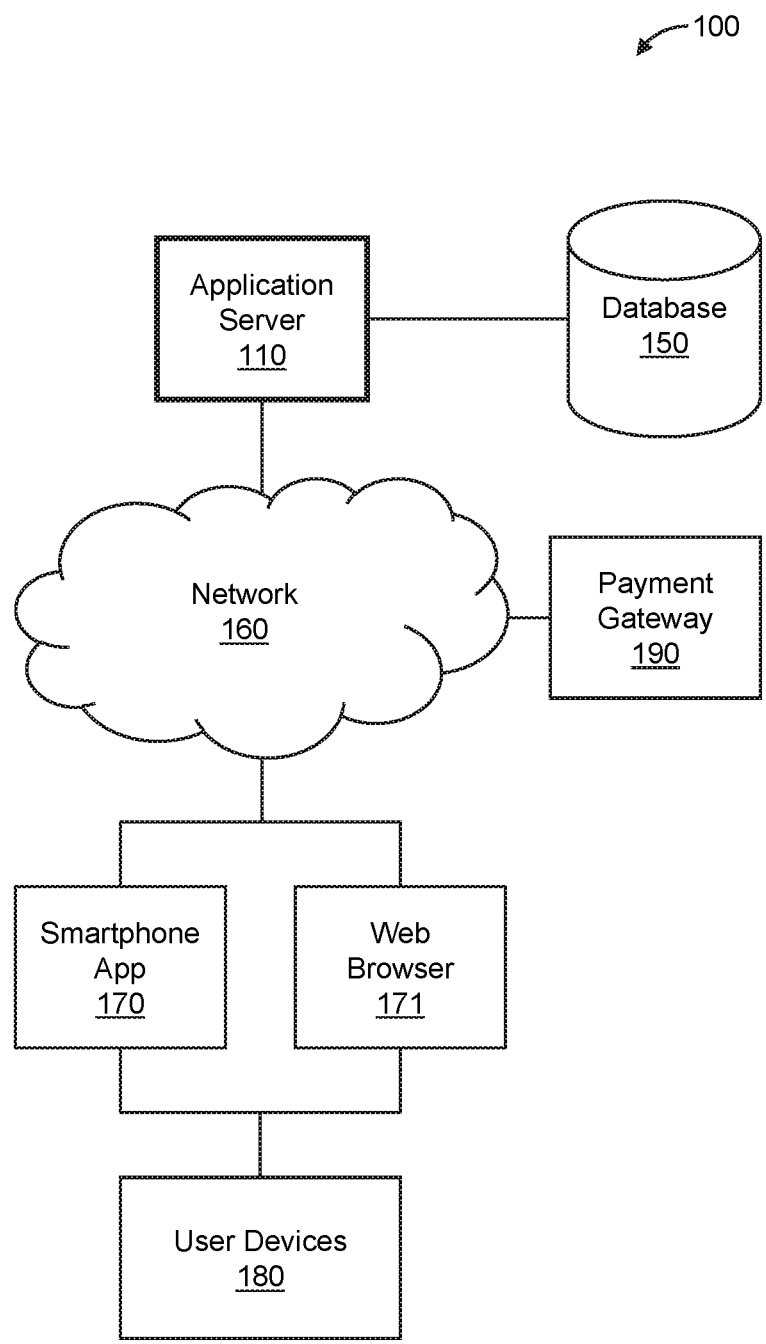
FIG. 1 illustrates a block diagram of a system for transport logistics service management, according to an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

Peer-to-peer shipping solutions are generally inadequate for use as a model for managing shipping over an online private network for many reasons, including limitations of the "gig economy" methodology (where the "gig economy" is an environment in which temporary positions are common and organizations contract with independent workers for short-term engagements) and one-trip shipping.

In the "gig economy" methodology, a package is carried by a single private citizen from pick-up to drop-off. This is limiting because package pick-up and drop-off locations are often not close to the single route taken by the private citizen. There are typically longer wait times at pick-up and drop-off points, referred to herein as a transit node, for a single carrier, without the availability of storage or another carrier who could pick-up or drop-off at a time closer to that desired by the shipper or receiver. Long-distance shipments are difficult because of large diversions from the carrier's planned trip.

The "gig economy" solutions follow a direct selection, approval and negotiation between the shipper and carrier without the peer-to-peer solution itself playing a part. This is a difficult process for the shipper and carrier because they have little knowledge of whether they are paying or receiving a fair price for the shipment or service. This methodology also passes over some aspects of safety and security to the shipper and carrier.

A shipper generally commits to a single carrier for one trip, and hence there is no room to find an alternative carrier to accommodate for events like traffic delays, weather conditions, or carrier trip cancellation, missed deliveries, unavailability of a person at the pick-up or drop-off point. With a single carrier, the shipping solution is limited in terms of allowing a carrier to carry multiple packages because all packages have to be picked up and dropped off along one trip.

Embodiments described herein generally provide technological solutions to the aforementioned technical problems. The technical challenges of using a computer or network to overcome or mitigate the above inadequacies include those related to operating a network-enabled application server that communicates dynamically updated locations and routes of unrelated shippers, carriers, and transit hubs (collectively, "users") in real time to their smartphones (or other online devices). The technical challenges are discussed in more detail below.

Creating an efficient shipping network out of private citizen resources poses a significant technical challenge of using a computer software service to bring together car owners, corner stores, home garages, etc. This challenge can otherwise be described as how to take a "sharing" economy approach to the shipping logistics world. In an exemplary embodiment, a technological solution can be a transport logistics service management system that (1) creates an ecosystem of shared resources from carriers and transit hubs via a smartphone app connected in real time with shippers, receivers, and each other; (2) divides package routes into route steps and then computes route legs in real time to be carried and stored by private citizens; (3) prioritizes direct transfer and multi-way exchange of packages between carriers; (4) connects user devices in real time so that there is little to no wait time during transit hops.

Competition with ultra-precision shipping networks of delivery companies such as FedEx™ and UPS™ poses the technical problem of using a network-connected, real-time, dynamic logistics management system to create an equal or surpassing logistics network of unrelated shippers, carriers, and transit hubs (e.g., without employing a dedicated fleet of vehicles, warehouses, and service staff). In an exemplary embodiment, a technological solution to the above problem can be the transport logistics service management system that (1) finds best matching carriers routes for shipper routes by dividing routes into route steps; (2) keeps iterating to look for available/new carriers on the system; (3) provides carriers with multiple package pick-ups to make their trip more efficient; (4) provides carriers with dynamic route updates to allow them to take advantage of new carriers on the system; (5) keeps iterating to look for available/new transit hubs; (6) provides carriers with dynamic route updates to allow them to offload packages at new transit hubs so that other carriers can more efficiently deliver the package.

The package route is most efficiently handled by letting carriers transfer one or more packages between each other without the need of storage at a transit hub. This poses a technological challenge of coordinating carrier-to-carrier transfers. Embodiments of the transport logistics service management system can provide a technological solution that (1) computes the best transfer point in real time between two or more carrier routes; (2) prioritizes carrier-to-carrier direct transfers and multi-way exchanges between carriers over the need of storage; (3) computes carrier hold to avoid storage and handling; (4) computes package route legs in real time for regular carriers and recurring carrier trips.

The shippers and receiver might benefit by carrying a package through its first or last leg. This poses a challenge of including the shipper and receiver as potential carriers in the package routing. In an exemplary embodiment, the transport logistics service management system can provide a technological solution to the above problem that (1) temporarily designates devices of shippers and receivers as carrier devices; (2) computes package route legs in the zone of operation of shipper and receivers; (3) compensates the shippers and receivers for carrying packages; (4) enriches the ecosystem of carriers by letting shippers and receivers be designated as carriers.

A private carrier or mobile storage can regularly operate within a zone of operation, say 9 am to 5 pm within a distance of 20 miles. Incorporating such a regular carrier and mobile storage in a logistics network is a technological challenge. In view of this challenge, in an embodiment, the transport logistics service management system can provide a technological solution that (1) computes package route legs that can be efficiently carried within the zone of operation of regular carriers; (2) dynamically computes the positions of a mobile transit hub device to reduce diversion from carrier routes.

The shippers may select the best package route from among multiple available routes. Shipments, carrier trips, and storage sites might get cancelled due to a variety of reasons such as traffic conditions, unforeseen circumstances, emergencies, and weather. These challenges of dealing with dynamic situations is handled by the transport logistics service management system that searches, adjusts, and re-routes periodically based on evolving conditions.

In order to provide a superior shipping solutions, an embodiment of a transport logistics service management system is provided that can (1) reduce the cost of shipping by utilizing "shared" resources of private citizens; (2) reduce transit time and cost with carrier-to-carrier transfers without storage and hence eliminates handling times in corporate warehouses; (3) allow convenient pick-up/drop-off times decided by the shipper/receiver, compared to fixed, once-a-day pick-up/drop-off offered by delivery companies; (4) designate shipper/receiver devices as carrier devices for the first/last route leg, provides compensation for them, and potentially reduces package transit time as a result.

The need for adequate compensation to carriers and transit hubs poses the challenge of using a computer software service to provide for an efficient logistics network without loss of time and effort for private citizens. In an exemplary embodiment, the transport logistics service management system can provide a technological solution that (1) computes package route legs with limited diversion from carrier routes reducing cost to the carrier; (2) finds multiple packages to be carried on carrier trips and to be stored in transit hubs, increasing compensation; (3) prioritizes carrier hold, thereby reducing package handling at storages, and compensates for carrier hold; (4) allows and predicts flexible time of operation for carriers and transit hubs.

The social and environmental cause of reducing the energy footprint for shipping, including fossil fuels, the carbon footprint, and traffic congestion, is a major challenge posed to our times. Advantageously, embodiments described herein route packages with a fractional addition to fuel on journeys of carriers, selecting the least congested routes, shortest holds, or shortest storage times, and offering a mix of environmentally friendly routes such as bicycle or walking routes.

Corporate shipping networks become inefficient and expensive in semi-urban and rural regions due to a lower number of packages and longer distances. Here, the challenge is to "piggyback" on carriers and storage locations spread over a large region to create a cost-effective logistics network. In an exemplary embodiment, the transport logistics service management system can provide a technological solution that (1) lets carrier devices and transit hub devices from rural areas take part in the package routing; (2) "piggybacks" on regular carrier trips between urban and rural regions; (3) takes advantage of relatively cheaper rural storage by computing the closest transit hub devices to pick-up/drop-off points (referred to as transit nodes) of package route legs, and hence remains economical for low number of shipments; (4) divides an urban to rural package route into urban and rural route legs so that urban and rural carriers can carry the package on their independent trips.

The present disclosure provides systems, methods, and computer programs providing online transport logistics management for separate entities (e.g., car owners, office renters, homeowners) to their smartphone devices (or other online devices), facilitated by a simple front end that dynamically adjusts to various parameters, the adjustments being made seamlessly via an application server. In general, the disclosed systems, methods, and computer programs provide for these separate smartphone devices to be linked to others to automate the storing, delivery, and pick-up of goods and/or services. This provides real-time communication to these entities of the needs (sometimes static, sometimes changing) of the availability, cost, and performance of storing, delivering, and picking up goods and/or services. It will be appreciated that the disclosed systems, methods, and computer programs can equally be applied to transport logistics management for non-separate entities (e.g., those in a supplier-receiver relationship, those sharing logistics resources, etc.) and centrally controlled entities (e.g., a shipping company itself).

Referring now to FIG. 1, a system for transport logistics service management 100, in accordance with an embodiment, is shown. The system 100 generally comprises an application server 110 communicatively linked via a network 160 to a smartphone app 170 and a web browser 171. In some embodiments, the network 160 may be the Internet, an intranet, a local area network (LAN), a wide area network (WAN), a virtual private network (VPN), or other suitable network. The smartphone app 170 and the web browser 171 are generally used to connect user devices 180 to the system 100. The user devices 180 may be electronic devices such as smartphones, personal computers, tablet computers, computer servers, bots, or smart contracts. The application server 110 is communicatively linked to a database 150. The application server 110 is communicatively linked to a payment gateway 190 via the network 160.

Figure 2:
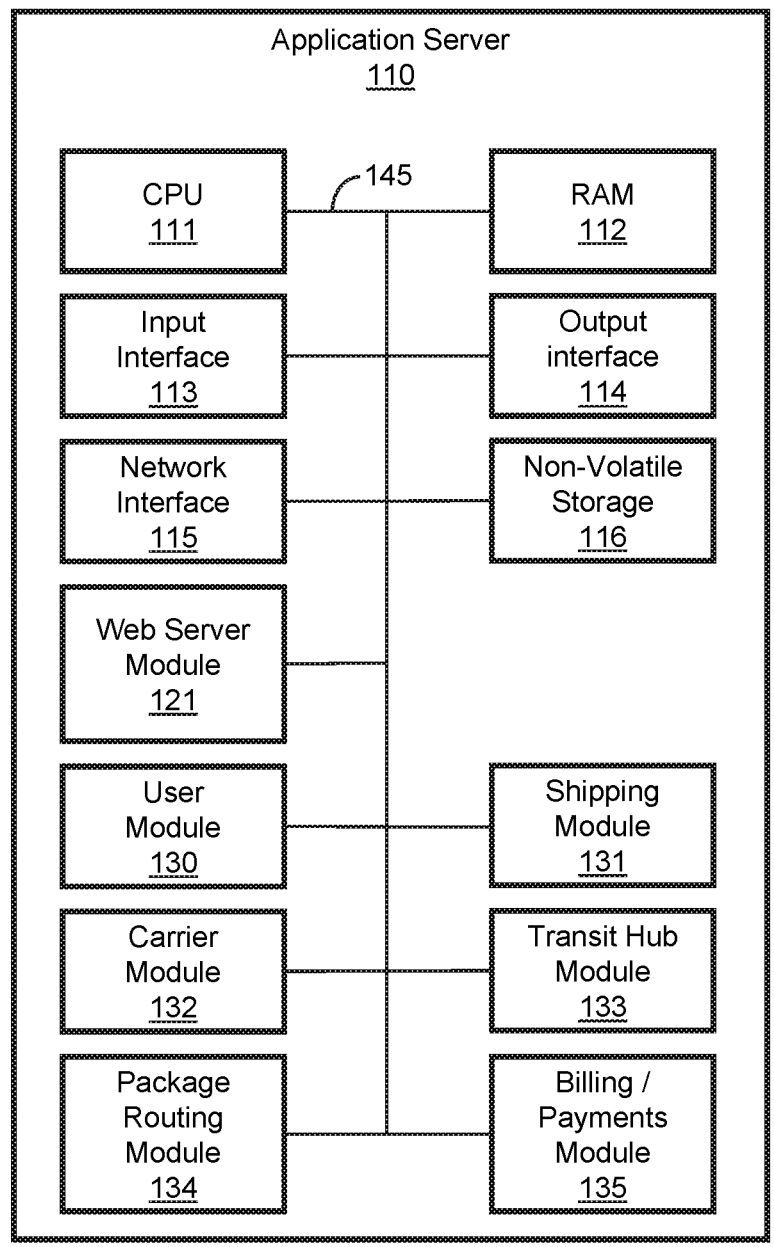
FIG. 2 illustrates a block diagram of an application server, according to an embodiment.

FIG. 2 shows various physical and logical components of an embodiment of application server 110. As shown, application server 110 has a number of physical and logical components, including a central processing unit ("CPU") 111 (comprising one or more processors), random access memory ("RAM") 112, an input interface 113, an output interface 114, a network interface 115, non-volatile storage 116, and a local bus 145 enabling CPU 111 to communicate with the other components. CPU 111 executes an operating system, and various modules, as described below in greater detail. RAM 112 provides relatively responsive volatile storage to CPU 111. Input interface 113 enables a user to provide input via an input device, such as a camera, microphone, button, keyboard, or touchscreen. Output interface 114 outputs information to output devices, such as a display and/or speakers. In some cases, input interface 113 and output interface 114 can be the same device (e.g., a touchscreen or tablet computer). Network interface 115 permits communication with other systems, such as the network 160 and servers remotely located from the application server 110, such as for a typical cloud-based storage model. Non-volatile storage 116 stores the operating system and programs, including computer-executable instructions for implementing the operating system and modules, as well as any data used by these services. Additional stored data, as described below, can be stored in the database 150. The database 150 may be local (e.g., accessible via the local bus 145). In other embodiments, the database 150 may be remote (e.g., accessible via the network interface 115). Data from the database 150 may be transferred to non-volatile storage 116 prior to or during operation of the application server 110. Similarly, data from non-volatile storage 116 may be transferred to the database 150. During operation of the application server 110, the operating system, the modules, and the related data may be retrieved from the non-volatile storage 116 and placed in RAM 112 to facilitate execution.

In some embodiments, the application server 110 further includes a web server module 121, a user module 130, a shipping module 131, a carrier module 132, a transit hub module 133, a package routing module 134, and/or a billing/payments module 135. The web server module 121 can provide connectivity to user devices 180 with the modules of application server 110 via the network 160. The user module 130 can provide registration and authentication to user devices 180 of the system 100 and manage the user devices 180. The shipping module 131 can provide estimation, billing, and tracking of packages to shipper devices 181. The carrier module 132 can provide carrier devices 182 with packages to deliver on trips and compute payments. The transit hub module 133 can provide transit hub devices 183 with packages for storage and compute payments. The package routing module 134 can provide package routes, tracking, and notifications. The billing/payments module 135 can provide billing to user devices 180 of the system 100 and process payments via the payment gateway 190. The payment gateway 190 may be one or more network-connected payment processing services or internal server based payment processing services.

Figure 3:
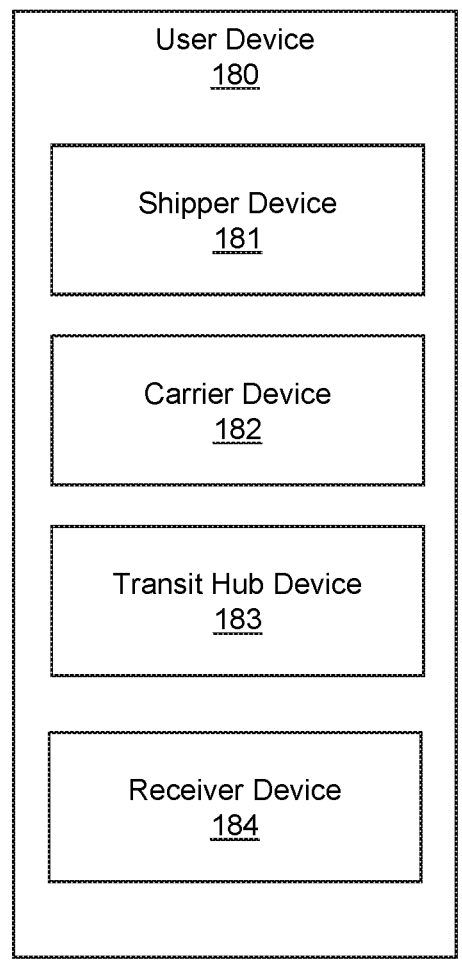
FIG. 3 illustrates a block diagram of user devices of the system, according to an embodiment.

FIG. 3 illustrates a block diagram of user devices 180 of the system 100, according to an embodiment. The user module 130 communicates with a plurality of user devices 180 comprising one or more shipper devices 181, one or more carrier devices 182, one or more transit hub devices 183, and one or more receiver devices 184. The user module 130 allows the plurality of user devices 180 to take on any one designation (e.g., just shipper device), two designations (e.g., both shipper device and carrier device), or three designations (e.g., shipper device, carrier device, and receiver device), or all four designations. The user devices 180 may communicate with the user module 130 of the application server 110 through a smartphone app 170 or a web browser 171. The inherent flexibility of the system 100 to take on any one or more of the four designations can lead to a scalable ecosystem of shipper devices 181, carrier devices 182, transit hub devices 183, and receiver devices 184.

Figure 4:
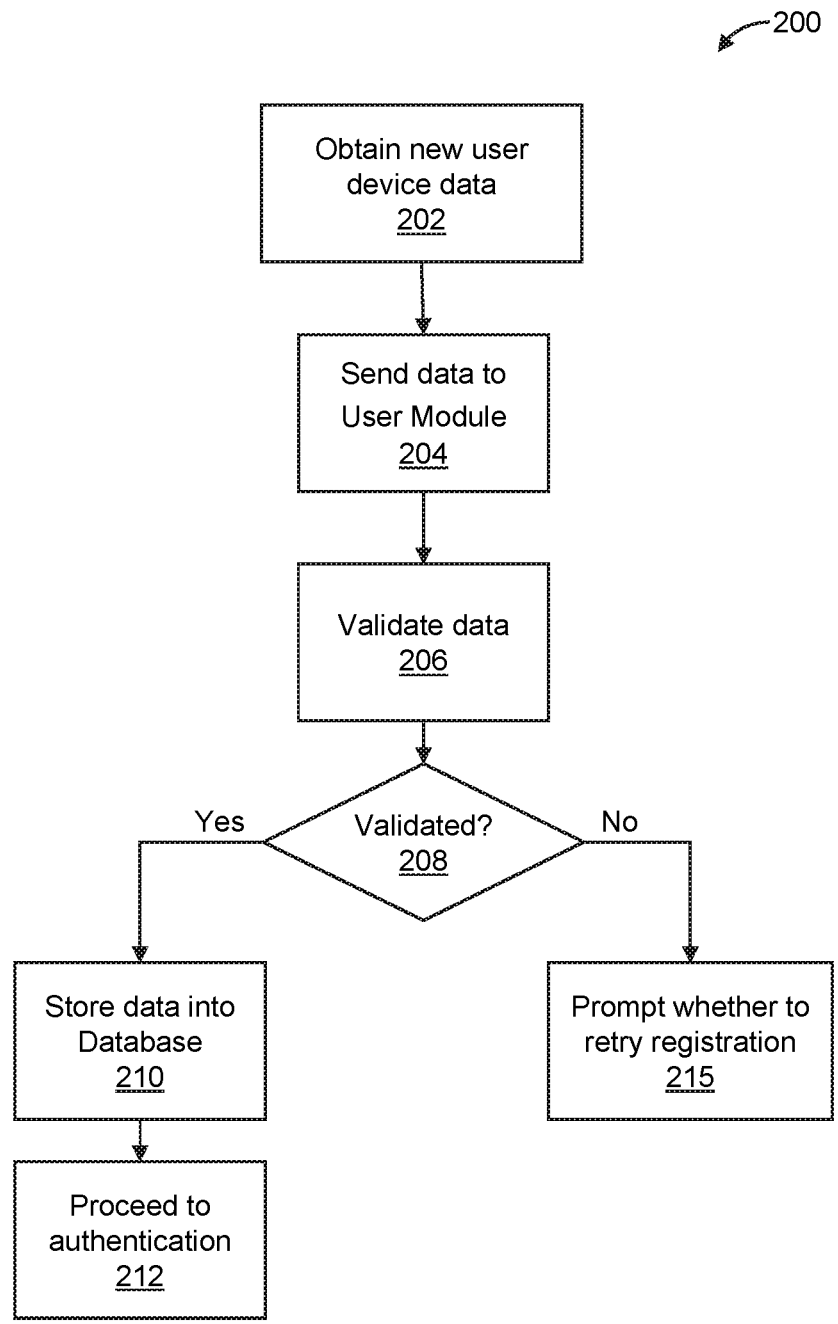
FIG. 4 illustrates a flow diagram of a method of registering new user devices, according to an embodiment.

FIG. 4 illustrates a flow diagram of a method of registering new user devices 200, according to an embodiment. The method 200 of the user module 130 registers new user devices 180 via the user interface of the smartphone app 170. The user interface of the smartphone app 170 obtains data (e.g., phone number, email address, login name, name, address, and password) from a potential new user device 180. The user interface of the smartphone app 170 sends this data (e.g., in the form of a JSON data set), over the network 160 to the web server module 121 (e.g., using a ReST API web service). At block 202, the web server module 121 obtains the new user device data from the smartphone app 170.

At block 204, the web server module 121 sends the data to the user module 130. At block 206, the user module validates the data. The user module 130 first checks whether the user device data (e.g., phone number, email address) is valid and then checks if the user device data (e.g., phone number, login name, email) is currently being used by another user device 180 of system 100. In an embodiment, the system 100 implementation restricts usage of a phone number, email address, or login name to one user device 180, though one user device 180 can have multiple accounts via multiple phone numbers, email addresses, and login names. At block 208, the method 200 may proceed in one of two ways. If the user device data does not pass validation, then proceed to block 215. At block 215, a failure (e.g., JSON formatted) message is sent to the user device 180 via the web server module 121. The smartphone app 170 prompts the user device 180 whether to attempt to retry registration of new user device afresh.

If the user device data passes validation, at block 210, the user module 130 proceeds to store the new user device data into the database 150. For example, the user module 130 communicates with the database 150 to create and execute a database query (such as one formatted in MySQL™) to store the new user device data in database 150. The user module 130 gets a new, unique id, "user.device.id", as a result. This user.device.id now becomes the permanent handle for this user device 180 for all future transactions.

At block 212, the user module 130 passes a success message to the smartphone app 170 via the web server module 121. The user device 180 is then guided to an authentication method 225 to ascertain that this is indeed the new user device's data (such as phone number, email address, or login name) as claimed.

Figure 5:
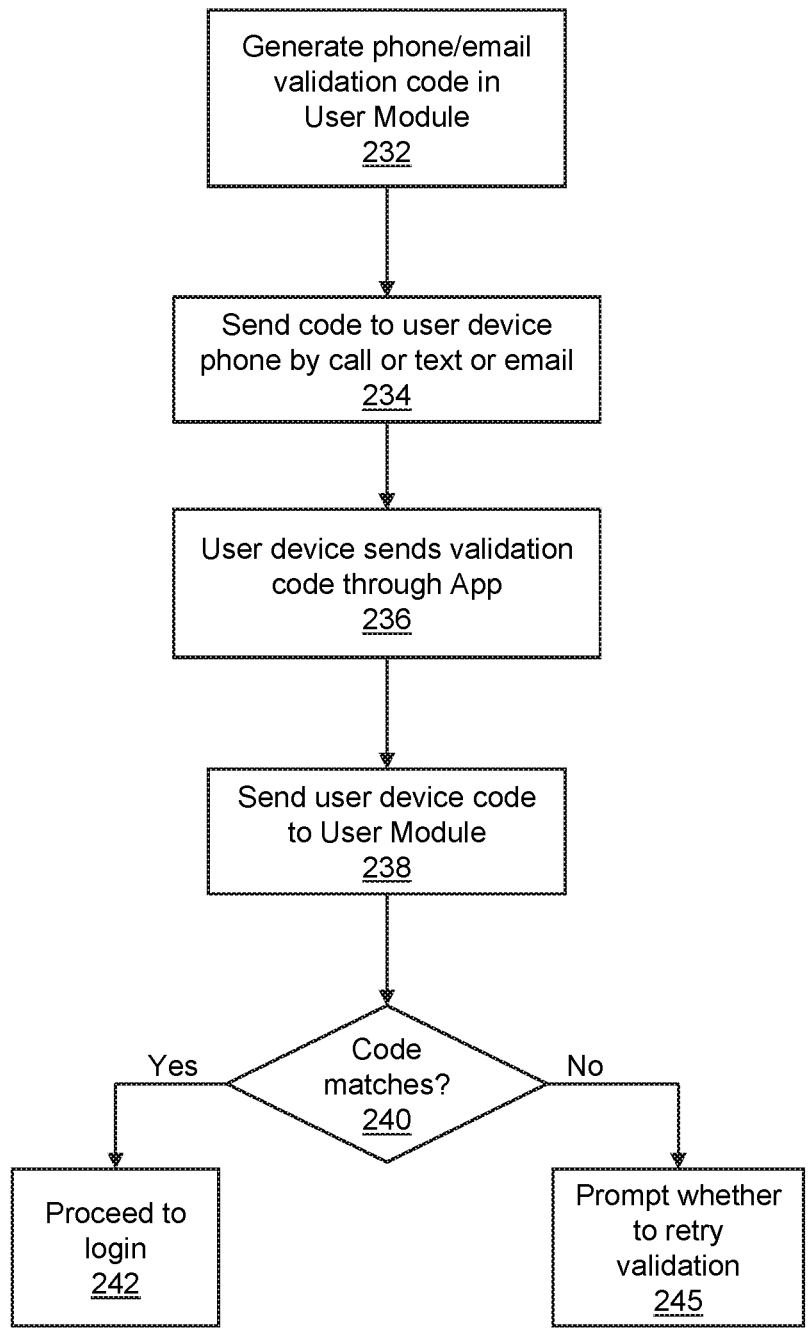
FIG. 5 illustrates a flow diagram of a method of authenticating new user devices, according to an embodiment.

FIG. 5 illustrates a flow diagram of a method of authenticating new user devices 225, according to an embodiment. At block 232, the user module 130 generates a temporary validation code (e.g., using a random number generator). At block 234, the user module 130 sends the validation code to the user device 180 (e.g., to its phone number, email address, or smartphone app) by a suitable message (e.g., audio message, text message, email message, smartphone app message) or a voice call. At block 236, the user interface of the smartphone app 170 prompts the user device 180 to send this validation code to the user module 130 for confirmation. At block 238, the user module 130 checks whether the generated code matches the code received from user device 180.

At block 240, the user module 130 may proceed in one of two ways. If the two codes do not match, then proceed to block 245. At block 245, a failure (e.g., JSON formatted) message is sent to the user device 180 via the web server module 121. The user interface of the smartphone app 170 prompts the user device 180 whether to attempt to retry authentication of a new user device.

If the two codes match, authentication of the newly registered user device is now complete. The data of the newly registered user device that got authenticated is stored in the database 150. At block 242, the user module 130 communicates with the user device 180 via the user interface of the smartphone app 170 to proceed to login.

Using method of registering new user device 200 and method of authenticating new user device 225, the user device's data and its smartphone device running the smartphone app 170 have now been registered and authenticated by the user module 130 for further use. The user device 180 can now login as a registered user device and begin taking on one or more designations as a shipper device 181, carrier device 182, transit hub device 183, and/or receiver device 184 in the system 100. Thus, the user module 130 registers new user devices, and may have one or more methods of authenticating new user devices.

Figure 6:
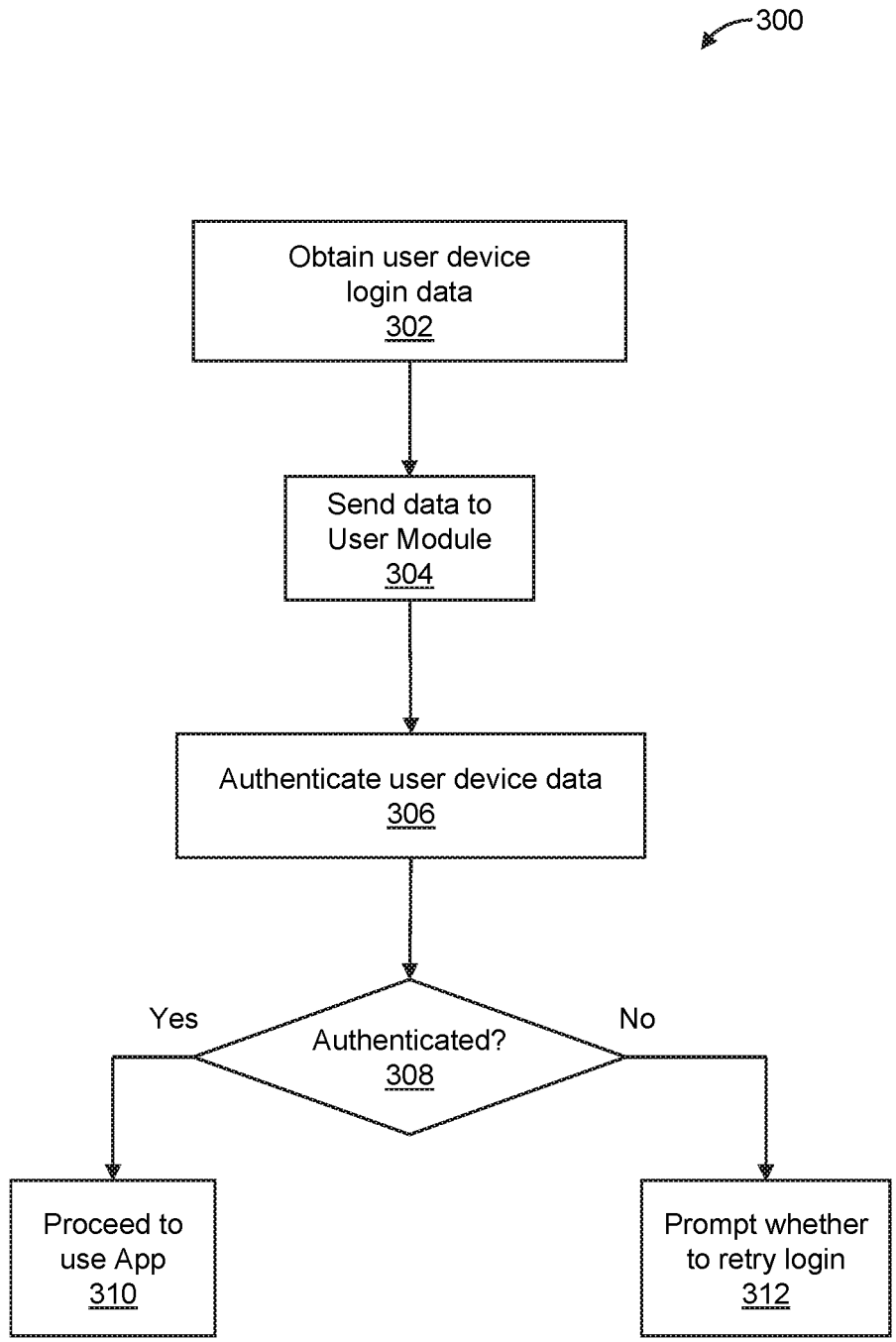
FIG. 6 illustrates a flow diagram of a method of logging in registered user devices, according to an embodiment.

FIG. 6 illustrates a flow diagram of a method of logging in registered user devices 300, according to an embodiment. The user interface of the smartphone app 170 guides an existing, registered user device 180 through the login method. At block 302, the user interface of the smartphone app 170 obtains data (e.g., phone number, email address, login name, password) from the registered user device 180.

The smartphone app 170 sends the data at block 304 over the network 160 to user module 130. The user module 130 authenticates user device data at block 306 by comparing against existing data stored in the database 150.

At block 308, the user module 130 may proceed in one of two ways. If the user device data fails authentication, then proceed to block 312. At block 312, a failure message (e.g., JSON formatted) is sent to the user device 180. The user interface of the smartphone app 170 prompts the user device 180 whether to attempt to retry login.

If the user device data passes authentication, then proceed to block 310. At block 310, the user module 130 communicates with the user device 180 via the user interface of the smartphone app 170 to proceed to using the smartphone app functions via its user interface.

According to an embodiment, the phone number, email, login name, name, and passcode of the user device 180 are used for login authentication. Technologies such as email, social media login name, fingerprint, or face recognition can be used for user authentication in various embodiments. Also, one or more stages of login methods can be used to authenticate user devices.

In an embodiment, a user device 180 may transmit and/or store sensitive user information such as phone number, email, login name, and passcode. It may become necessary to secure data (e.g., using SSL) during communication via the network 160 and upon handling and storage in application server 110 and the database 150.

Figure 7:
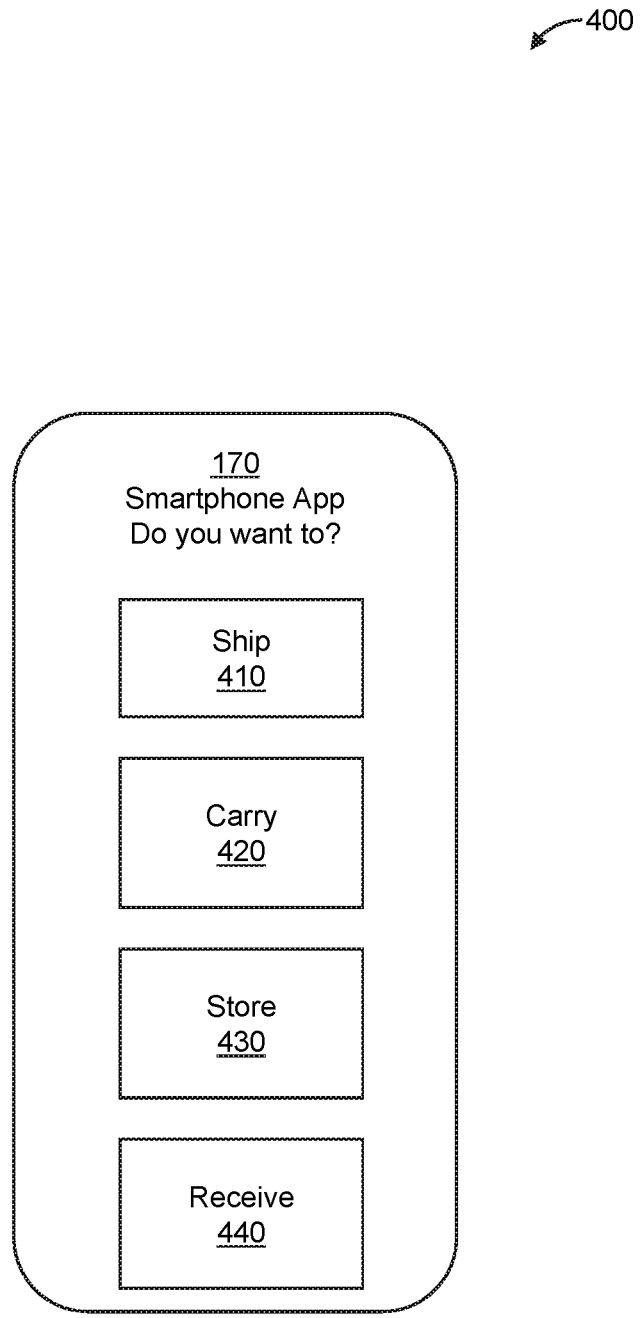
FIG. 7 illustrates an exemplary snapshot of a user device interface, according to an embodiment.

FIG. 7 illustrates an exemplary snapshot of a user interface 400 of the smartphone app 170. As illustrated in FIG. 3, user device 180 can be designated as a shipper device 181, carrier device 182, transit hub device 183, and/or receiver device 184. The user interface 400 allows a user device 180 to proceed to ship via block 410, carry via block 420, store via block 430, or receive via block 440. Based on the selection made by user device 180, the smartphone app 170 user interface guides the user device to take on one of the four designations.

Figure 8:
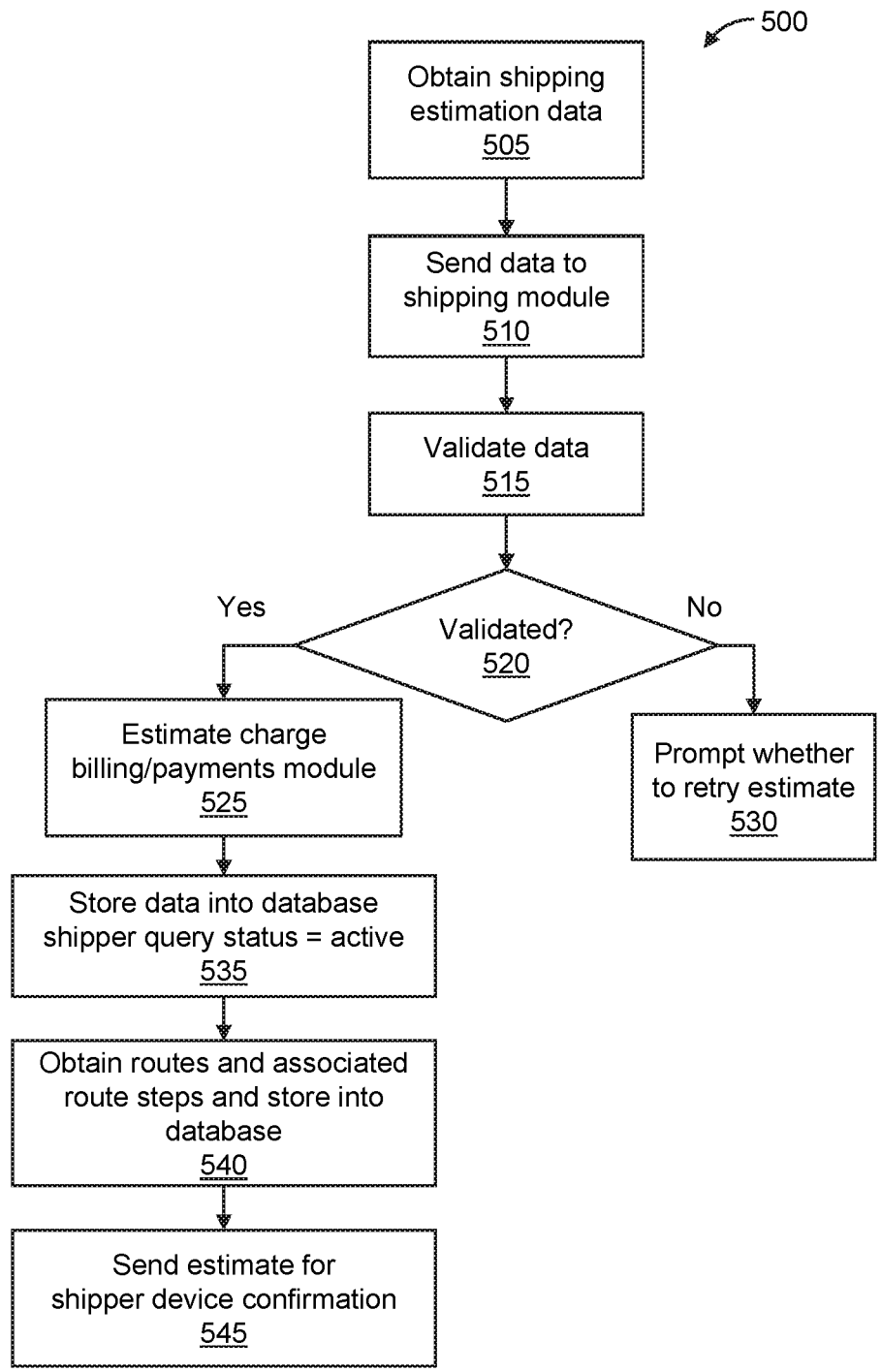
FIG. 8 illustrates a flow diagram of a method of shipping estimation, according to an embodiment.

FIG. 8 illustrates a flow diagram of a method of shipping estimation 500, according to an embodiment. In the method of shipping estimation 500, the shipping module 131 communicates with one or more shipper devices 181, calculates shipment options, and provides cost estimates for the shipment options. The user interface of the smartphone app 170 guides a user device 180 designated as a shipper device 181 through this shipment estimation. At block 505, the shipper device 181 sends package data (e.g., envelope or box, length, width, height, weight, value, fragility, pick-up address, pick-up time, drop-off address). At block 510, the shipping module 131 obtains package data from the shipper device 181 from the user interface of the smartphone app 170 and the web server module 121.

In an embodiment, the pick-up address of the shipper device 181 is assumed by the smartphone app 170 as its real-time GPS location. The carrier device 182 is informed in real time of where the shipper device 181 is currently located for pick-up. The carrier device route is dynamically calculated based on the shipper device's real-time location during pick-up. Advantageously, the shipper does not have to wait for the carrier to arrive. In some cases, conventional delivery services like FedEx™ offer a 2-hour pickup time window, e.g., 9 am-11 am. This may be inconvenient because the shipper cannot, for example, take his/her dog for a walk or drop off a toddler to daycare during that time window. The package routing module 134, in communication with the shipping module 131, provides flexibility of pick-up in real time at the shipper device's location using smartphone GPS technology. The real-time tracking of shipper device 181 via smartphone app 170 GPS update allows the shipping module 131 in communication with the package routing module 134 to offer flexibility of location and reduce wait time to zero.

In an embodiment, the package routing module 134, in communication with the shipping module 131, predicts and suggests one or more pick-up times and locations (at a transit node) for the shipper device 181 based on machine learning from the past; for example, the shipper device 181 will be at the office between 9 am to 12 pm tomorrow or will be home after 6:30 pm today. The prediction is done with rules based on, but not limited to, machine learning, artificial neural networks, stochastic methods, statistical methods. For example, the shipper device 181 is usually home around 6:30 pm on weekdays or at the office with no meetings between 9 am to 12 pm on Wednesday every week. This data can be sourced from the shipper device 181 by the smartphone app 170, then fed into and used for learning and training in a feed forward neural network. The neural network then predicts future schedule and location, and time of availability; use of this can be made for suggesting most the convenient pick-up location and time for the package.

In an embodiment, a prediction made above can be dynamic such that the pick-up location can change from office to a lunch eatery between 12 pm and 1 pm if the shipper device 181 GPS location changes from the previous prediction. The system 100 adjusts dynamically, in real time, based on the shipper device's 181 real-time location and time of convenience for pick-up.

In an embodiment, the drop-off location for a shipment can simply be a receiver device 184 as part of the package shipping data by the shipper device 181. The receiver device 184 being mobile, its real-time GPS location is tracked via smartphone app 170. Similar to the pick-up above, the receiver does not have to wait for a 2-hour window provided by a delivery company like FedEx™. The receiver can go about his/her life, say go to a soccer field. The carrier device 182 dropping off the package will be informed in real time of the GPS location and convenient drop-off time to the receiver device 184. The package routing module 134 provides flexibility of drop-off in real-time at the receiver device's location 184 using smartphone GPS technology.

In an embodiment, the system 100 via package routing module 134 predicts and suggests the one or more drop-off times and locations for the receiver device 184. The prediction is done with rules based on, but not limited to, artificial intelligence techniques such as machine learning, artificial neural networks, stochastic methods, and statistical methods. For example, the receiver device 184 usually heads to the soccer field around 6:30 pm on Tuesdays or is busy in meetings between 11 am to 2 pm on Wednesdays every week. Similar to above, the neural network, based on data sourced from the receiver device 184, predicts future schedule, location, and time of availability; it uses this to suggest one or more convenient pick-up locations (at a transit node) and times for package drop-off. This offers flexibility of location and reduces wait time to almost zero for the receiver device 184 compared to delivery services like FedEx™.

In an embodiment, a prediction made above can be dynamic such that the drop-off location can change, say from office to a restaurant between 6-7 pm, if the receiver device 184 GPS location changes from the previous prediction. The system 100 via its package routing module 134 adjusts dynamically, in real time, based on the receiver device's 184 real-time location and time of convenience for drop-off.

Such real-time tracking, mobility, convenience, flexibility, and zero wait-time for the shipper devices 181 and receiver devices 184 that is provided by system 100, is not possible via existing methods or delivery services.

At block 515, the shipping module 131 validates the package data. In an embodiment, package details such as the dimensions, weight, and value are checked against preset limits. At block 520, the shipping module 131 may proceed in one of two ways. If the data is not valid, then proceed to block 530. At block 530, a failure message is sent to the shipper device 181 via the smartphone app 170, prompting the user device 180 whether to retry shipping estimation.

If the data is valid, then proceed to block 525. At block 525, the shipping module 131 communicates with the billing/payments module 135 to calculate shipping estimates. In an embodiment, the billing/payments module 135 estimates a shipping charge for a shipper query of one or more shipper devices 181 based on package details and rules. The shipping module 131 provides an estimate for payment to the user interface of the smartphone app 170 of the one or more shipper devices 181.

In an embodiment, the billing/payments module 135 predicts volume of shipments for tomorrow, e.g. Wednesday, based on historical availability of carrier devices 182 on the first Wednesday of every month, between 3 pm to 4 pm for pick-up at the shipper device's 181 location. This criteria is applied to a feed forward neural network or a radial basis function neural network, and the output is used for the shipment estimate.

In an embodiment, based on a modular neural network, it is predicted that the current shipment will be most economical if picked up on Thursday instead of Friday, that too after 6 pm. One of the intermediary neural networks of the modular neural networks could operate on the shipper device's 181 location and predict that on Thursday the shipper device 181 would be closer to the area where another intermediary neural network has determined to have the most density of carrier devices 182 on Thursday after 6 pm. Hence, the shipper device 181 is offered a choice of an economical estimate on Thursday rather than a pricier Friday pick-up.

In an embodiment, a modular neural network, based on learning from carrier device 182 and transit hub device 183 location and availability data, has predicted that carrier devices 182 and transit hubs 183 are mostly available on weekends. This output of the modular neural network is used for offering lowered prices over the weekend to the shipper device 181 as an option.

In an embodiment, a feed forward neural network predicts that a particular address or real-time location of a shipper or receiver is a residential or commercial address based on the device's day and night time presence at that location or using one or more Internet-based search engines to retrieve information about that location. The output of the neural network can be used to provide a discount to the shipper/receiver device 181, based on late evening pick-up/drop-off availability at a residence rather than a commercial enterprise that would usually close after office hours.

In an embodiment, the billing/payments module 135 may dynamically compute shipping estimates for shipper queries of one or more shipper devices 181 based on supply and demand. This could be based on, but not limited to, number, size, weight, value, fragility of packages becoming available at a given time of operation or zone of operation, traffic/weather conditions, and/or unforeseen conditions. This could also be based on, but not limited to, stressed demand on carrier devices or transit hub devices due to increasing shipping queries or due to traffic/weather conditions. The system 100, and its modules, can use a modular neural network to predict the leanest hours of operation during the coming week based on availability of carrier devices and transit hub devices and hence offer economical pricing to the shipper device 181. The billing/payments module 135 may apply rules based on methods or models such as, but not limited to, statistical methods, artificial neural networks, stochastic methods, and machine learning.

The dynamism described above derived from intensive computing and predictability from artificial intelligence makes the system 100 most economical and flexible for its user devices 180. Also, this dynamism and predictability is not possible in existing delivery solutions because the availability of delivery fleet is fixed and limited to only during weekdays and daytime work hours (e.g., 9 am to 5 pm). This dynamism and predictability is possible in system 100, due to an ecosystem of carrier devices and transit hub devices, with their real-time location and availability tracking and predictability obtained via artificial intelligence.

In an embodiment, the package data may specify a "recurring" shipment query, say every day or Monday of every week. Handling such a recurring shipment can make the system 100 more efficient and cost effective for the shipper device 181. The shipping module 131 provides from the user interface of the smartphone app 170 of a shipper device 181 with an estimate and with a discount for a recurring shipment query based on rules.

At block 535, the shipping module 131 stores the package data into the database 150. The shipping module 130 gets a new, unique id, "shipper query.id", as a result. This shipper query.id now becomes the permanent handle for this shipper query for all future transactions. At block 540, with the pick-up and drop-off address (at transit nodes) as input, the shipping module 131 obtains one or more shipper query routes and associated shipper query route steps for each of the one or more shipper query routes from one or more network cloud mapping services and stores the one or more shipper query routes and the associated shipper query route steps in the database 150.

At block 545, the shipping module 131 sends the estimate to the shipper device 181 on its smartphone app 170 for confirmation (and payment, if applicable).

Figure 9:
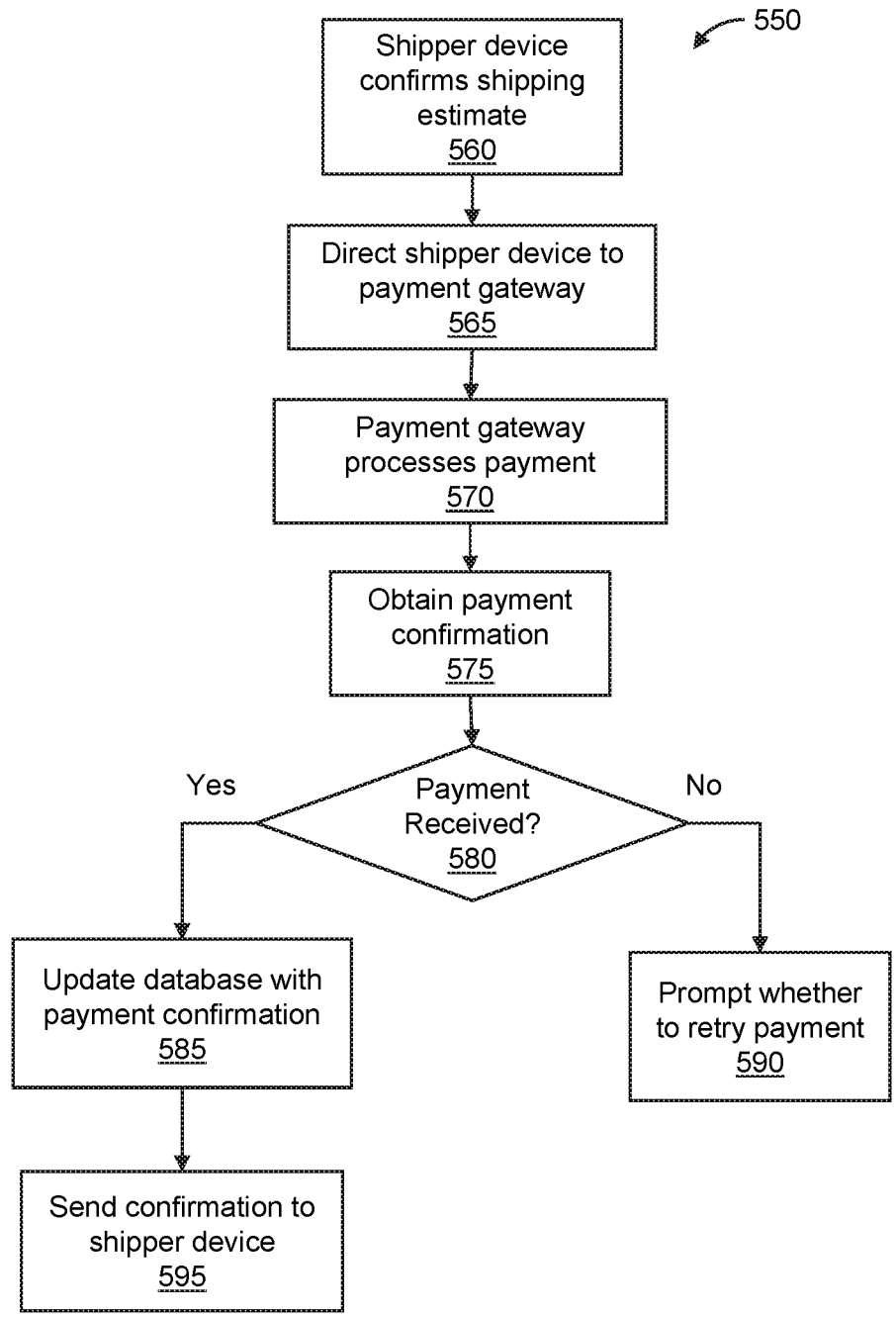
FIG. 9 illustrates a flow diagram of a method of shipping estimate confirmation and payment, according to an embodiment.

FIG. 9 illustrates a flow diagram of a method of shipping estimate confirmation and payment 550, according to an embodiment. At block 560, the smartphone app 170 guides the shipper device 181 to confirm the shipping estimate. At block 565, upon receiving confirmation, the shipping module 131 guides the shipper device 181 to the billing/payments module 135 that is in communication with one or more payment gateways 190. At block 560, the billing/payments module 135 uses the payment gateway 190 (which may be available as a network-based service) to obtain payments from the shipper device 181. At block 575, the shipping module 131 obtains payment confirmation from the payment gateway 190 via the billing/payments module 135.

In an embodiment, the payment gateway 190 may be one or more network-based payment servers or an internal server to the application server 110 that processes bills and payment for the plurality of user devices 180 of the system 100 from and to which payment is due. The payment gateway 190 handles and stores potentially sensitive user information obtained from one or more user devices 180 such as credit card information.

At block 580, the shipping module 131 may proceed in one of two ways. At block 590, if the payment confirmation is not received from the payment gateway 190 via the billing/payments module 135, the shipping module 131 will communicate with the smartphone app 170 to prompt the shipper device 181 whether to retry payment.

At block 585, if the payment has been successfully received, then the shipping module 131 updates database 150 with the payment confirmation and proceeds to block 595 to send confirmation of payment to the shipper device 181 via the smartphone app 170.

Figure 10:
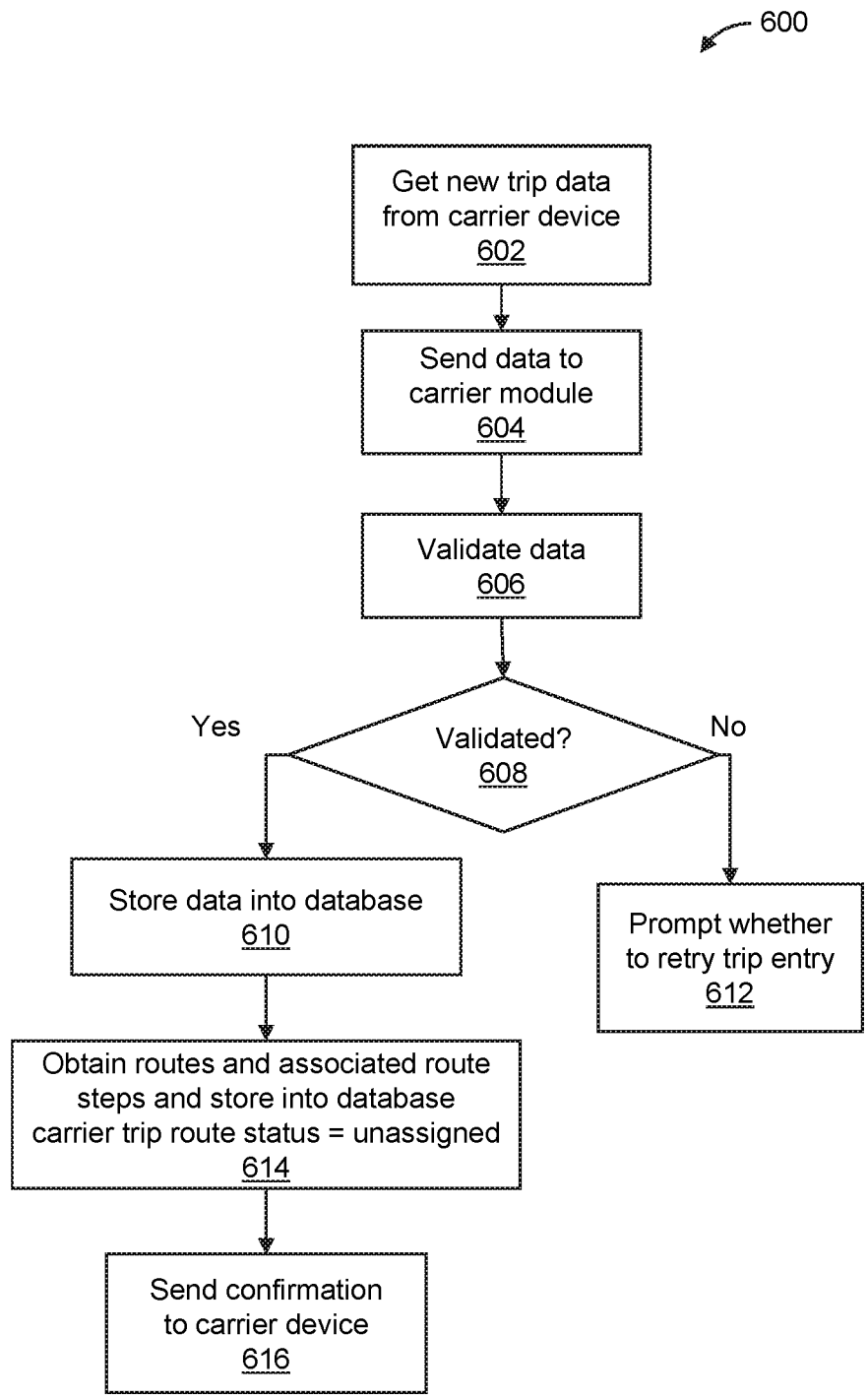
FIG. 10 illustrates a flow diagram of a method of new carrier trip registration, according to an embodiment.

FIG. 10 illustrates a flow diagram of a method of new carrier trip registration 600, according to an embodiment. The method of new carrier trip registration 600 of the carrier module 132 allows the user device 180 designated as a carrier device 182 to register an upcoming carrier trip.

The carrier device 182 can be, but not limited to, an electronic device such as a smartphone, personal computer, computer tablet, computer server, bot, or smart contract that can be carrier along a mode of travel including, but not limited, to driving a motorized vehicle (e.g., car or pick-up truck), walking, bicycling, snowmobiling, or transporting by ferry. The carrier trip routes and the associated carrier trip route steps for each carrier trip route are determined based on mode of travel input on the carrier device 182. The carrier device 182 provides available, safe, unused space during this mode of travel (i.e., capacity to carry packages during the carrier trip). The carrier device 182 makes one or more one-way, two-way, or multi-point trips once, multiple times, or on a regular basis. An embodiment may have a "regular" carrier device 182 with a "zone of operation".

At block 602, the carrier module 132 obtains upcoming carrier trip data from the user interface of the smartphone app 170 on the carrier device 182 via the smartphone app 170. The upcoming carrier trip data may include, but is not limited to, capacity in terms of length, width, height, weight, value, fragility, start address or current location, start time, end address, one/two way, multi-point, recurrence, zone of operation, etc. At block 604, the smartphone app 170 sends the upcoming carrier trip data to the carrier module 132 via the web server module 121. In an embodiment, the start address of the carrier device 182 could be the current location obtained via its smartphone GPS. In an embodiment, the start time of the carrier device 182 can be immediate or selected by the carrier device 182, or provided by the "regular" carrier device 182.

In an embodiment, the upcoming carrier trip data from carrier device 182 includes flexibility in terms of distance of diversion from start or end addresses and flexibility in terms of days, hours, and minutes from start time. The carrier trip data may also contain recurrence of the carrier trip, such as daily, weekly, or monthly. This flexibility and recurrence may be helpful while finding a suitable package route for this carrier trip.

In an embodiment, the carrier module 132 uses a modular neural network to predict and suggest when the carrier device 182 can be available for a trip based on the carrier device's 182 location and availability data used as input. For example, if the carrier device 182 is usually at home from 2 pm to 4 pm every Wednesday, and does not have commitments in the smartphone device calendar, then the modular neural network can predict that the carrier device 182 might be available to carry a package during that time from his home location within 2 hours round trip time. Thus, the carrier module 132 can predict and suggest one or more carrier trips for the carrier device 182 instead of the carrier device 182 having to explicitly register trips. Advantageously, system 100 thereby enriches the ecosystem by proactively suggesting carrier trips based on prediction of availability and location of the carrier device 182.

At block 606, the carrier module 132 validates data received for this new carrier trip. In an embodiment, carrier trip details such as the dimensions, weight, and value are checked against preset limits. At block 608, the carrier module 132 can proceed in one of two ways. If the data is invalid, proceed to block 612 to prompt the carrier device 182 whether to retry upcoming carrier trip registration.

If the data is valid, the carrier module 132 proceeds to block 610, stores the upcoming carrier trip data into the database 150. The carrier module 132 gets a new, unique id, "carrier trip.id", as a result. This carrier trip.id now becomes the permanent handle for this carrier trip for all future transactions. At block 614, the carrier module 132 obtains one or more carrier trip routes and associated carrier trip route steps for each of the one or more carrier trip routes of one or more carrier devices 182 from one or more network cloud mapping services, and stores the one or more carrier trip routes and the associated carrier trip route steps in the database 150.

The carrier module 132 updates status of every carrier trip route as unassigned. After updating the database, at block 616, the carrier module 132 sends a confirmation of successful carrier trip registration to the carrier device 182 via the smartphone app 170.

Figure 11:
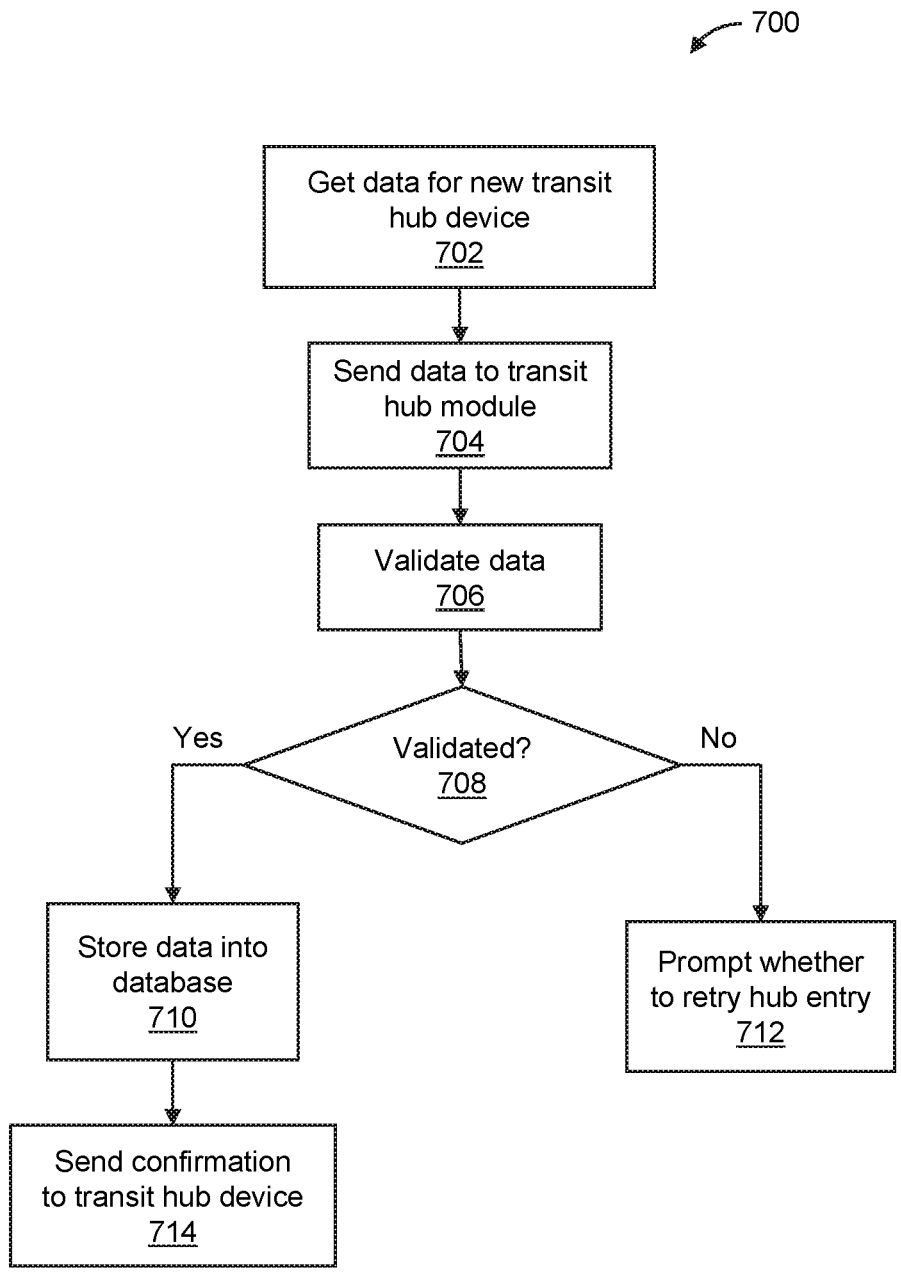
FIG. 11 illustrates a flow diagram of a method of new transit hub device registration, according to an embodiment.

FIG. 11 illustrates a flow diagram of a method of new transit hub device registration 700, according to an embodiment. The method 700 of transit hub module 133 allows the user device 180 designated as a transit hub device 183 to register as a new transit hub device.

A transit hub device 183 can be, but not limited to, an electronic device such as a smartphone, personal computer, computer tablet, computer server, bot, smart contract, or automated kiosk associated to an available, safe, unused, private and/or commercial space such as, but not limited to, a home, home garage, corner store, commercial office, automated kiosk that can be used for temporary storing of packages enroute. The transit hub device 183 provides manned or unmanned means for pick-up, storage and drop-off one or more packages. The transit hub device 183 can be associated to a stationary location like a home garage, a corner store, or mobile such as, but not limited to, a van, trailer, container that can be moved and positioned to a safe, efficient location within its zone of operation for storing, receiving, and handing over temporarily. The mobile transit hub device 183 is placed in a zone of operation determined by the transit hub module 133. The mobile transit hub device 183 can be dynamically requested by transit hub module 133 to move to a strategic location in order to make the package routing most efficient.

At block 702, the transit hub device 183 gets data for the new transit hub device for registration. At block 704, the transit hub module 133 obtains new transit hub data (e.g., capacity in terms of length, width, height, weight, value, fragility, address, open hours for pick-up and drop-off, stationary or mobile, zone of operation) from the user interface of the smartphone app 170 on the transit hub device 183.

In an embodiment, the transit module 133 uses a modular neural network to predict and suggest when the transit hub device 183 can be available for storage based on the transit hub device's 183 location and availability data used as input. For example, if the transit hub device 183 is usually at home after 6 pm every Thursday, and does not have commitments in the smartphone device calendar, then the modular neural network can predict that the transit hub device 183 might be available to store a package during that time at its home location. Thus, the transit hub module 133 can predict and proactively suggest one or more storage assignments for the transit hub device 183 instead of the transit hub device 183 having to explicitly register storage. Advantageously, the transit hub module 133 enriches the ecosystem by suggesting storage assignments based on prediction of availability and location of the transit hub devices 183.

In an embodiment, the transit hub module 133 uses a feed forward neural network or a radial basis function neural network to predict whether, for example, a transit hub device 183 at a corner store gets busy during 4 pm to 6 pm with a regular store customer. This can be determined by the neural network based on input from the reduction in cellular data usage of the transit hub device during those hours and/or no movement of the device as it is left on the desk while serving customers. The output of the neural network can be used to predict when a transit hub device 183 might not be available during busy hours or might be available during low customer footfall. Thus, the transit hub module 133 can proactively suggest available times/days for storage to the transit hub device 183, rather than to have it explicitly register available hours of a transit hub device 183. Also, predictions such as busy on the last and first day of the month (e.g. for lottery ticket sale in a corner store) can be included in the predictability based on artificial intelligence.

In an embodiment, the transit hub module 133 can provide real-time GPS locations of the mobile transit hub device 183 via smartphone app 170 and provide the data as input to a feed forward neural network or a radial basis function neural network. The neural networks can so predict when the transit hub device 183 can accept packages for storage while it is, for example, at its corner store or home garage. A pattern of availability for days and hours can be predicted via artificial intelligence.

At block 706, the transit hub module 133 validates data received for this new transit hub device 183. In an embodiment, details such as the dimensions, weight, and value are checked against preset limits. At block 708, transit hub module 133 can proceed in one of two ways. If the data is invalid, proceed to block 712 to prompt the transit hub device 183 whether to retry transit hub registration.

If the data is valid, the transit hub module 133 proceeds to block 710, to store new transit hub device data into the database 150. The transit hub module 133 gets a new, unique id, "hub.id", as a result. This hub.id now becomes the permanent handle for this transit hub device 183 for all future transactions. At block 714, the transit hub module 133 module sends a confirmation of successful registration to the transit hub device 183 via the user interface of the smartphone app 170.

Figure 12:
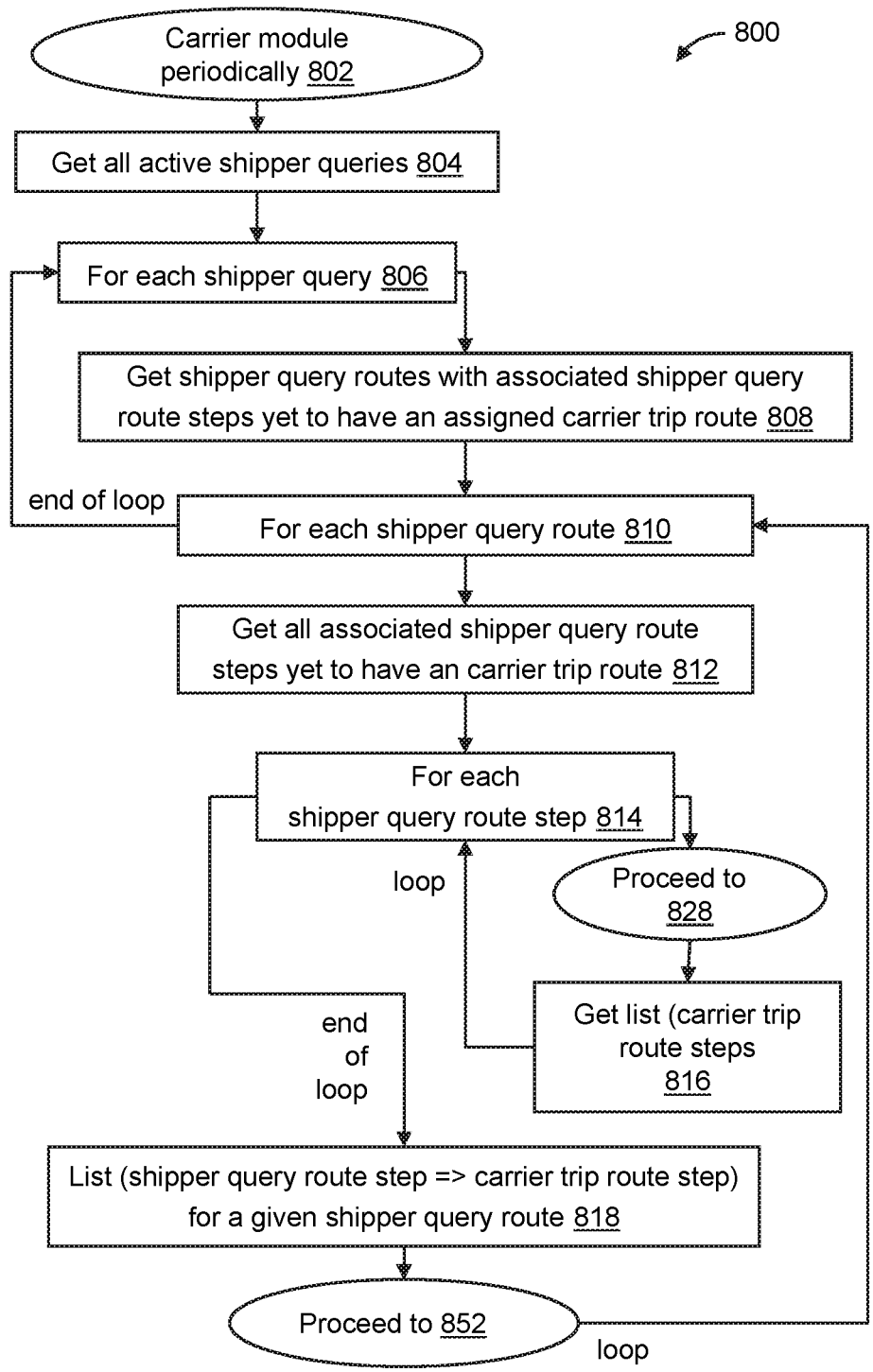
FIG. 12 illustrates a flow diagram of a first part of a method to find carrier trip routes for carrying shipper query route legs, according to an embodiment.

FIG. 12 illustrates a flow diagram of a first part of a method to find carrier trip routes for carrying shipper query route legs 800, according to an embodiment. The method 800 is executed by the carrier module 132 periodically 802, for example, once every 5 seconds for an embodiment.

In embodiments, methods carried out by system 100, such as method 800, are executed periodically by their respective modules. The reason these are run within short periodic intervals is due to the dynamic nature of the system 100. For a given package journey, multiple carrier devices 182 and multiple transit hub devices 183 are selected (and can then be deselected), packages are tracked and rerouted, user devices 180 are tracked in real-time, co-ordination of pick-up and drop-off at transit nodes can occur at every leg, and payment and charge estimation can evolve during the journey of the package. This demands intensive computing resources along with artificial intelligence or machine learning methods that are not necessary for traditional delivery services because their dedicated fleet and logistics network are quite predictable. In the case of system 100, there is typically no predictability of the final route for a package, the carrier devices 182 involved, the transit hub devices 183 involved, and the transfers made enroute. Keeping track of these dynamic, evolving conditions is only possible with intensive computing and machine learning resources.

At block 804, the carrier module 132 gets a list of shipper queries, with "active" status, from the database 150. At block 806, the carrier module 132 handles one active shipper query in the list at a time independently.

At block 808, the carrier module 132 retrieves from the database 150, shipper query routes for the above shipper query that have one or more shipper query route steps that do not yet have an assigned carrier trip route. At block 810, the carrier module 132 handles each such shipper query route from block 808.

At block 812, the carrier module 132 gets a list from the database 150 of all the associated shipper query route steps for the above shipper query route from block 810 that do not have an assigned carrier trip route with them as yet. At block 814, the carrier module 132 begins handling one shipper query route step in the list from block 812 at a time. To simplify the flow diagram, a second part of the method is shown at block 828, the details therein illustrated separately in FIG. 13.

At block 816, the carrier module 132 gets a list of carrier trip route steps that can carry the shipper query route step from block 814. The resulting data is stored in a list data structure in memory, for example RAM 112, in the form of pairs, such as the shipper query route step that can be carried by a carrier trip route step.

At the end of the loop at block 818, the carrier module 132 has a result in a list data structure in memory in the form of pairs, such as a shipper query route step that can be carried by a carrier trip route step, for a given active shipper query being processed at block 806.

One or more associated shipper query route steps can be common to two or more shipper query routes of the same shipper query. Similarly, one or more associated carrier trip route steps can be common to two or more carrier trip routes of the same carrier trip. These get handled in the carrier module 132 where each shipper query route is handled independently of each other.

Figure 14:
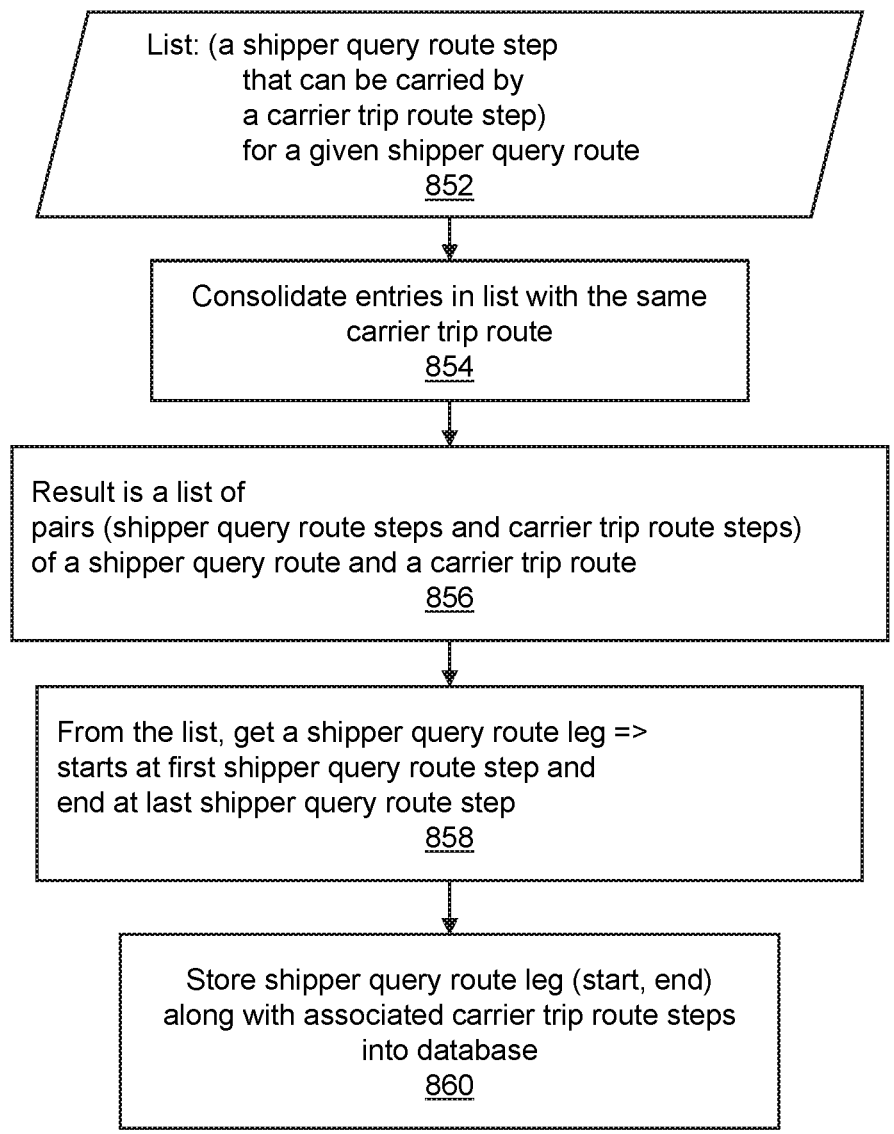
FIG. 14 illustrates a flow diagram of a third part of a method to find carrier trip routes for carrying shipper query route legs, according to an embodiment.

To simplify the flow diagram, a third part of the method is shown at block 852, the details therein illustrated separately in FIG. 14. At block 852, the carrier module 132 completes the processing of a given active shipper query from block 806.

Figure 13:
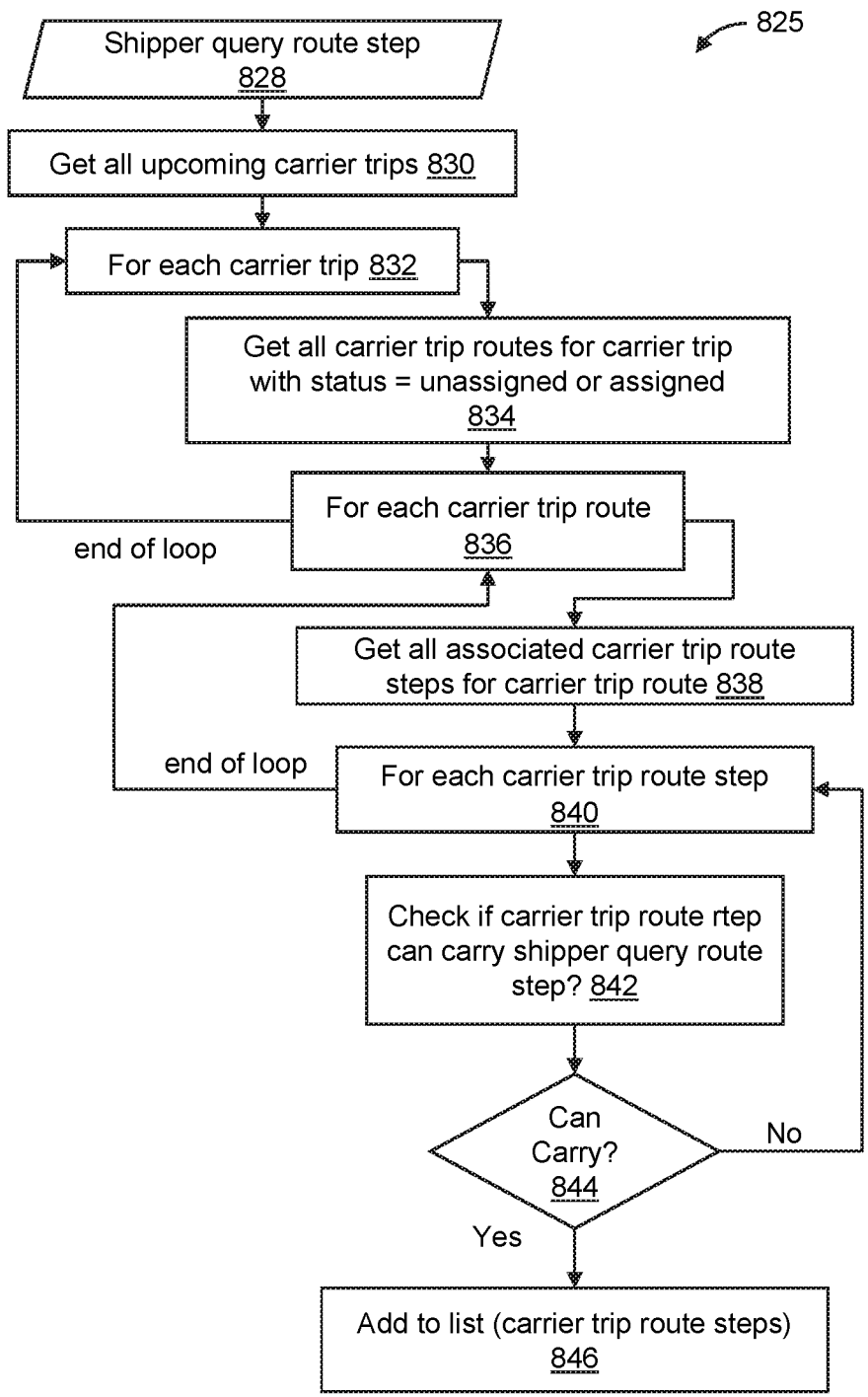
FIG. 13 illustrates a flow diagram of a second part of a method to find carrier trip routes for carrying shipper query route legs, according to an embodiment.

FIG. 13 illustrates a flow diagram of a second part of a method to find carrier trip routes for carrying shipper query route legs 825, according to an embodiment. At block 828, the carrier module 132, receives a shipper query route step from block 814 in FIG. 12. At block 830, the carrier module 132 retrieves all upcoming carrier trips from the database 150. At block 832, the carrier module 132 begins checking one carrier trip at a time.

At block 834, the carrier module 132 retrieves from database 150, all the carrier trip routes for the above carrier trip that have status unassigned or assigned. At block 836, the carrier module 132 begins handling one carrier trip route at a time.

At block 838, the carrier module 132 retrieves from database 150, all the associated carrier trip routes steps for the above carrier trip route from block 838. At block 840, the carrier module 132 begins handling one associated carrier trip route step at a time. At block 842, using the method 800, the carrier module 132 periodically checks if a carrier trip route step of carrier devices 182 can carry shipper query route step from block 828 by applying rules.

In an embodiment, a rule is whether the shipper query route step's start and end coordinates fall within the carrier trips flexible diversion limits of the carrier trip route step start and end coordinates, respectively. Another rule is whether the dimensions, weight, value, and fragility of the shipper query fall within limits of the carrier trip. Another rule is whether the estimated start and end time for the carrier trip route step fall within the carrier trip's flexible time of the estimated pick-up and drop-off time, respectively, of the shipper query route step.

In an embodiment, the carrier module 132 can apply rules based on methods such as, but not limited to, statistical methods, artificial neural networks, stochastic methods, and artificial techniques such as machine learning. The shipper device 181 or receiver device 184 need not wait (i.e., remain stationary) for the carrier device 182 during pick-up or drop-off. The shipper device 181 or receiver device 184 can continue its day-to-day locomotion, while the package routing module 134 tracks their real-time locations via smartphone app 170 GPS. A modular neural network can be used to predict the shipper device 181 or receiver device 184 locations (e.g., soccer field on Thursday at 6 pm). The output of the neural network can be fed to the carrier module 132 to check whether the newly computed shipper query route (based on the predicted location) and its one or more associated shipper query route steps can be carried by one or more carrier trip route steps. Similarly, the receiver device's 184 predicted location can be used to check if one or more associated shipper query route steps can be carried by one or more carrier trip route steps. This dynamic, real-time predictability computing to find carrier trips to carry shipper query route steps is only possible due to the application of artificial intelligence methods in the system 100.

In an embodiment, the carrier trip module 132 uses a recurrent neural network with input based on past learning of route steps that have been hit with congestion or delays, for example, at a rush hour in one traffic direction, road construction, rainy season, or fog. This input can be sequentially applied to multiple, consecutive route steps to predict as output if part or all of a shipper query route leg or carrier trip route will face delays or diversion. The output becomes an essential learning that can be applied while deciding whether a carrier trip route step can carry a shipper query route step. This also serves as input while consolidating shipper query route steps into a shipper query route leg; steps that are prone to delays or diversion can be dropped from consideration for a carrier trip and vice versa. The dynamic nature of this prediction, re-routing, and communication requires intensive computing and machine learning resources.

In an embodiment, the carrier module 132 computes one or more shipper query legs of one or more shipper devices 181 that can be carried by recurring carrier trips of one or more carrier devices 182.

At block 844, the carrier module 132 can proceed in one of two ways. if the carrier trip route step cannot carry the shipper query route step, then continue to block 840. If the carrier trip route step can carry the shipper query route step, then at block 842 the carrier trip route step is added to the list in memory.

FIG. 14 illustrates a flow diagram of a third part of a method 850 to find carrier trip routes for carrying shipper query route legs, according to an embodiment. At block 852, carrier module 132 handles a list data structure in RAM 112, in the form of pairs, such as a shipper query route step that can be carried by a carrier trip route step, for a given active shipper query being processed at block 806.

At block 854, the carrier module 132 consolidates entries in the list with the same carrier trip route. At block 856, the resulting data structure is a list of pairs, such as a shipper query route step and a carrier trip route step, for the same shipper query route and same carrier trip route. This is a list of all shipper query route steps of shipper query route that can be carried by a single carrier trip route.

At block 858, the carrier module 132 derives the first and last shipper query route steps of the shipper query from the pairs above. The carrier module 132 computes a shipper query route leg that consists of one or more consecutive shipper query route steps for a given shipper query route, that can be carried by one or more carrier trip route steps of a carrier trip route of a carrier device 182 at block 858. At block 860, the carrier module 132 stores the shipper query route leg in the database 150. From the list at block 852, all such possible shipper query route legs of a shipper query route that can be carried by a carrier trip route are computed and stored in the database. The handling of a shipper query route from block 810 is complete here.

As shown in FIGS. 12, 13, and 14, the method to find carrier trip routes for carrying shipper query route legs 800 periodically computes shipper query route legs that can be carried on carrier trips of carrier devices 182 and stored in the database 150. As such, this method 800 periodically identifies one or more packages from different shipper query routes of shipper devices 181 that can be carried on a carrier trip route of a carrier device 182.

Figure 15:
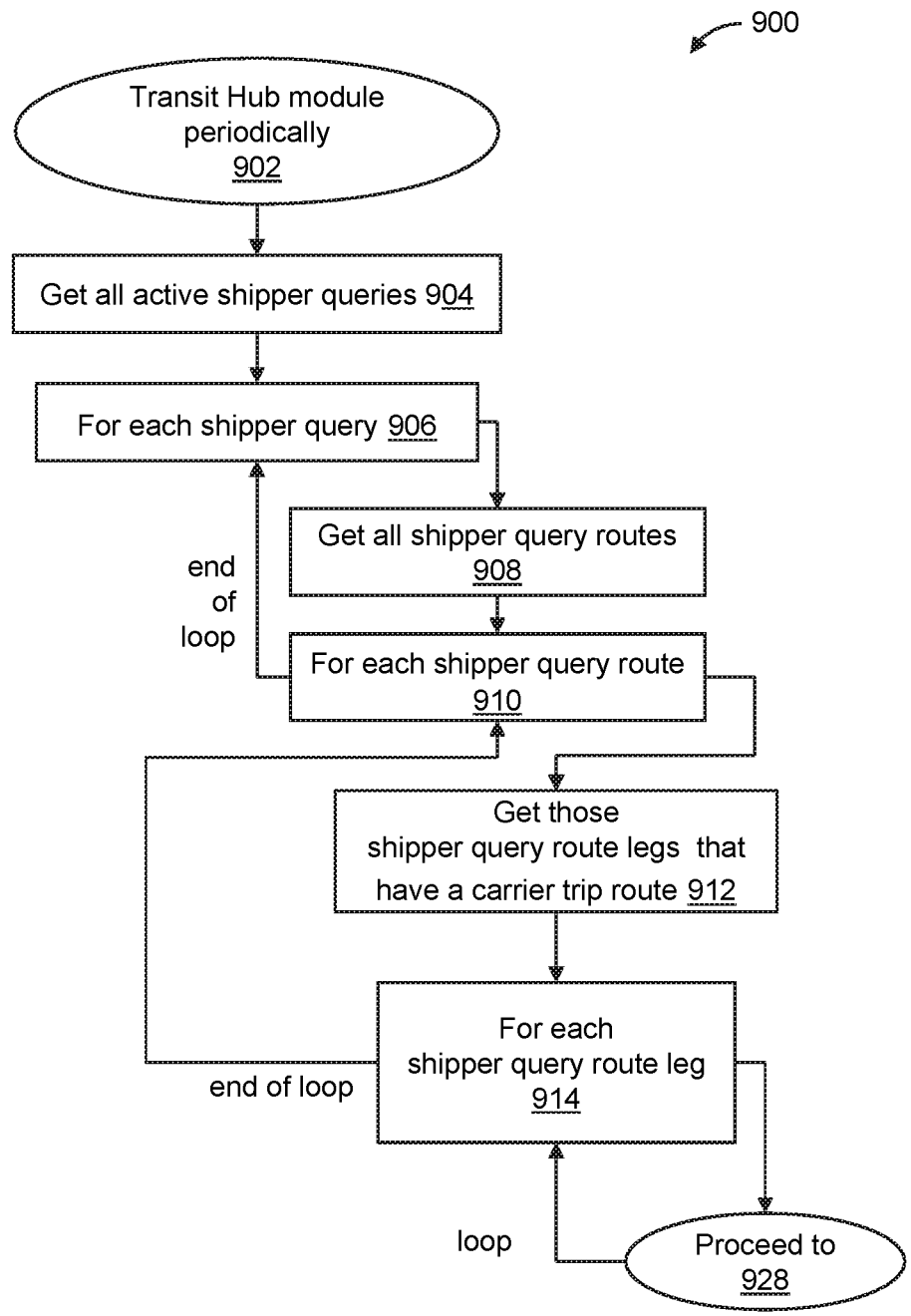
FIG. 15 illustrates a flow diagram of a first part of a method to find transit hub devices for storage at the end of shipper query route legs, according to an embodiment.

FIG. 15 illustrates a flow diagram of a first part of a method to find transit hub devices for storage at the end of shipper query route legs 900, according to an embodiment. The method 900 is scheduled to execute periodically 902, for example once every 5 seconds for an embodiment.

At block 904, the transit hub module 133 gets a list of shipper queries, with "active" status, from the database 150. At block 906, the transit hub module 133 begins handling one active shipper query from the list above.

At block 908, the transit hub module 133 retrieves from the database 150 all the shipper query routes for the shipper query from block 906 that have been scheduled to be carried by one or more carrier trip routes. At block 910, the transit hub module 133 handles one shipper query route from block 908 at a time.

At block 912, the transit hub module 133 retrieves from the database 150 all the shipper query route legs for the shipper query route from block 910 that have been scheduled to be carried on a carrier trip route. At block 914, each such shipper query route leg is handled. To simplify the flow diagram, a second part of the method 900 is shown at block 928, the details therein illustrated separately in FIG. 16.

Figure 16:
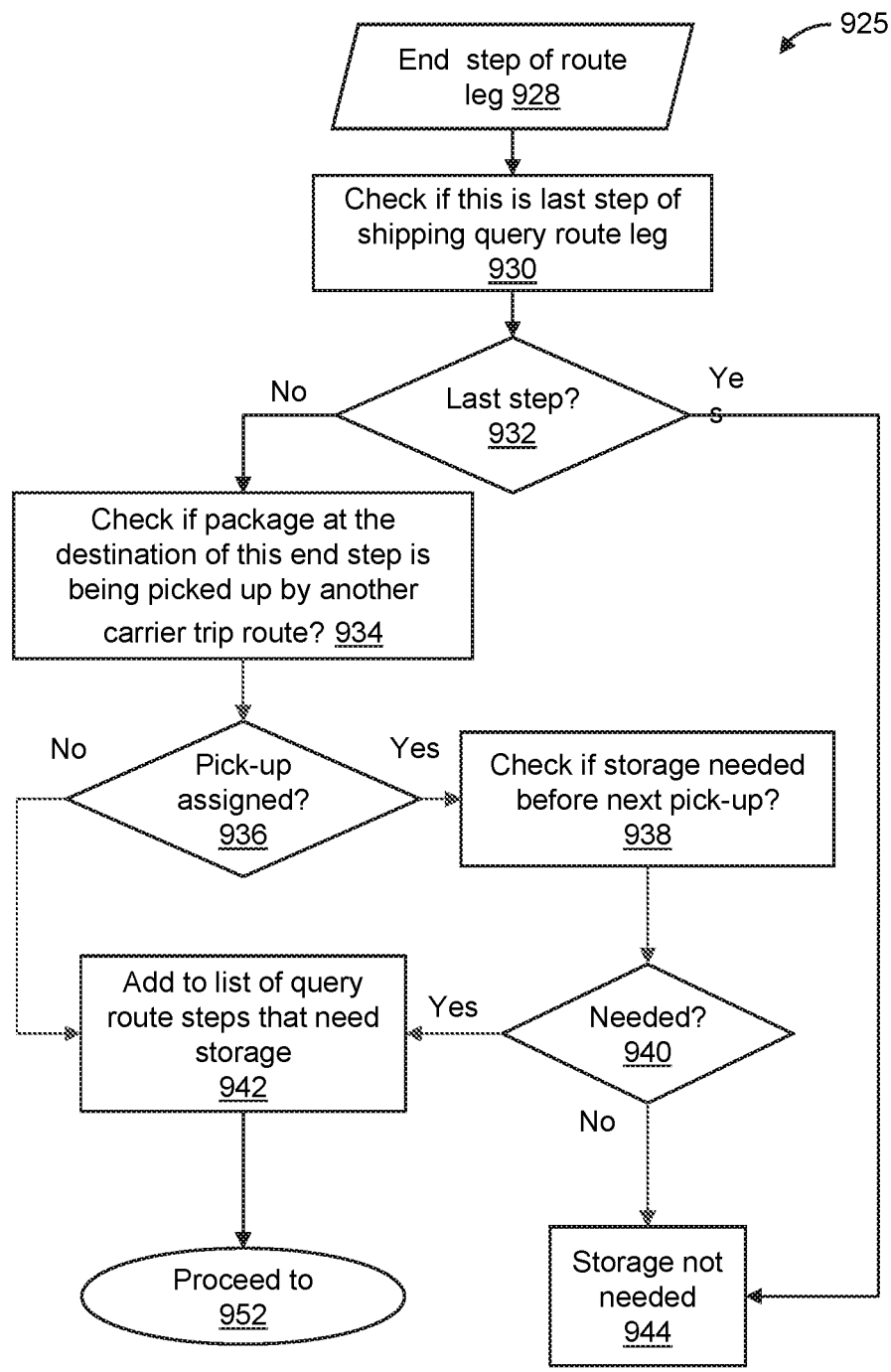
FIG. 16 illustrates a flow diagram of a second part of a method to find transit hub devices for storage at the end of shipper query route legs, according to an embodiment.

FIG. 16 illustrates a flow diagram of a second part of a method to find transit hub devices for storage at the end of shipper query route legs 925, according to an embodiment. At block 928 the end of shipper query route step of a shipper query route leg from block 914 is processed. At block 930, the transit hub module 133 checks if this end route step of the shipper query route leg is the last step in the shipper query route.

At block 932, the transit hub module 133 can proceed in one of two ways. If the end route step is the last step in the shipper query route, then this step does not need storage because this step ends at the destination of the package i.e. the receiver device 184. If it is not the last step, then proceed to block 934.

At block 934, the transit hub module 133 checks whether a carrier trip route is assigned to the next shipper query route leg to pick-up this package at the destination of end route step of the shipper query route leg (being a transit node) from block 928. At block 936, the transit hub module 133 has one of two ways to proceed. If another carrier trip route is not assigned to pick-up at the end, then proceed to block 942, and add this end shipper query route step to the list of shipper query route steps that need storage.

If a carrier trip route is assigned to pick-up the package at the destination of end route step from block 928, then at block 938, the transit hub module 133 checks whether the end route step of a shipper query route leg needs storage by applying one or more rules.

In an embodiment, an example rule applied above is whether the end route step's destination coordinate falls within the flexible diversion limits of a next carrier trip's route step's start coordinate. Another rule is whether the estimated drop-off time of end route step falls within the next carrier trip's flexible time of the estimated pick-up. Another rule is whether the estimated drop-off time of end route step falls within the current or next carrier trip's carrier hold time.

The transit hub module 133, using the method to find transit hub devices 183 for storage at the end of shipper query route legs 900, periodically computes whether an end of every shipper query route leg of one or more shipper devices 181 needs storage associated with a transit hub device 183 at least in part based on a next shipper query route leg.

At block 940, the transit hub module 133 can proceed in one of two ways. If storage is not needed, then it is recorded that storage is not needed at block 944. If storage is needed, at block 942, the shipper query route step is added to a list in RAM 112 for further processing in block 952. In some cases, even though storage has been assigned for the end of the shipper query route step, this storage can be dropped at any time as determined by the carrier module 132, in communication with the package routing module 134, if a carrier-to-carrier transfer or a multi-way exchange has become possible, which will be prioritized to eliminate the need of storage at a transit hub device 183.

Figure 17:
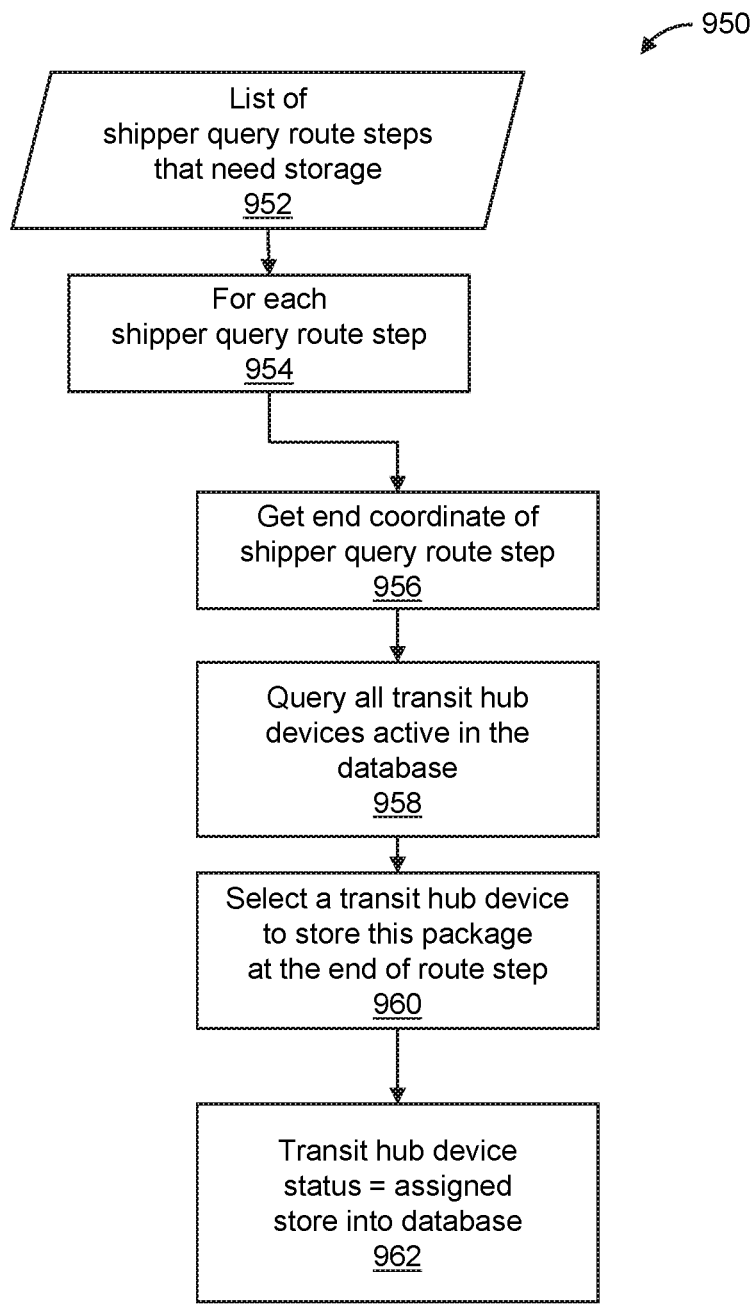
FIG. 17 illustrates a flow diagram of a third part of a method to find transit hub devices for storage at the end of shipper query route legs, according to an embodiment.

FIG. 17 illustrates a flow diagram of a third part of a method to find transit hub devices for storage at the end of shipper query route legs 950, according to an embodiment. A list of shipper query route steps that need storage is received at block 952. At block 954, each such shipper query route step is handled by the transit hub module 133.

At block 956, the transit hub module 133 retrieves the end coordinate of shipper query route step from the database 150. At block 958, all active transit hub devices 183 are retrieved from the database 150.

At block 960, the transit hub module 133 using the method 900, periodically checks if one or more transit hub devices 183 are available for a shipper query route leg of one or more shipper devices 181 that needs storage and selects a transit hub device 183 among the one or more transit hub devices 183 that are available by applying rules.

In an embodiment, an example rule applied above is whether the transit hub device's address falls within the flexible diversion limits of the carrier trip route step's end coordinate for the carrier trip. An example rule is whether the transit hub device is open at the time of the estimated end time i.e. drop-off time of shipper query route step. An example rule is whether the transit hub device capacity in terms of dimensions, weight, value, and fragility can accommodate the shipper query. In an embodiment, one or more rules can be based on methods such as, but not limited to, statistical methods, artificial neural networks, stochastic methods, and artificial intelligence techniques such as machine learning. In an embodiment, a feed forward network is used which derives input from whether the transit hub device 183 is busy during the estimated drop-off or pick-up time of the package for storage. For example, a corner store could be busy during its peak hours serving regular customers, so its transit hub device 183 could provide input to the neural network like no usage of mobile data during 4 pm-6 pm on Mondays. The neural network, based on that input, can predict whether this store is available and most suited for storing this package. A recurrent neural network can be applied to the pick-up and drop-off carrier trip routes to compute whether a transit hub device 183 proved to be efficient, based on the past history of geographically closer routes. This criteria can be applied for selection of the transit hub device 183.

At block 962, the transit hub module 133 updates the status of the selected transit hub from block 960 to assigned. Thus, the transit hub module 133 using method 900 periodically updates the transit hub status of a transit hub device 183 as assigned to a shipper query route leg of one or more shipper devices 181 and stores the transit hub status in the database 150.

This completes the processing of one such shipper query route leg at block 962. Every such shipper query route leg from block 914 for every shipper query route 910 for every shipper query from block 906 is processed as described in method 900.

Figure 18:
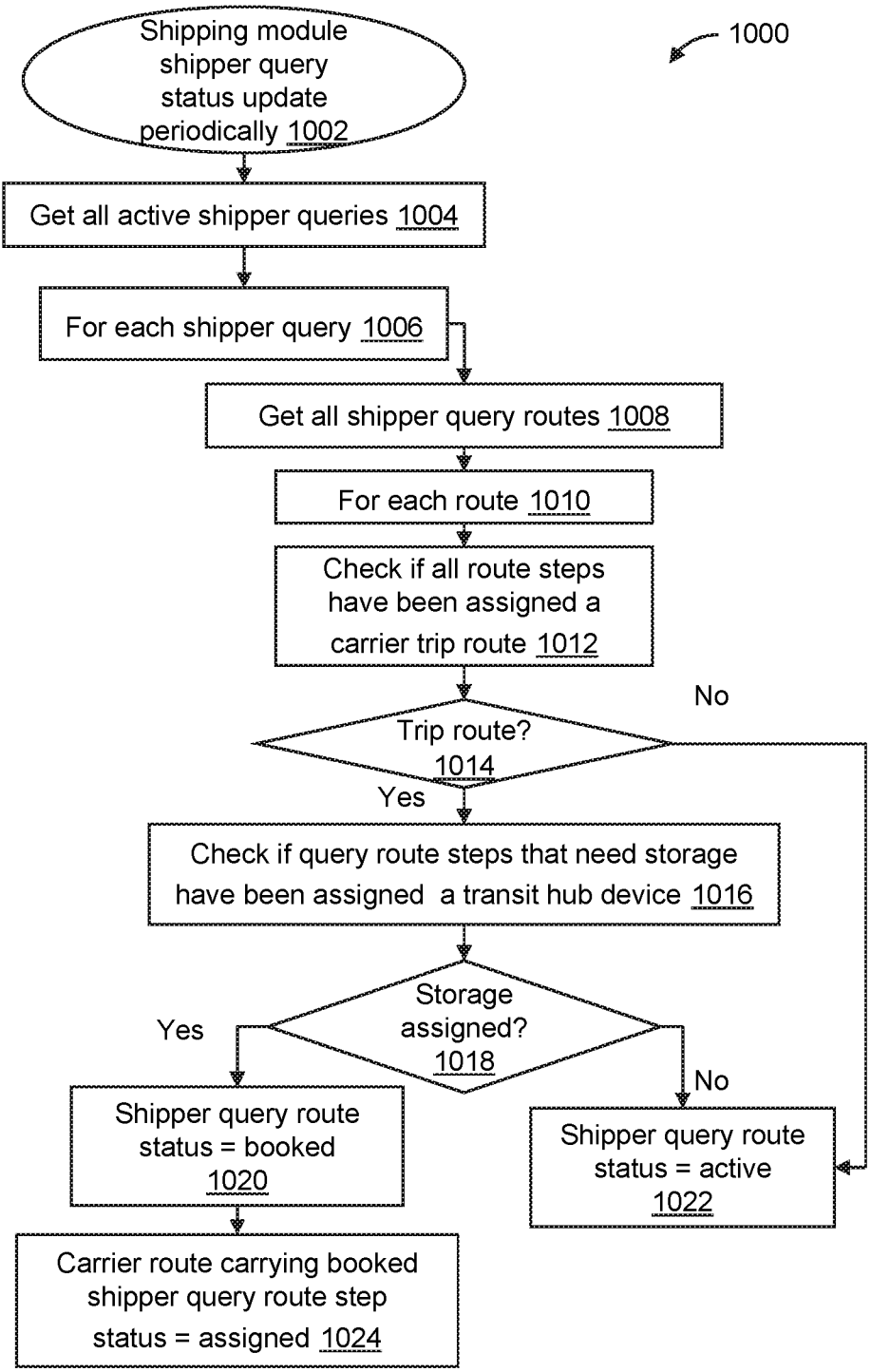
FIG. 18 illustrates a flow diagram of a method to update shipper query status, according to an embodiment.

FIG. 18 illustrates a flow diagram of a method to update shipper query status 1000, according to an embodiment. This method to update shipper query status 1000 is executed by the shipping module 131 periodically 1002, for example once every 5 seconds in an embodiment.

At block 1004, the shipping module 131 retrieves from the database 150 all shipper queries that have "active" status. Each shipper query is processed at block 1006. At block 1008, the shipping module 131 retrieves all shipper query routes for this shipper query from the database 150. Each shipper query route is processed at block 1010.

At block 1012, using the method 1000, the shipping module 131, for every such shipper query route, periodically checks if all the associated shipper query route steps have an assigned carrier trip route. At block 1014, the shipping module 131 can proceed in one of two ways. If one or more shipper query route steps do not have an assigned carrier trip route, then the shipper query status is still left as active in the database 150 at block 1022.

At block 1014, if all shipper query route steps have an assigned carrier trip, proceed to block 1016. At block 1016, the shipping module 131, for every such shipper query route, periodically checks if one or more associated shipper query route steps that need storage at the end of the step have an assigned transit hub device 183. At block 1018, the shipping module 131 can proceed in one of two ways. If one or more shipper query route steps that need storage do not have an assigned transit hub device, then the shipper query status is still left as active in the database 150 at block 1022.

At block 1018, if all shipper query route steps that need storage have an assigned transit hub device, then proceed to block 1020. At block 1020, the shipper query status is updated as "booked" in the database 150. Thus, using method 1000 to update shipper query status, the shipping module 131 periodically updates a shipper status of every shipper query based on assigned carrier trips of carrier devices 182 and assigned transit hub devices 183 for each associated shipper query route step and stores the shipper status in the database 150.

At block 1024, the shipping module 131, in communication with the carrier module 132, updates carrier trips status as "assigned" for all carrier trips carrying one or more shipper query route steps of every "booked" shipper query. Thus, using method 1000 to update shipper query status, the shipping module 131 periodically, in communication with the carrier module 132, updates a carrier status of every carrier trip route of carrier devices 182 that carries one or more associated carrier trip route steps of one of a plurality of booked shipper query routes for the shipper query of shipper devices 181, and stores the carrier status in the database 150.

Figure 19:
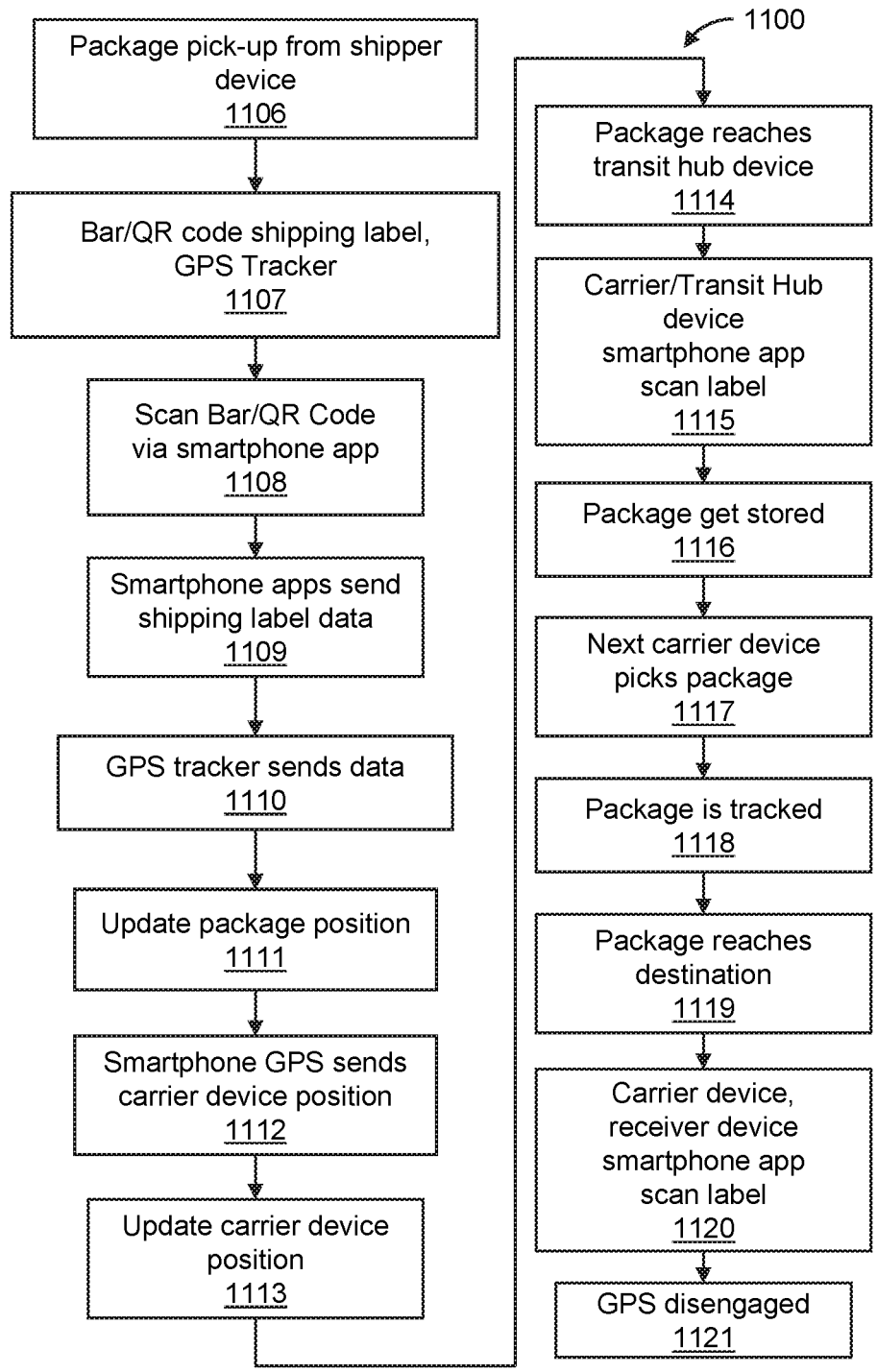
FIG. 19 illustrates a flow diagram of a method of package tracking, according to an embodiment.

FIG. 19 illustrates a flow diagram of a method of package tracking 1100, according to an embodiment. The package tracking method 1100 of the package routing module 134 tracks the shipper device's package from its origin (being a transit node) to its destination (being another transit node). The package tracking method 1100 track packages in real time using tracking techniques. The tracking techniques comprising at least one of shipping label with barcode, QR code, IOT tracker, RFID tracker, GPS tracker affixed on a package, GPS tracker affixed to a carrier vehicle, and smartphone GPS of carrier devices 182.

At block 1106, the carrier device 182 picks up the package from the shipper device 181. At block 1107, the carrier 182 affixes a barcode and/or QR code based shipping label, IOT tracker, RFID tracker and/or a GPS tracker to the package. At block 1108, both the carrier device 182 and shipper device 181 scan the bar/QA code in their respective smartphone apps 170. At block 1109, the shipping label data from both carrier device 182 and shipper device 181 is sent independently to the package routing module 134, which processes and stores the data into the database 150.

At block 1110, the GPS tracker affixed to the package starts sending real-time package position data to the package routing module 134. At block 1111, the package routing module 134 keeps periodically updating the latest real-time package position in the database 150. At block 1112, the carrier device 182 smartphone app 170 captures and sends its real-time GPS position to the package routing module 134. At block 1113, the package routing module 134 keeps updating the latest real-time package position in the database 150.

At block 1114, the carrier device 182 and hence the package reaches an intermediate transit hub device 183 for storage. At block 1115, both the carrier device 182 and transit hub device 183 scan the bar/QA code in their respective smartphone apps 170. The smartphone apps 170 sends this package position and transit hub device data to the package routing module 134 for database update.

At block 1117, the transit hub device 183 hands over the package to the next carrier device 182. Similar to block 1108, both the carrier device 182 and transit hub device 183, acting as an intermediate shipper device 181 for the onward journey, scan the shipping label using their smartphone apps 170. Their respective smartphone apps 170 send this data to the package routing module 134 for database update. In an embodiment, a carrier-to-carrier direct transfer or a carrier-to-carrier multi-way exchange of one or more packages includes the scanning of shipping label by both carrier devices, confirmation of handover of the package at each shipper query route leg and real-time tracking of packing positions.

At block 1118, the package is tracked similar to blocks 1110, 1111, 1112, and 1113. At block 1120, the package reaches its final destination. The carrier device 182 and the receiver device 184 of the system, scan the shipping label. Their respective smartphone apps 170 send this data to the package routing module 134 for database 150 update. This destination scan also serves as a confirmation of delivery by the receiver device 184 of the package. At block 1121, the GPS tracking the package is disengaged.

Thus, the package tracking method 1100 of the package routing module 134 coordinates pick-up and drop-off for every package shipper query route leg for each one or more of the plurality of user devices 180 involved in a pick-up or drop-off in communication with the smartphone app 170 of the user devices 180.

As shown in FIG. 19, the smartphone app 170 of the user devices 180 scan shipping labels at each pick-up and drop-off point (referred to herein as a transit node) in a package shipper query route leg. The package routing module 134 processes package data from shipping labels that are scanned by the smartphone app 170 of the user devices 180 involved at each pick-up and drop-off point (transit node) in a shipper query route leg and updates package data derived from the shipping labels in the database 150.

An embodiment of package tracking method 1105, can also make use of a GPS tracker affixed to a carrier vehicle. This could serve to track multiple packages that are enroute with a carrier device 182 at any given time.

Figure 20:
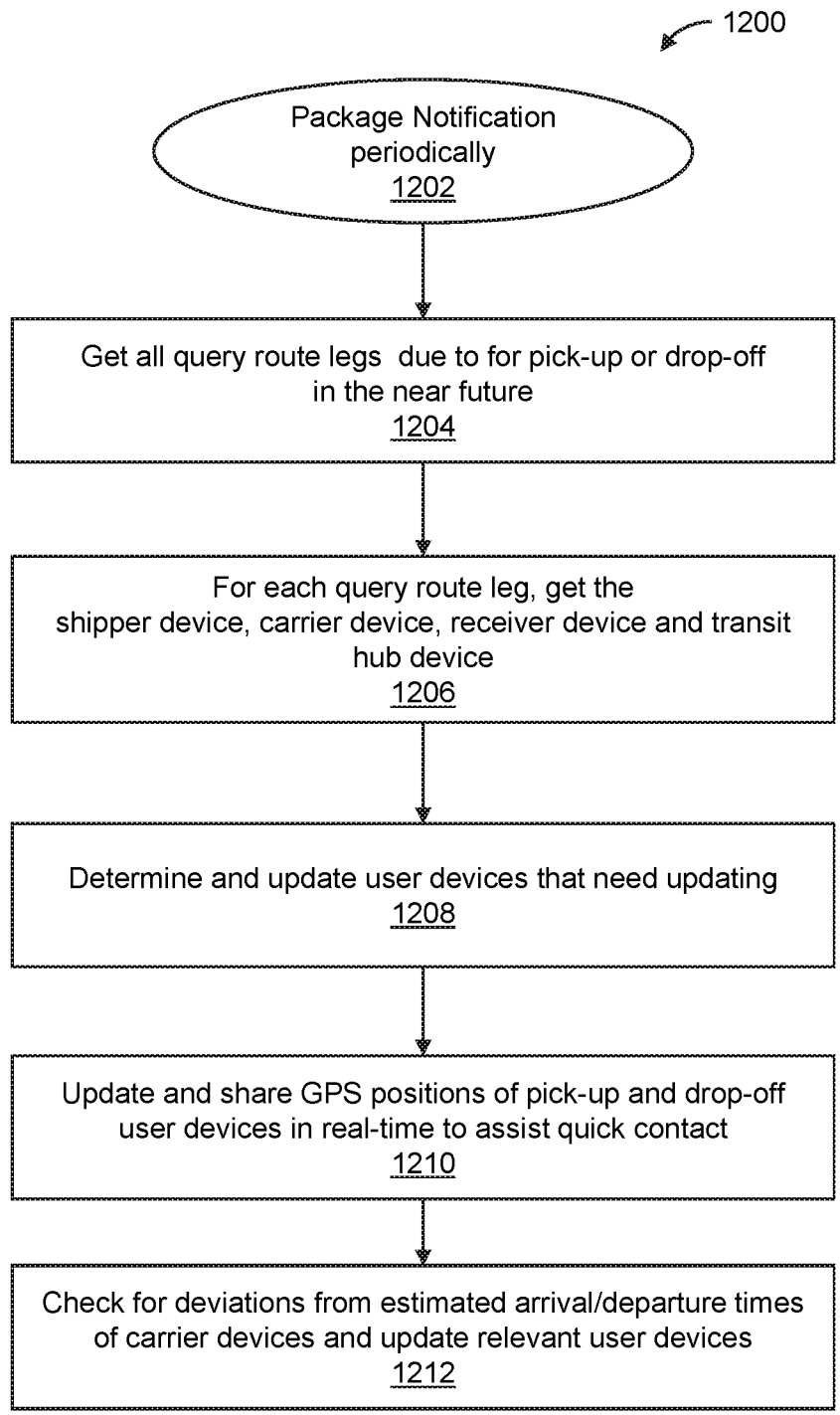
FIG. 20 illustrates a flow diagram of a method of package notifications, according to an embodiment.

FIG. 20 illustrates a flow diagram of a method of package notifications 1200, according to an embodiment. In method 1200, the package routing module 134 regularly notifies the shipper device 181, carrier device 182, transit hub device 183, and receiver device 184, of every upcoming pick-up and drop-off at every shipper query route leg and shares real-time location information of user devices 180 involved in exchanging packages. The method 1200 executes periodically at block 1202 in the package routing module 134, for example, once every 5 minutes.

At block 1204, the package routing module 134 retrieves from the database 150 all shipper query route legs that are due for pick-up or drop-off within a certain timeframe (e.g., in the next 5 minutes). At block 1206, the shipper device 181, carrier device 182, transit hub device 183, and receiver device 184, associated with each shipper query route leg are retrieved from the database 150. At block 1208, the package routing module 134 determines which of the plurality of user devices 180 require updating and updates the user devices 180 requiring updating by at least one of a smartphone app message, a voice call, an email, or a text message.

At block 1210, package routing module 134 periodically updates and shares GPS locations in real time via the smartphone app 170 on at least one of the user devices 180 associated with a pick-up or drop-off for every shipper query route leg. This facilitates quick contact between user devices 180 and efficient package handover.

The package routing module 134 using method 1200 periodically retrieves shipper query route legs that are due for pick-up or drop-off and sends pick-up and drop-off notifications to the user devices 180 involved in each of the shipper query route legs.

At block 1212, the package routing module 134 computes the estimated time of arrival and departure of packages for every shipper query route leg and determines based on the data stored in the database 150 and real-time GPS received at block 1210. The package routing module 134 checks for deviation of every shipper query route leg from a previous known estimated time of pick-up and arrival. The deviations could be due to traffic, weather related delays or unavailability of a carrier device or transit hub device due to unforeseen circumstances, or a carrier device cannot locate a pick-up or drop-off location.

For all the routes legs that are expected to have a deviation from previously estimated time, the package routing module 134 notifies all relevant designated of user devices i.e. shipper devices 181, carrier devices 182, transit hub devices 183 and receiver devices 184 for that shipper query route leg and subsequent shipper query route legs in this route. Thus, the package routing module 134 using method of package notifications 1200 periodically notifies user devices 180 associated with a shipper query route leg exhibiting deviation and subsequent shipper query route legs.

The package routing module 134, in communication with other modules of system 100, periodically re-routes one or more delayed shipper query route legs via another of the one or more carrier devices 182 or one or more transit hub devices 183 based on rules. In an embodiment, the package routing module 134 applies rules comprising at least one of statistical methods, artificial neural networks, stochastic methods, and artificial intelligence techniques such as machine learning.

In an embodiment, data from every pick-up and drop-off such as location, shipper query route steps, carrier trip route steps, and transit hub device 183 efficiency is used as input to machine learning methods such as semi-supervised learning or unsupervised learning. The output of these machine learning methods is further used as input during computation of shipper query route legs, and selection of carrier devices 182 and transit hub devices 183. For example, if a particular intersection near a transit hub device 183 is always clogged with traffic in one direction or road construction, the next time around, any carrier trip that is due for drop-off or pick-up from this transit hub device 183 is re-routed via the package routing module 134 to take turns via the opposite traffic direction. This saves time for the carrier devices 182. This machine learning is made possible via intensive computing operations and deep learning methods. Traditional delivery services like FedEx™ can handle these problems, such as for traffic congestion along a route to a warehouse, with existing methods because they have a fixed and finite number of warehouses and hence predictability. In system 100, the dynamism of warehouses and carriers means their availability needs intensive machine learning methods.

In an embodiment, anomalies, such as a transit hub device 183 leaving its transit hub location, a transit hub device 183 going offline, or an address for a transit hub device 183 not being locatable, can be detected. These can be flagged as transit hub device 183 unavailable or closed for the current storage assignment. The package routing module 134 then has to dynamically reroute the package based on availability of carrier devices 182 around the carrier trips involved and/or find available storage nearby. This leads to an intensive operation that needs to be resolved in a very short, deterministic amount of time so as not to cause delays to carrier devices 182 and packages. The system 100 uses GPS tracking and/or smartphone app 170 activity tracking to make sure every user device 180 involved in the pick-up and drop-off is available, on track, and notified of current pick-ups, drop-offs, and changes. These time-bound, real-time, deterministic tasks, involving intensive operations in a very short duration of time, are only possible with the application server 110 and its modules. Also, the learning from these re-routes and anomalies are fed as input into one or more supervised, semi-supervised, or unsupervised machine learning models for avoiding or to workaround such situations as much as possible.

Figure 21:
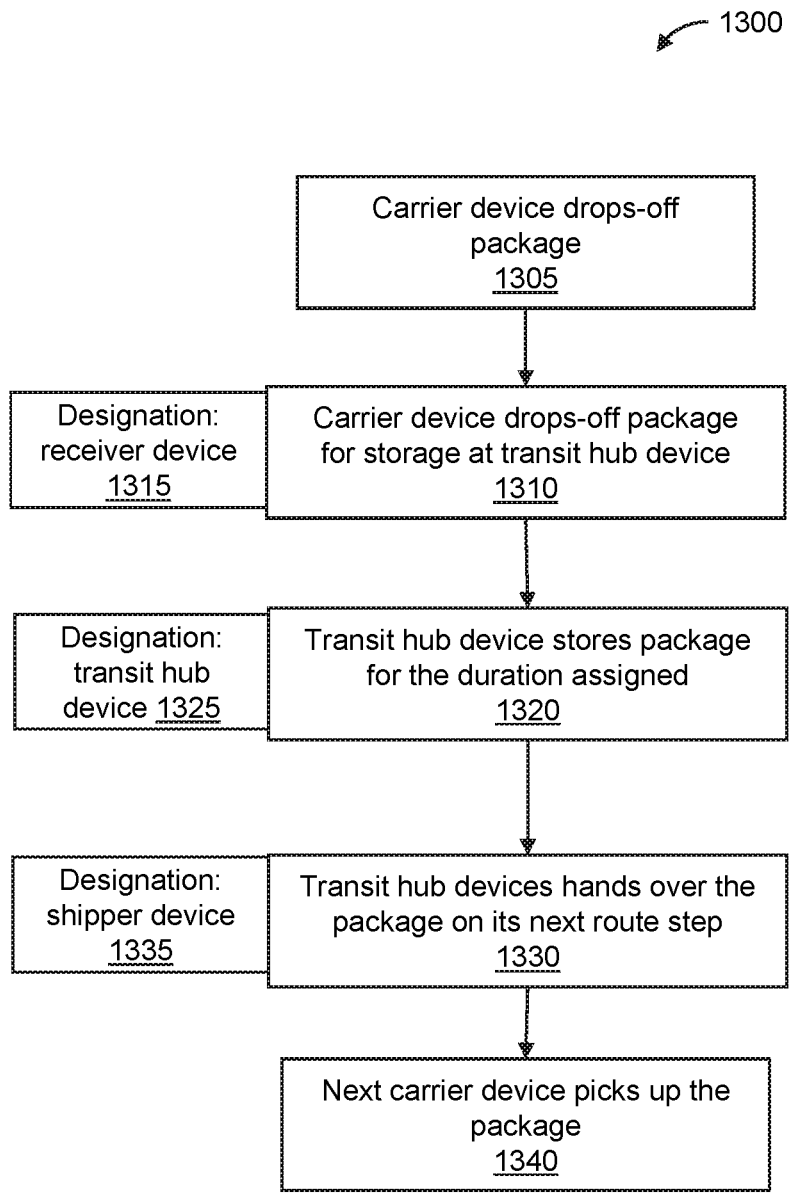
FIG. 21 illustrates a flow diagram of a method of managing three designations of a transit hub device, according to an embodiment.

FIG. 21 illustrates a flow diagram of a method of managing three designations of a transit hub device 1300, according to an embodiment. At block 1310, a carrier device 182 drops off a package assigned to be stored at a transit hub 183. At block 1310, the transit hub device 183 acts as a receiver device 184 at block 1315 for the package for the end of a shipper query route leg of the package. At block 1320, the transit hub device 183 acts as itself, i.e. a transit hub device 183, at block 1325 for the package for this shipper query route leg. At block 1330, the transit hub device 183 acts as a shipper device 181 at block 1335 for the package when it hands over the package to the next carrier device 182 at block 1340 onto its next shipper query route leg. Thus, the transit hub module 183 provides three designations for a transit hub device 183, the three designations comprising receiver device 184, transit hub device 183, and shipper device 181.

Figure 22:
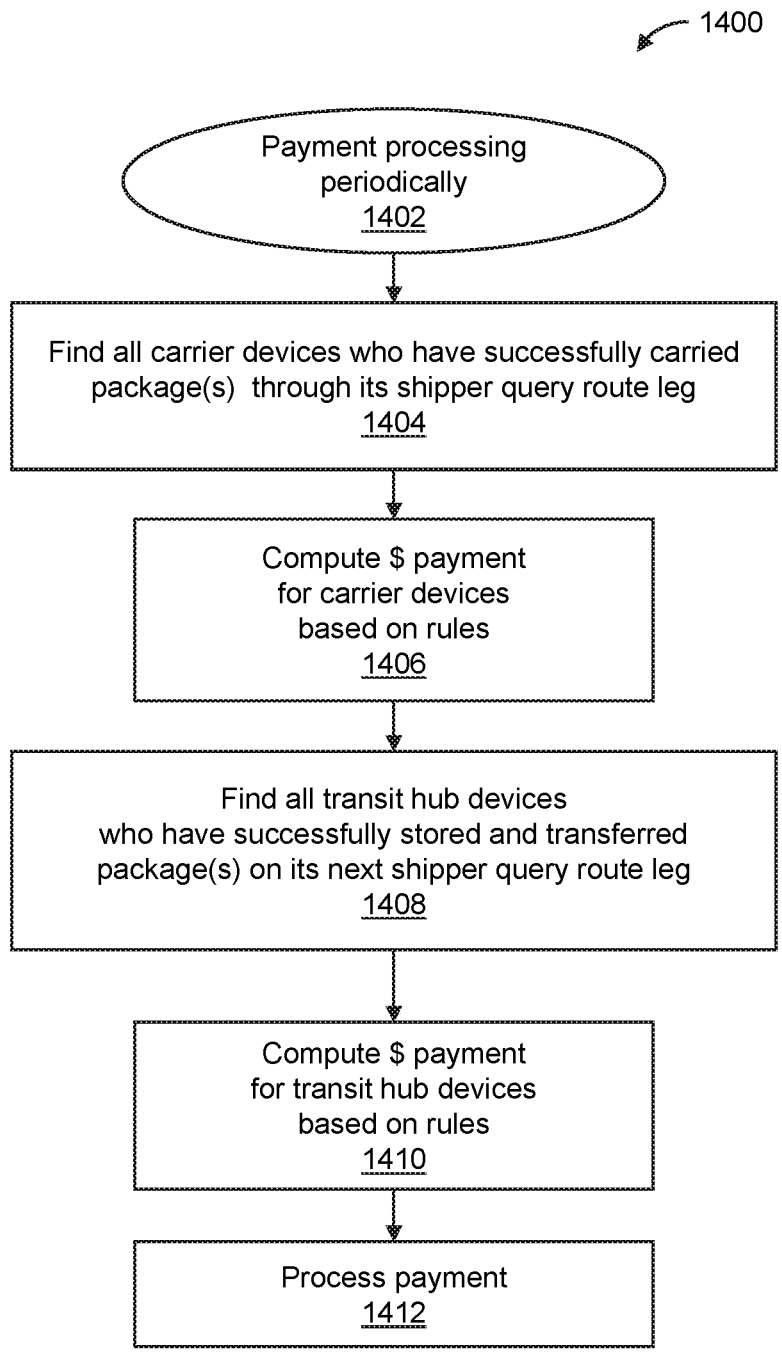
FIG. 22 illustrates a flow diagram of a method of payment processing, according to an embodiment.

FIG. 22 illustrates a flow diagram of a method of payment processing 1400, according to an embodiment. The method of payment processing 1400 of the billing/payments module 135 proceeds payments of the carrier devices 182 and transit hub devices 183. This method of payment processing 1400 executes periodically at block 1402 in the billing/payments module 135 of the application server 110, for example once every day for an embodiment or once a week.

At block 1404, the method of payment processing 1400 finds all carrier devices 182 that have successfully carried one or more packages through their shipper query route legs since last execution of this method. At block 1406, the billing/payments module 135 computes a payment for a carrier device 182 that has recorded successfully carrying one or more packages through one or more shipper query route legs assigned to the carrier device based on rules.

In an embodiment, an example rule would be to compute payment based on distance of the package carried on a shipper query route leg. Another rule is based on the dimension, weight, value, and fragility of the package carried on a shipper query route leg. A rule may compute a payment applicable to a carrier device 182 based on bulk capacity offered on a carrier trip for carrying shipments. In an embodiment, the bulk capacity of a carrier device 182 is the total volume, weight, and/or value that can be carried by the carrier device 182. A rule may compute a payment to a carrier device 182 identified as a regular carrier based on its zone of operation. The rules may comprise at least one of statistical methods, artificial neural networks, stochastic methods, and artificial intelligence techniques such as machine learning. For example, a neural network can be used to take input based on fragility, value, weight, and dimensions of a package carried along a shipper query route leg. The output could be a factor in the payment due to a carrier device 182. Another recurrent neural network could be used to take distance and time of each shipper query route leg and give an output factor that can be used in computation of payment. A method of semi-supervised machine learning can be used to keep memory of estimated payments and their weights. This can be used for applying similar "weights" to future payments.

At block 1408, the method of payment processing 1400 finds all transit hub devices 183 that have successfully stored and transferred one or more packages onto their onward journey since last execution of this method. At block 1410, the method of payment processing 1400 computes a payment for a transit hub device 183 that has successfully stored and transferred one or more packages on an onward journey based on rules.

In an embodiment, an example rule would compute payment based on the dimension, weight, value, and fragility of the package. Another rule is based on the late-night pick-up or drop-off time. Another rule may compute a payment applicable to a transit hub device based on bulk capacity offered by a transit hub device 182 for storing shipments based on rules. In an embodiment, the bulk capacity of a transit hub device 182 is the total volume, weight, value that can be handled and stored. A rule may compute a payment applicable to a transit hub device 182 identified as a mobile transit hub device 182 based on its zone of operation. The rules may comprise at least one of statistical methods, artificial neural networks, stochastic methods, and machine learning.

For example, a neural network can be used to take input based on total volume×weight of packages stored at the location of the transit hub device 182. The output could be a factor in the payment due to the transit hub device 182. Another neural network could be used to take distance and time of travel by a mobile transit hub device 182 and give an output factor that can be used in computation of payment. A method of semi-supervised machine learning can be used to keep memory of estimated payments and their weights. This can be used for applying similar "weights" to future payments.

The data from estimated payments to carrier devices 182 and transit hub devices 183 can serve as input or learning to one or more supervised, semi-supervised, or unsupervised machine learning methods that can be used for shipping estimates in the future. The system 100 may have multiple carriers, multiple transit hubs, mobile transit hubs, and/or shipper/receiver devices as carriers for a given shipment. Such a complex, dynamic, evolving system 100, needs intensive computing and machine learning to function. Machine learning from payment estimation of each shipper query route leg due to carrier devices 182 and transit hub devices 183 is useful for shipment estimation in system 100. This is not required for traditional delivery services because the dedicated fleet has predictable costs. In the case of system 100, there is no predictability of the route a package will take, carrier devices involved, transit hub devices involved, and transfers enroute.

At block 1412, payments for every carrier device 182 and transit hub device 183 are processed by the method of payment processing 1400 of the billing/payments module 135. The billing/payments module 135 communicates with the payment gateway 190 to obtain payments from the user devices 180 from which payment is due, sends payments to the user devices 180 to which payment is due, and stores sensitive user information obtained from the user devices 180 in communication with the payment gateway 190. The payment gateway 190 may store sensitive user information obtained from the user devices 180 such as credit card information and banking information. The billing/payments module 135 thereby facilitates payments using the payment gateway 190.

In an embodiment, one or more payment rules dynamically computes payments of carrier devices 182 and transit hub devices 183 based on supply and demand. This could be based on, but not limited to, number, size, weight, value, fragility of packages becoming available at a given time or zone of operation, traffic/weather conditions and/or unforeseen conditions. This could also be based on, but not limited to, stressed demand on carrier devices or transit hub devices due to increasing shipping queries or due to traffic/weather conditions. The billing/payments module 135 apply rules comprising at least one of statistical methods, artificial neural networks, stochastic methods, and machine learning.

Figure 23:
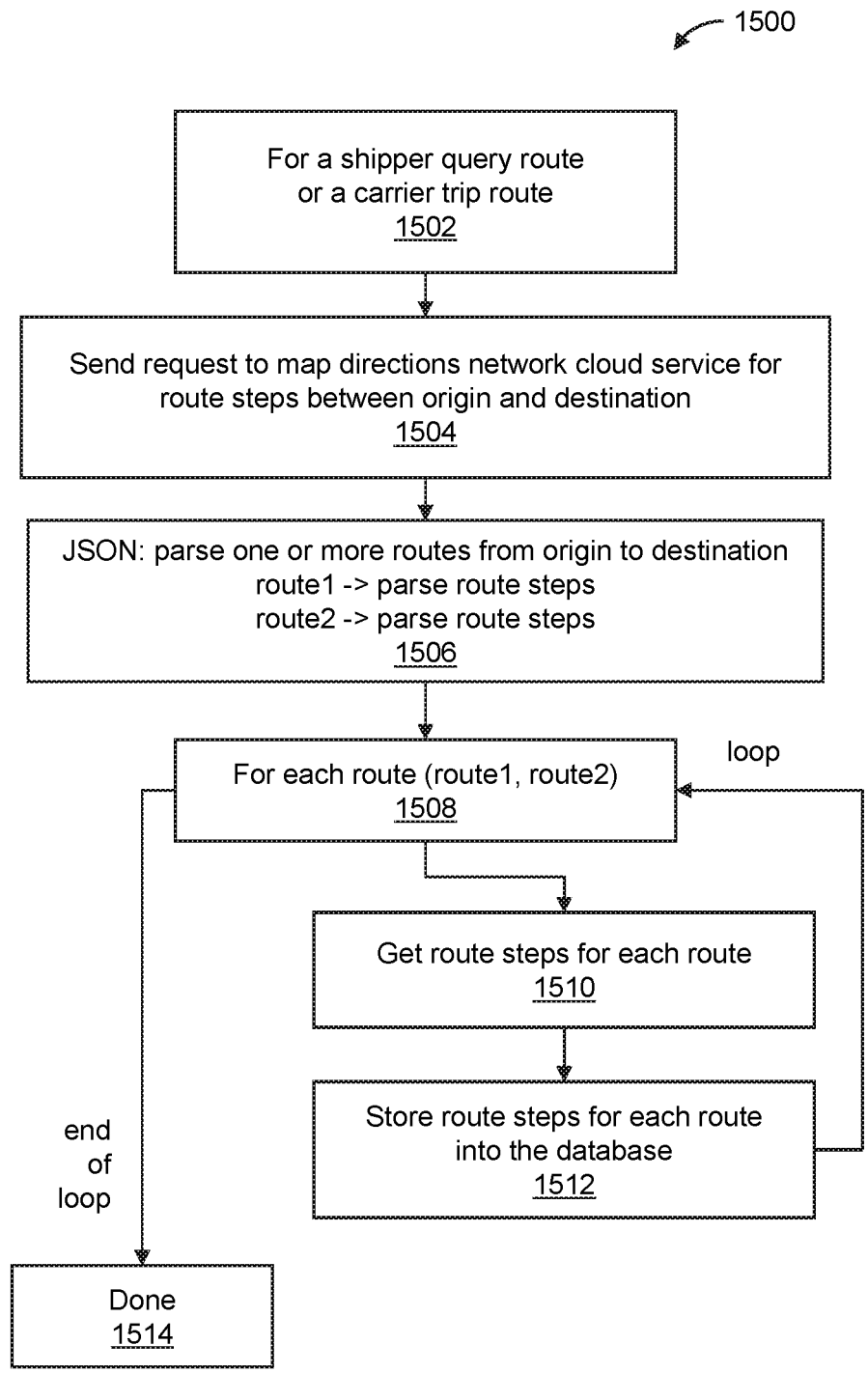
FIG. 23 illustrates a flow diagram of a method of obtaining routes and associated route steps, according to an embodiment.

FIG. 23 illustrates a flow diagram of a method of obtaining routes and associated route steps 1500, according to an embodiment. At block 1502, the journey taken by every shipper query of a shipper device 181 or carrier trip of a carrier device 182 between its origin and destination address (both at transit nodes) can take one or more "routes" and each "route" can be further divided into "associated route steps". At block 1504, the routes and associated route steps for each of the one or more routes are requested, and then responses are obtained from one or more network cloud mapping services, such as Google™ or Apple™ maps, over the network 160.

Each route can be divided into associated route steps, based on but not limited to, a mix of several methods: (1) path of travel, for example: left or right turns on streets, freeway exits, transition from urban to rural route, transition from a slow street to a freeway, walkways, bicycle routes; (2) by dividing the map into a grid of squares, for example 250 meters×250 meters, and then one or more parts of the route falling inside such a square is determined to be an associated route step; and (3) based on distance or time traveled on a path, for example, a step for every 10 kms traveled on a freeway or every 15 mins traveled on a highway. An associated route step can be common to two or more routes.

The shipping module 131 and carrier module 132 determine one or more routes that are available for a shipper query of a shipper device 181 or carrier trip of a carrier device 182 respectively from origin to destination. The shipping module 131 and carrier module 132 compute route steps for a route based on route division, the route division comprising at least one of change in travel path, grid of squares on a map, travel distance, travel time, and rules.

Method 1500 advantageously divides a route into associated route steps. The route is broken down into smaller, atomic steps that can be used to compute whether a carrier trip can carry a part or all of the shipper query route. The division of the route into route steps is a fine balancing act. On the one hand, the route steps should not be too small to make the computation of shipper query route legs cumbersome. On the other hand, the route steps should not be so large that they make carry trips inefficient.

In embodiments, a mix of one or more methods is used for route division. A modular neural network with one or more intermediary neural network acting on variety of methods of route division can be used to get the best suited route division for a particular route. One or more semi-supervised or unsupervised machine learning methods can be used to keep 'deep' memory of route steps actually chosen and traveled, along with their distance, time, delays, and diversions. The learning so achieved can be used to choose the most efficient granularity of route steps, one or more methods of division, and avoidance of delays and inefficiencies in the routing process.

In an embodiment, the shipping module 131 and carrier module 132 may apply rules comprising at least one of statistical methods, artificial neural networks, stochastic methods, and artificial intelligence techniques such as machine learning. One or more requests can be made for one or more routes between origin and destination by the application server 110 via its modules to the network cloud mapping service based on but not limited to rules of route division, mode of travel, and diversions desired (e.g., to avoid traffic congestion). The requests can be nested such that one or more further requests can be formulated based on computation of one or more responses, that is, data (e.g., a JSON response) obtained from the network cloud mapping service for one or more such requests. The application server 110 via its modules thus divides a route into route steps by formulating one or more requests and nesting further requests by computation of responses received based on at least rules of route division and granularity of route steps. One or more requests can be formulated for one or more parts or the entirety of the route from origin to destination. One or more requests and their responses can be used as input for computation of division of only a part of or the entirety of the one or more routes between origin and destination. One or more route steps for a route are iteratively computed based on subdividing the route into route steps and then further subdividing those one or more route steps into one or more smaller, granular, atomic route steps to obtain the desired level of granularity of route division. The shipping module 131 and carrier module 132 compute one or more route steps that can be common to shipper query routes of the shipper devices 181 or carrier trip routes of the carrier devices 182. This is advantageous for the system 100 via carrier module 132 to select common carrier trip route steps to carry multiple shipper query route steps. This lets a carrier trip carry multiple packages on the common route steps, hence increasing efficiency of system 100.

At block 1506, one or more routes and then associated route steps for each of one or more routes in JSON format (as exemplified below) are obtained by shipping module 131 and carrier module 132 from cloud mapping services on the network 160. One or more requests can be formulated for one or more parts or the entirety of the route from origin to destination, and the responses obtained (e.g., in JSON format) can be used as input for formulating further nested requests to the network cloud mapping services for further division of the route into route steps until desired granularity is achieved based on rules. The exemplary pseudocode below illustrates such nested requests.

```
"routes": [ {
    "route1": [ {
                    "route steps": [ {
                        "travel_mode": "DRIVING",
                        "start_location": {
                            "lat": 41.8507300,
                            "lng": -87.6512600
                        },
                        "end_location": {
                            "lat": 41.8525800,
                            "lng": -87.6514100
                        },
                        "duration": {
                            "value": 19,
                            "text": "1 min"
                        },
                        "distance": {
                            "value": 207,
                            "text": "0.1 mi"
                        }
                    },
                    ...
                    ... additional steps of this route
                    ...]},
                ]},
        ...
        ... alternative routes of this journey
        ...]},
]}
```

In the above exemplary pseudocode, the application server 110 via its modules to the network cloud mapping service sends a request over the network 160. The request includes input parameters that include mode of travel (e.g., driving, walking, ferry, snowmobile, bicycling), origin and destination locations, and the route to be taken (including, for example, street addresses, latitude, longitude, landmarks such as a shopping mall or parking lot, highway rest areas, and additional options such as avoiding highways or avoiding construction zones). The route, for which origin and destination locations are provided, in this request can be one or more parts of or the entirety of a shipper query route or carrier trip route. This request is sent to the network cloud mapping service in a JSON format. The network cloud mapping service response is received in a JSON format as follows. The response received from the network cloud mapping service includes one or more routes (route1, route2, . . . ) with associated route steps (route step 1, route step 2, . . . ) for each of the routes (route1, route2, . . . ). Each route (route1, route2, . . . ) is subdivided into associated route steps. Each associated route step includes mode of travel (e.g., driving), latitude, longitude, street address of start_location and end_location, estimated distance of travel (e.g., miles), and estimated duration of travel (e.g., 1 min on the road). Each such associated route step (route step 1, route step 2, . . . ) divides one or more routes (route1, route2, . . . ) of the requested route into smaller steps. The application server 110 via its modules can further use one or more route steps (route step 1, route step 2, . . . ) as input to formulate new requests to further subdivide the route into smaller steps. This iterative subdivision of a requested route into one or more routes and then associated route steps is done until the desired level of granularity is achieved.

The data of every route at block 1508 and every associated route step at block 1510 in the route including, but not limited to, mode of travel (including driving, walking, bicycling, skateboarding, on a ferry), start and end location, estimated transit time, and estimated travel distance are stored into the database 150 at block 1512.

Figure 24:
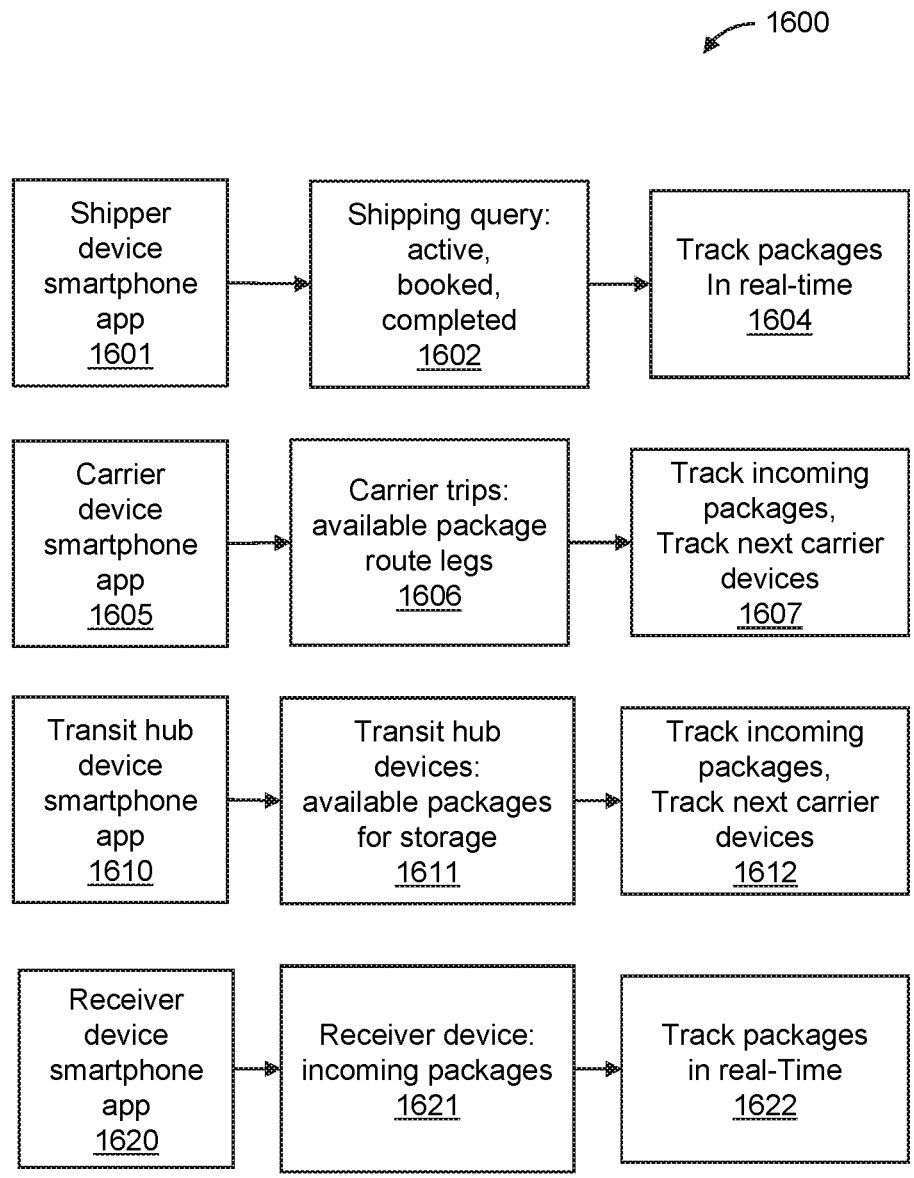
FIG. 24 illustrates a flow diagram of a method of managing user device designations, according to an embodiment.

FIG. 24 illustrates a flow diagram of a method of managing user device designations 1600, according to an embodiment. At block 1601, a shipper device 181 uses the user interface of its smartphone app 170 to retrieve shipping queries at block 1602 from the shipping module 131. The user interface of the smartphone app 170 displays the status of one or more selected shipper query routes. At block 1604, the package routing module 134 provides the user interface of the smartphone app 170 of a shipper device 181, in communication with the shipping module 131, with real-time package positions, estimated pick-up and drop-off times, locations, and carrier information for package pick-up, drop-off, and handover.

At block 1605, a carrier device 182 uses the user interface of its smartphone app 170 to retrieve its upcoming carrier trips from the application server 110. At block 1606, the carrier module 132 provides the user interface of the smartphone app 170 of a carrier device 182 with available shipper query route legs to carry on trips and an estimate for payment. The user interface of the smartphone app 170 can display this information for the carrier device 182.

At block 1607, the package routing module 134 provides the user interface of the smartphone app of a carrier device 182, in communication with the carrier module 132, with real-time package positions, estimated pick-up and drop-off times, locations, and carrier information for package pick-up, drop-off, and handover at a transit node.

At block 1610, a transit hub device 183 uses the user interface of its smartphone app 170 to retrieve data from the application server 110. At block 1611, the transit hub module 133 provides the user interface of the smartphone app 170 of a transit hub device 183 with incoming packages for storage and an estimate for payment based on rules. The smartphone app 170 can display this information on the transit hub device 183.

At block 1607, the package routing module 134 provides the user interface of the smartphone app 170 of a transit hub device 183, in communication with the transit hub module 133, with real-time package positions, estimated pick-up and drop-off times, and carrier information for package pick-up, drop-off, and handover at a transit node.

At block 1620, a receiver device 184 uses the user interface of its smartphone app 170 to retrieve data from the application server 110. At block 1621, the package routing module 134 provides a receiver device 184 with incoming packages to be delivered. The user interface of the smartphone app 170 can display this information on the receiver device 184.

At block 1607, the package routing module 134 provides the user interface of the smartphone app 170 of a receiver device 184, with real-time package positions, estimated drop-off times, locations, and carrier information for package pick-up, drop-off, and handover at a transit node.

Figure 25:
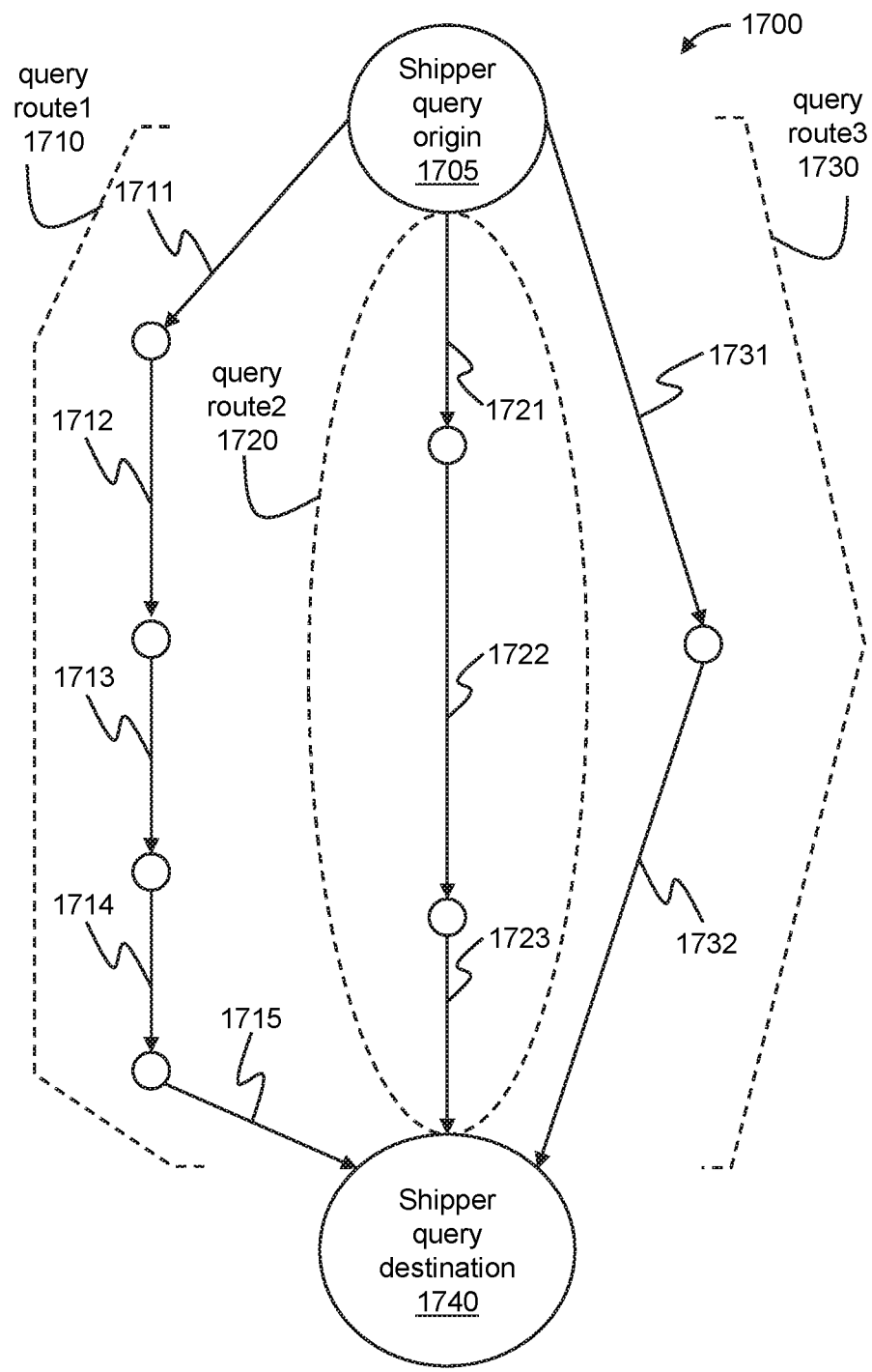
FIG. 25 illustrates shipper query routes and associated shipper query route steps in a shipper query, according to an embodiment.

FIG. 25 illustrates shipper query routes and associated shipper query route steps in a shipper query 1700, according to an embodiment. There may be one or more alternative shipper query routes, route1 1710, route2 1720, route3 1730 of a shipper query from its origin 1705 to its destination 1740. Each alternative shipper query route (route1 1710, route2 1720, route3 1730) is divided into one or more associated route steps for every shipper query route (route1 step1 1711, route1 step2 1712, . . . , route1 step5 1715), (route2 step1 1721, route2 step2 1722, route2 step3 1723), (route3 step1 1731, route3 step2 1732). The final journey taken by the shipper query can be one of these routes (route1 1710, route2 1720, or route3 1730).

Figure 26:
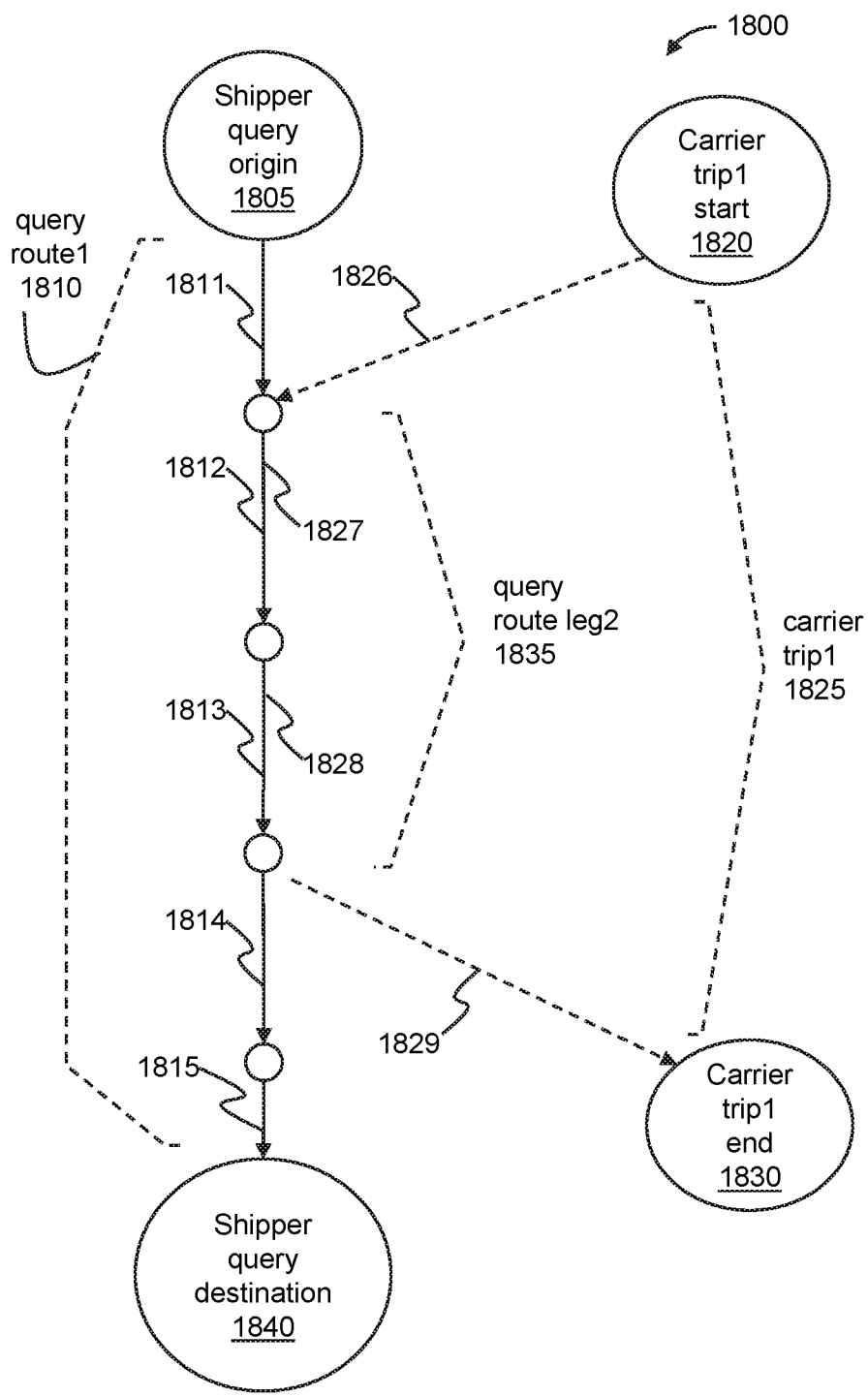
FIG. 26 illustrates a shipper query route leg, according to an embodiment.

FIG. 26 illustrates a shipper query route leg 1800, according to an embodiment. For a given shipper query with origin 1805 and destination 1840, query route 1 1810 is computed to be one of the alternative routes available by shipping module 131. The shipper query route 1 1810 is divided into associated route steps 1 1811, 2 1812, to 5 1815.

The carrier module 132 has computed that carrier trip 1 1825 has route steps 2 1827 and 3 1828, that are available to carry shipper query route steps 2 1812 and 3 1813 of shipper query route 1 1810. Hence shipper query route 1 1810 steps 2 1812 and 3 1813 are combined to form a "shipper query route leg" 2 1835, starting at shipper query route step 2's 1812 starting point and ending at step 3's 1813 ending point. The carrier trip 1 1825 has diversions 1826 and 1829 from pick-up and drop-off points (transit nodes) of shipper query route leg 2 1835 and its carrier trip1 1825 start 1820 and end points 1830 respectively.

Figure 27:
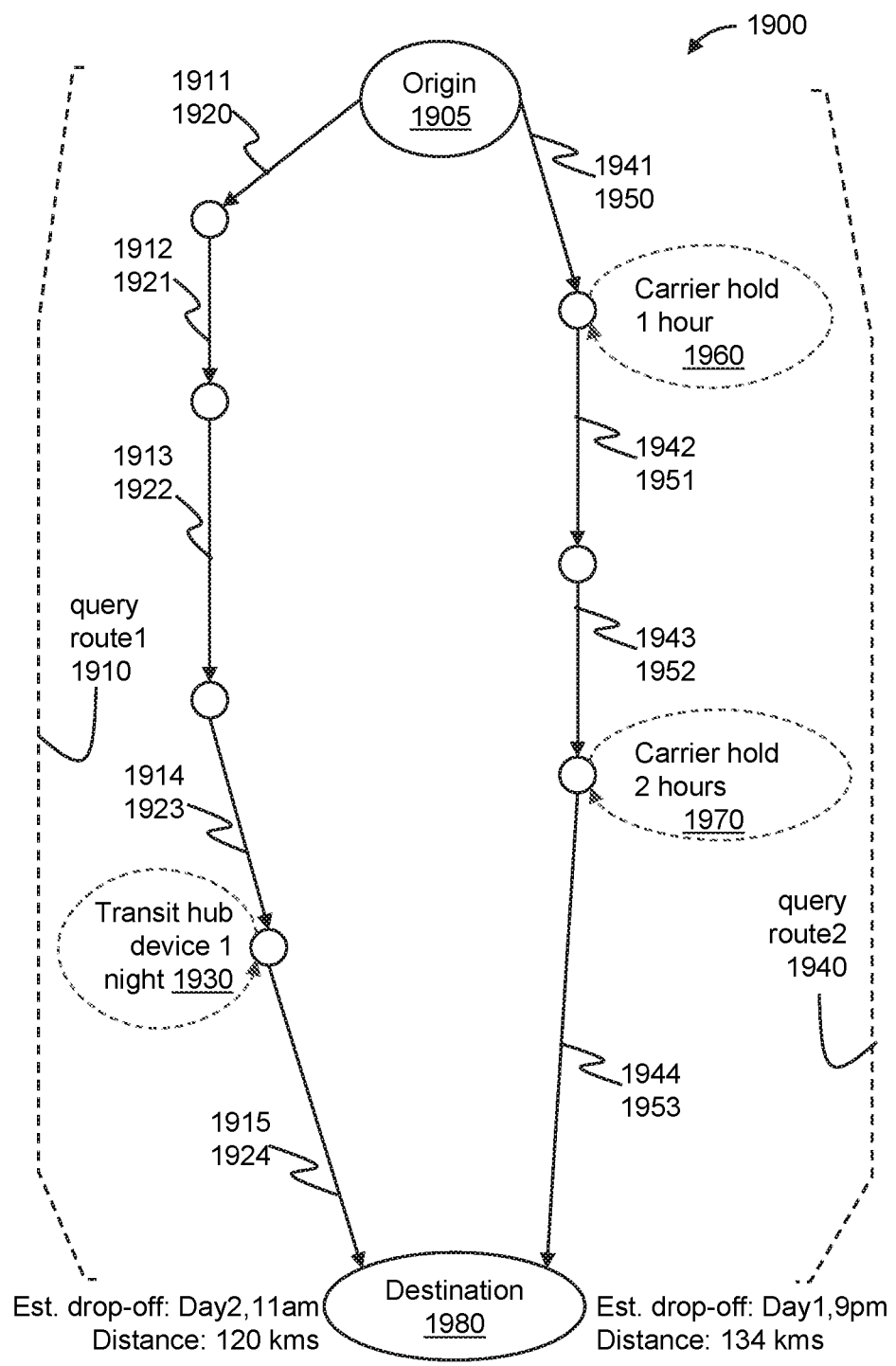
FIG. 27 illustrates shipper query route legs, according to an embodiment.

FIG. 27 illustrates shipper query route legs 1900, according to an embodiment. As an example, for a given shipper query from origin 1905 to destination 1980, shipper query route 1 1910 and shipper query route 2 1940 are computed to be two of the alternative routes available by shipping module 131. The carrier module 132 has computed that carrier trip routes 1 1920 to 5 1925 from distinct carrier devices, are available to carry the shipper query route 1 1910 from its origin 1905 to its destination 1980. Each carrier trip route is assigned to a distinct shipper query route leg 1 1911 to 5 1915 of shipper query route 1 1910. The transit hub module 133, has computed that the end of shipper query route step of shipper query route leg 4 1914 needs storage for 1 night that is available with transit hub device 1 1930. Shipper query route 1 1910 is estimated to arrive at destination 1980 on Day 2 at 11 am after traveling an estimated distance of 120 kms.

The carrier module 132 has computed that carrier trip routes 10 1950, 15 1951, 65 1952 and 89 1953 from distinct carrier devices, are available to carry the alternative shipper query route 2 1940 from its origin 1905 to its destination 1980. Each carrier trip route is assigned to a distinct shipper query route leg 1 1941 to 3 1943 of shipper query route 2 1940. During the handover of shipper query route 2 1940 leg 1 1941 and leg 2 1942, at block 1960, it is shown that carrier trip 15 1951 needs to "carrier hold" the package for 1 hour. At block 1970, carrier trip 89 1953, needs to "carrier hold" the package for 2 hours. Shipper query route 2 1940 is estimated to arrive on Day 1 at 9 pm after traveling an estimated distance of 134 kms.

The shipping module 131, has updated status as booked for both shipper query route 1 1910 and shipper query route 2 1940. Hence both shipper query routes are available for selection.

In an embodiment, the shipping module 131 obtains from the user interface of the smartphone app 170 of a shipper device 181 a selection of one of the plurality of booked shipper query routes. For example: the shipper device can select the quicker shipper query route 2 1940 instead of shipper query route 1 1910. Hence the shipping module 131 facilitates the shipper device's 181 to select package routes. In an embodiment, the shipping module 131, determines an original best route from the plurality of booked shipper query routes of one or more shipper devices 181 based on rules. The rules comprise at least one of statistical methods, artificial neural networks, stochastic methods, and artificial intelligence techniques such as machine learning. In an embodiment, the shipping module 131, can decide the best route based on pre-selection of parameters from the shipper query such as drop-off time flexibility for receiver device 184, driving distance and/or travel time, package insurance availability and cost, perishable nature of one or more items carried in the package, fragility, value of the package.

In an embodiment, the shipping module 131 determines the best route based on output of a semi-supervised or unsupervised machine learning method that keeps track of shipper queries that have taken similar or same shipper query route legs. Traffic delays, carrier devices, and number of transit hops in the package route can all be factors that can be input to unsupervised machine learning methods that result in selecting the fastest and/or most economical shipper query route. Intensive computing or machine learning is not required for traditional delivery services because the dedicated fleet and logistics network is quite predictable. In the case of system 100, there is typically no predictability of the final route for a package, the carrier devices 182 involved, the transit hub devices 183 involved, and the transfers made enroute. Keeping track of these dynamic, evolving conditions is only possible with intensive computing and machine learning resources.

In an embodiment, even though a route has been previously booked and selected for a shipper query, the shipping module 131 periodically computes and offers a better shipper query route for the shipper query of shipper devices 181, based at least in part on newly available carriers trips routes of carrier devices 182, newly available transit hubs of transit hub devices 183, shipper query routes of shipper devices 181, and rules. If a better route is found and selected, then the previously selected route is dropped. This dynamism may result in the most efficient logistics. These dynamic, evolving conditions is only possible with intensive computing and machine learning resources.

Figure 28:
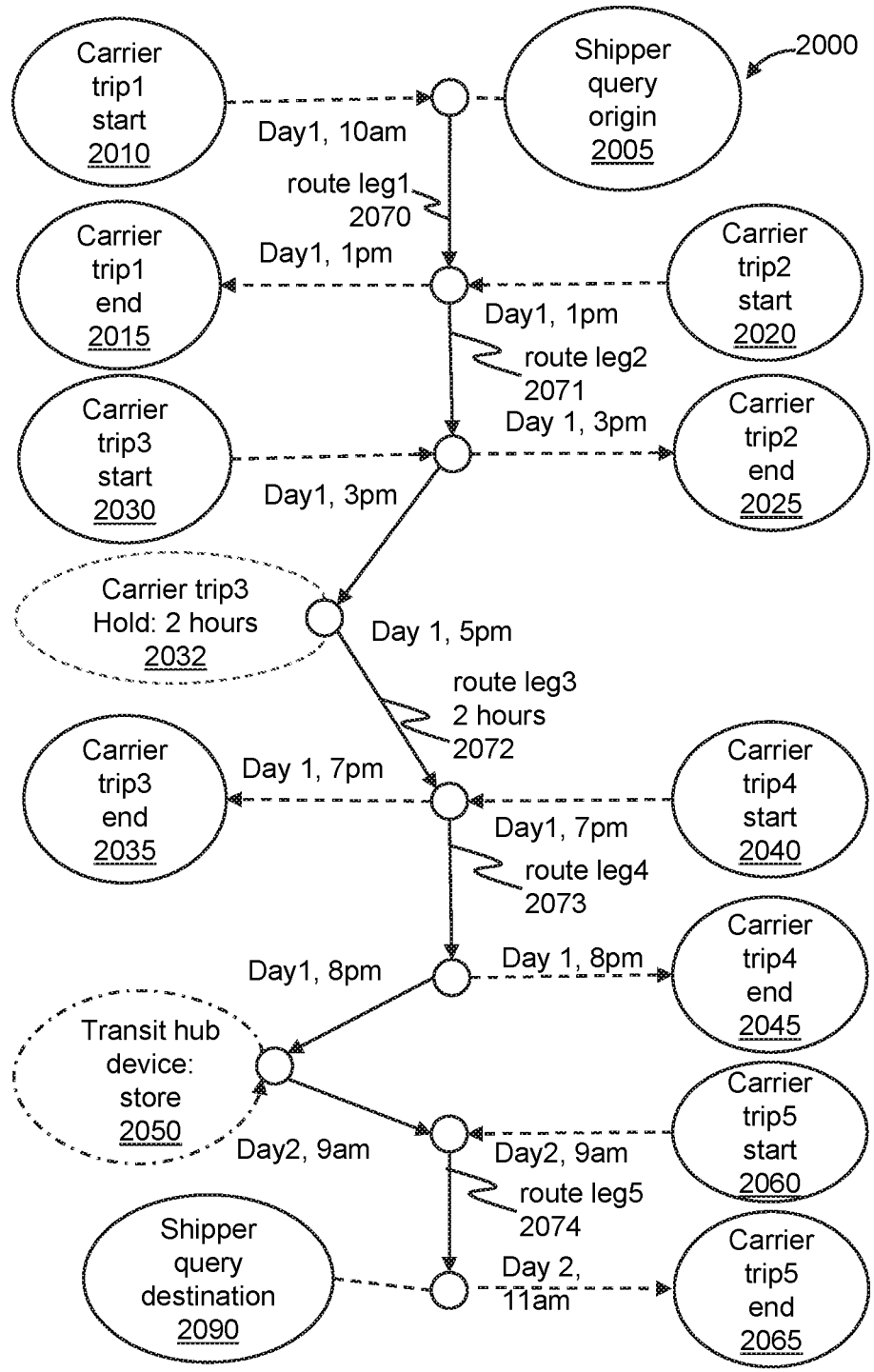
FIG. 28 illustrates a package journey, according to an embodiment.

FIG. 28 illustrates an actual package journey 2000, according to an embodiment. The shipper query from origin 2005 to destination 2090, is carried on shipper query route leg 1 2070 by carrier trip route 1 2010, shipper query route leg 2 2071 on carrier trip route 2 2020. It is determined by the carrier module 132, that the estimated travel time for shipper query route leg 3 2072 is 2 hours, but the estimated time difference between end of leg 2 2071 (3 pm) and end of leg 3 2072 (7 pm) is 4 hours. The carrier trip3 2030 has a flexibility of 2 hours, so the package is expected to be picked up by carrier trip route 3 2035 at 3 pm and "carrier hold" at block 2032 for 2 hours before or during the journey and then carried for 2 hours through shipper query route leg3 2072 for drop-off at 7 pm.

This "carrier hold" at block 2032 falls within the flexibility of time for that carrier trip route 3 2072 and hence a transit hub device is not determined to be needed for this package at the end of shipper query route leg 2 2071. The carrier module 132 computes and communicates a carrier hold time for a shipper query route leg carried on a carrier trip route of a carrier device 182 and availability of the carrier trip route of the carrier device 182. The "carrier hold" can be before starting on the shipper query route leg 3 2072, during, or at the end of the shipper query route leg by the carrier trip route 3 2030, depending on the flexibility of the carrier device 182 and/or as determined by the carrier module 132 or package routing module 134. This carrier hold eliminates the need of storage at a transit hub device 183 and handling of the package while being handed over from one carrier device 182 to another.

The carrier module 132, and hence the application server 110, gives priority to identifying a next carrier device 182 with a possibility of carrier hold that can eliminate storage at a transit hub device 183 for every shipper query route leg of a shipper device 181 with a carrier-to-carrier direct transfer of a package. This carrier-to-carrier direct transfer of a package without enroute storage makes the logistics more efficient.

The package arrives at the end of shipper query route leg 4 2073 at 8 pm, but the next carrier trip route 5 2060 is available for pick-up for shipper query route leg 5 2074 at 9 am the next day. This 13 hour difference does not fall within the flexibility of carrier trip 5 2060 or carrier trip 4 2040. Hence the transit hub module 133 determines that storage is needed at an available transit hub device at the end of shipper query route leg 4 2073 at block 2050.

As shown in FIG. 28, the package is carried between carrier trips routes 1 2070, 2 2071, 3 2072, and 4 2073 (i.e., between at least two carrier devices 182) without the need of a transit hub device 183. Thus, the carrier module 132 computes and coordinates a carrier-to-carrier direct transfer of a package from a first one or more carrier trip routes of carrier devices 182 to a next one or more carrier trip routes of carrier devices 182 without intermediate storage with a transit hub device 183. The carrier module 132, and hence the application server 110, gives priority to eliminating the need of storage at a transit hub device 183 for every shipper query route leg of a shipper device 181 by identifying the next one or more carrier devices 182 in the carrier-to-carrier direct transfer of the package. This advantageously eliminates the need of storage, handling, pick-up, and drop-off enroute. This results in efficient routing of the package.

When needed as determined by the transit hub module 133, a package is stored at a transit hub device 183, as shown in block 2050.

Figure 29:
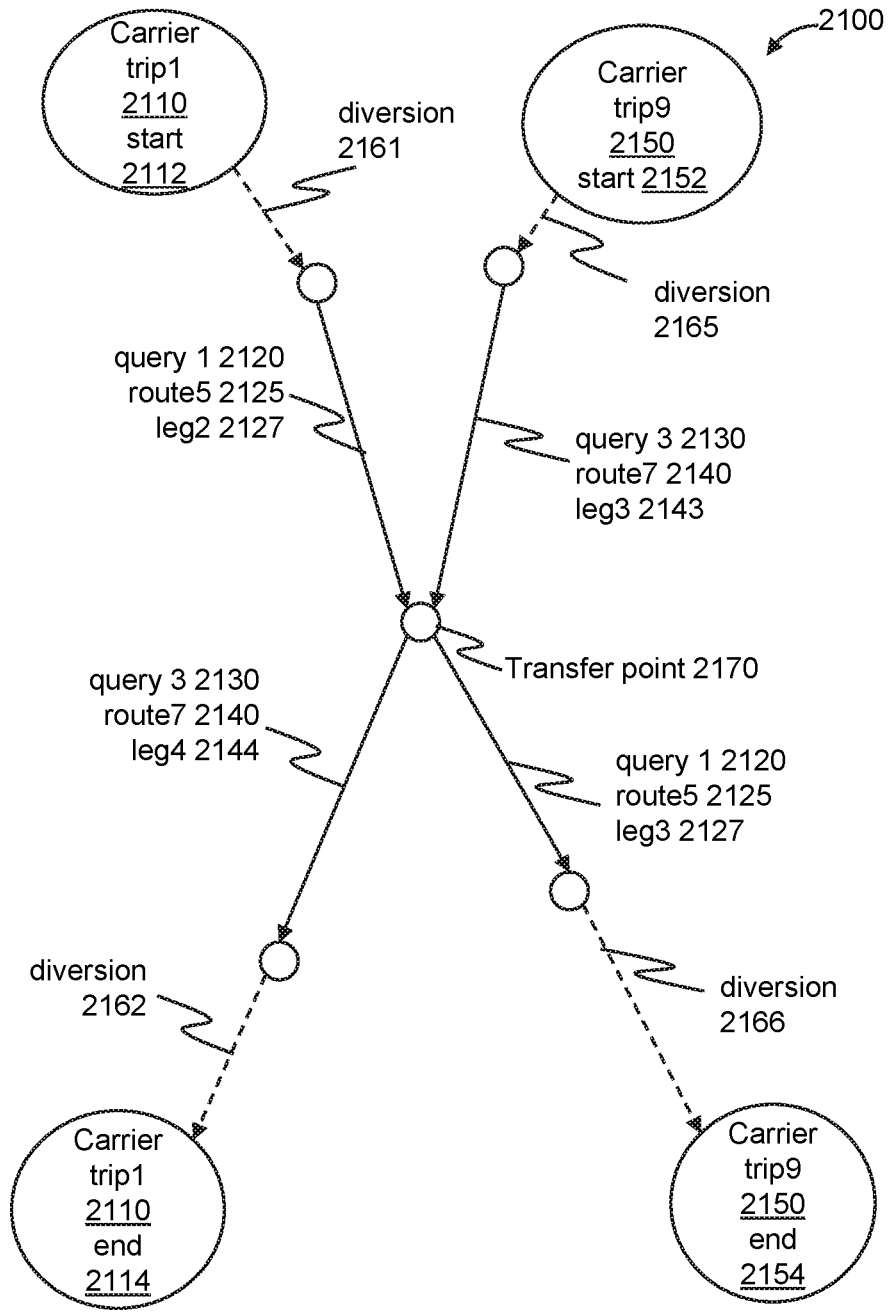
FIG. 29 illustrates a multi-way exchange of packages between carrier devices, according to an embodiment.

FIG. 29 illustrates a multi-way exchange of packages between carrier devices 2100, according to an embodiment. Two or more carrier devices on their independent carrier trips, particularly carrier trip route 1 2110 and carrier trip route 9 2150, exchange one or more packages at a transfer point 2170. The transfer point 2170 is computed by the package routing module 134 in communication with the carrier module 132, while computing the carrier trip routes that can carry independent shipper query 1 2120 and shipper query 3 2130 respectively. A package carried on shipper query 1 2120 is handed over by carrier trip route 1 2110 to carrier trip route 9 2150 at the transfer point 2170. So is the package carried on shipper query 3 2130, by carrier trip 9 2150 to shipper query 1 2120. The diversion 2161 is the distance that the carrier trip 1 2110 has to travel from its carrier trip start point 2112 to the pick-up point of shipper query 1 2120 route 5 2125 leg 2 2127. Similarly, so is diversion 2165 of carrier trip 9 2150. The carrier trip 1 2110 and carrier trip 9 2150 respectively have diversions 2162 and 2166 from the drop-off points of shipper query 3 2130 route 7 2140 leg 4 2144 and shipper query 1 2120 route 5 2125 leg 3 2127 query to their trip end points 2114 and 2154.

An embodiment provides that the carrier module 132 computes and coordinates a multi-way exchange of two or more packages between two or more carrier trip routes of carrier devices 182 without intermediate storage at a transit hub device 183. This advantageously makes the package routing most efficient and flexible.

In an embodiment, the package routing module 134 in communication with the carrier module 132 computes the position of transfer point 2170 for at least two carrier devices 182 involved in a carrier-to-carrier direct transfer or multi-way exchange based on rules, the rules comprising at least one of statistical methods, artificial neural networks, stochastic methods, and artificial intelligence techniques such as machine learning. The transfer point is computed based on a safe, available, near points between the one or more carrier routes involved in the exchange of one or more packages within the diversion limits of the carrier trips. The transfer point can be, but not limited to a street corner strip parking lot, curbside, shopping mall parking lot, freeway exit rest area and bicycle route. A carrier device 182 which is involved in carrying the package on a walking path can use a pedestrian walkway for exchanging packages with another carrier device 182 on a walking path.

In an embodiment, the transfer point is determined based on the output of a semi-supervised machine learning method that takes input from data of previous safe transfer points in the vicinity and helps compute the most efficient transfer point. The criteria could be fastest handover, least busy curbside, in a public parking area, time of transfer like evening, or late night. A modular neural network can be applied to decisions based on several factors like crime reports in the area, diversion from carrier trips, and carrier hold time.

In an embodiment, the package routing module 134 in communication with the carrier module 132, using methods above and real-time GPS tracking of the carrier devices 182, dynamically calculates the position of the transfer point in real-time so that there is zero or close to zero wait time for two or more carrier devices 182 involved in a carrier-to-carrier direct transfer or multi-way exchange. The transfer point is adjusted based on real-time positions of carrier devices 182, traffic information, distance, and time of travel of each carrier device 182 to the transfer point. This leads to the most efficient carrier-to-carrier direct or multi-way exchange of packages.

In embodiments, system 100 achieves zero or close to zero wait time for every pick-up and drop-off point of the package journey, including at origin and destination. This requires enormous amounts of real-time tracking, computing, and calculation. This is not required for traditional delivery services because they have predictable trips of their fleet and holding at their warehouses. In system 100, the efficiency comes from zero wait time or least possible wait time between package transit hops.

The carrier module 132, and hence the application server 110, gives priority to identifying two or more next carrier devices 182 that can eliminate storage at a transit hub device 183 for every shipper query route leg of a shipper device 181 with a multi-way exchange of packages between carrier devices 182. This multi-way exchange of packages without enroute storage makes the logistics more efficient. The package may be held by one or more carrier devices 182 by means of a "carrier hold" at the transfer point 2170 while awaiting the next carrier device 182.

Figure 30:
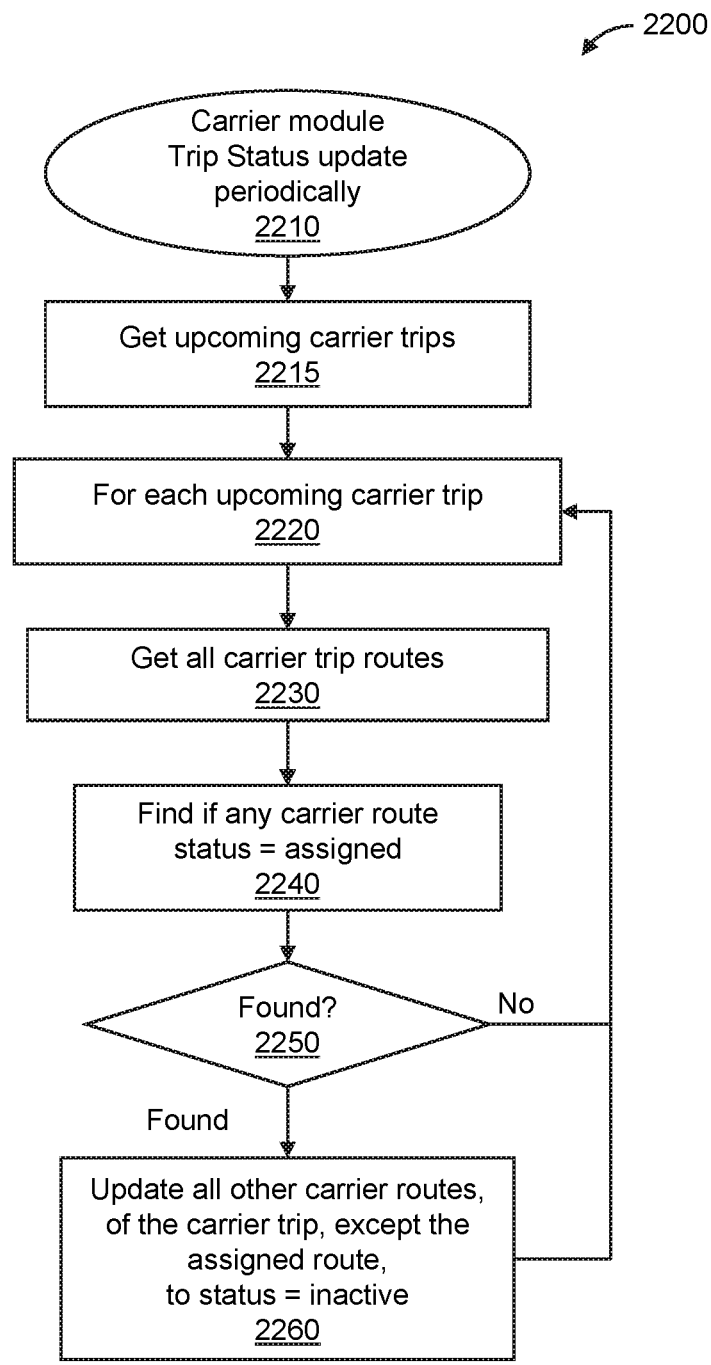
FIG. 30 illustrates a flow diagram of a method to update carrier trip status, according to an embodiment.

FIG. 30 illustrates a flow diagram of a method to update carrier trip status 2200, according to an embodiment. This method 2200 executes periodically 2210, for example once every 5 seconds for an embodiment.

At block 2215, the carrier module 132 retrieves all upcoming carrier trips from the database 150. Each upcoming carrier trip is processed at block 2220. At block 2230, the carrier module 132 retrieves all carrier trip routes for this carrier trip from the database 150.

At block 2240, the carrier module 132 checks if any carrier trip route has status "assigned" i.e. is carrying a "booked" shipper query through one of its shipper query route legs. At block 2250, the carrier module 132 can proceed in one of two ways. If no carrier trip route is found to have status "assigned", then the carrier trip is left as active in the database 150.

For an embodiment, if a carrier trip route has status "assigned", then block 2260, the carrier module 132 updates the status of all other carrier trip routes of this carrier trip to "inactive". In an embodiment, only one route will be chosen or assigned for carrying other upcoming shipper queries.

In another embodiment, instead of removing alternative carrier trip routes for a carrier trip from being selected any further, the carrier module 132 dynamically computes, selects, and updates a most efficient carrier trip route among all the carrier trip routes of one or more carrier devices 182 that are available, including newly available carrier trip routes of carrier devices 182, for all available shipper query route steps of shipper devices 181 based on rules. The rules comprising at least one of statistical methods, artificial neural networks, stochastic methods, and artificial intelligence techniques such as machine learning.

Figure 31:
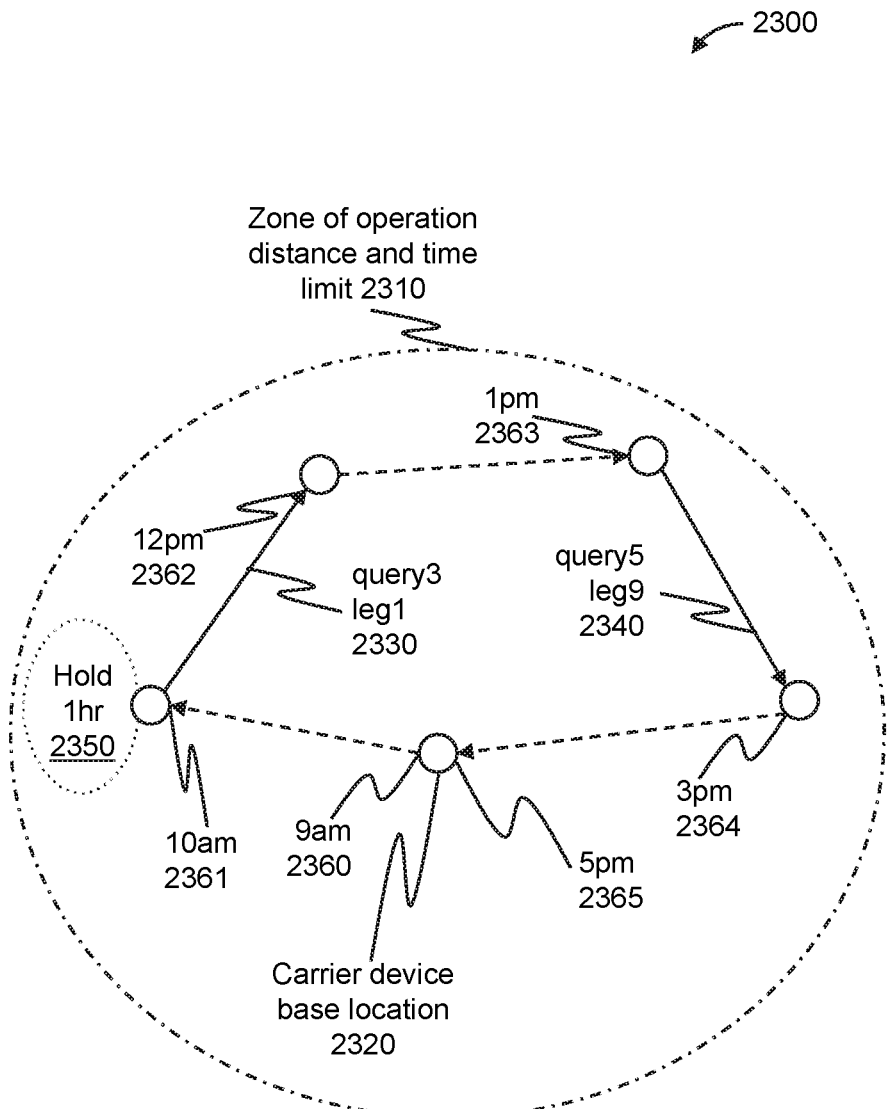
FIG. 31 illustrates a zone of operation of a regular carrier device, according to an embodiment.

FIG. 31 illustrates a zone of operation of a regular carrier device 2300, according to an embodiment. In an embodiment, a "regular" carrier device 182 can declare its availability based on a hours of the day, say 9 am 2360 to 5 pm 2365, and/or a distance of say 30 kms from its current or base location 2320. This regular carrier device 182 can be one without specific trips in plan, but is available to carry packages by offering available time, distance, and mode of travel to the system 100.

In an embodiment, the carrier module 132, computes one or more shipper query legs of shipper devices 181 that can be carried by the carrier devices 182 identified as a regular carrier device within its zone of operation 2310. The zone of operation 2310 can be determined by, but not limited to, time of availability and flexibility in terms of distance. The regular carrier device 182 carries shipper query 3 route leg 1 2330, while also acting as a "carrier hold" 2350 for 1 hour. After dropping off shipper query 3 route leg 1 2330, the regular carrier device 182 carried shipper query 5 route leg 9 2340 by traveling for another pick-up 2363, which could be another carrier device's drop-off point or a transit hub device 183 location. The carrier module 132 periodically computes one or more shipper query legs that can be carried by the regular carrier device 182 within its zone of operation 2310, based on rules. The rules comprise at least one of statistical methods, artificial neural networks, stochastic methods, and artificial intelligence techniques such as machine learning. The billing/payments module 135 computes a payment applicable to the regular carrier device 182 based on its zone of operation 2310.

The inclusion and dynamic routing of packages via "regular" carrier devices 182 enriches the ecosystem of carrier devices 182 of system 100. The flexibility to carry within a zone of operation results in efficient logistics via regular carrier devices 182.

Figure 32:
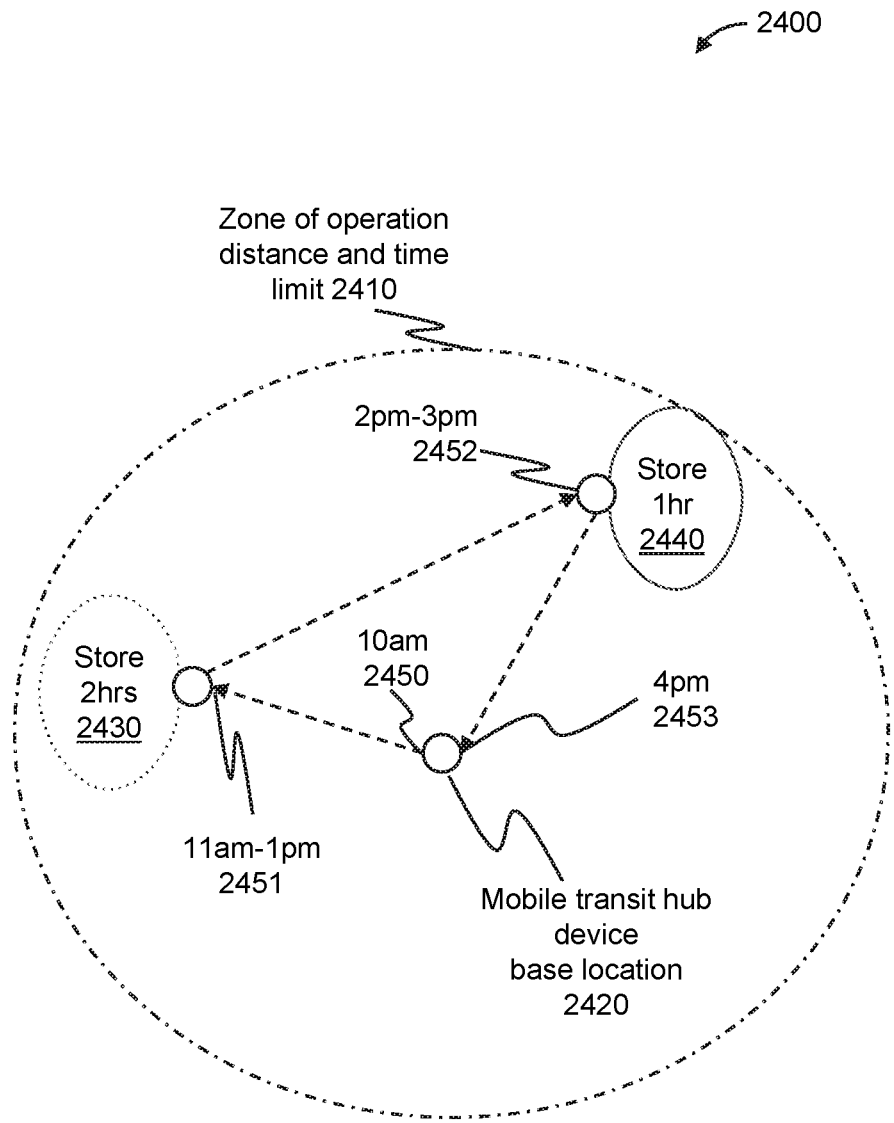
FIG. 32 illustrates a zone of operation of a mobile transit hub device, according to an embodiment.

FIG. 32 illustrates a zone of operation of a mobile transit hub device 2400, according to an embodiment. A transit hub device 183 that is mobile can provide its zone of operation 2410 to the transit hub module 133. The zone of operation 2410 can be determined by, but not limited to, time of availability and flexibility in terms of distance from its base location 2420. The transit hub module 133, based on the zone of operation 2410, will compute the most efficient position for mobile transit hub device 183, to be stationed or parked so that the routing of incoming and outgoing shipper query route legs and carrier trip routes is most efficient. This is advantageous where a high flow of packages can be handled enroute with least amount of diversion for carrier trip routes and shipper query routes.

As shown in FIG. 32, the mobile transit hub device 183 stores packages for 2 hours in one location 2430 and can move with or without those stored packages to another location 2440 for efficiently handling packages from carrier devices 182. The transit hub module 133 periodically computes a best position at a given time for a mobile transit hub device 183 that is mobile within its zone of operation 2410, based on rules. The rules comprise at least one of statistical methods, artificial neural networks, stochastic methods, and artificial intelligence techniques such as machine learning. The billing/payments module 135 computes a payment applicable to a mobile transit hub device 183 based on its zone of operation 2410 and artificial intelligence methods described above.

Figure 33:
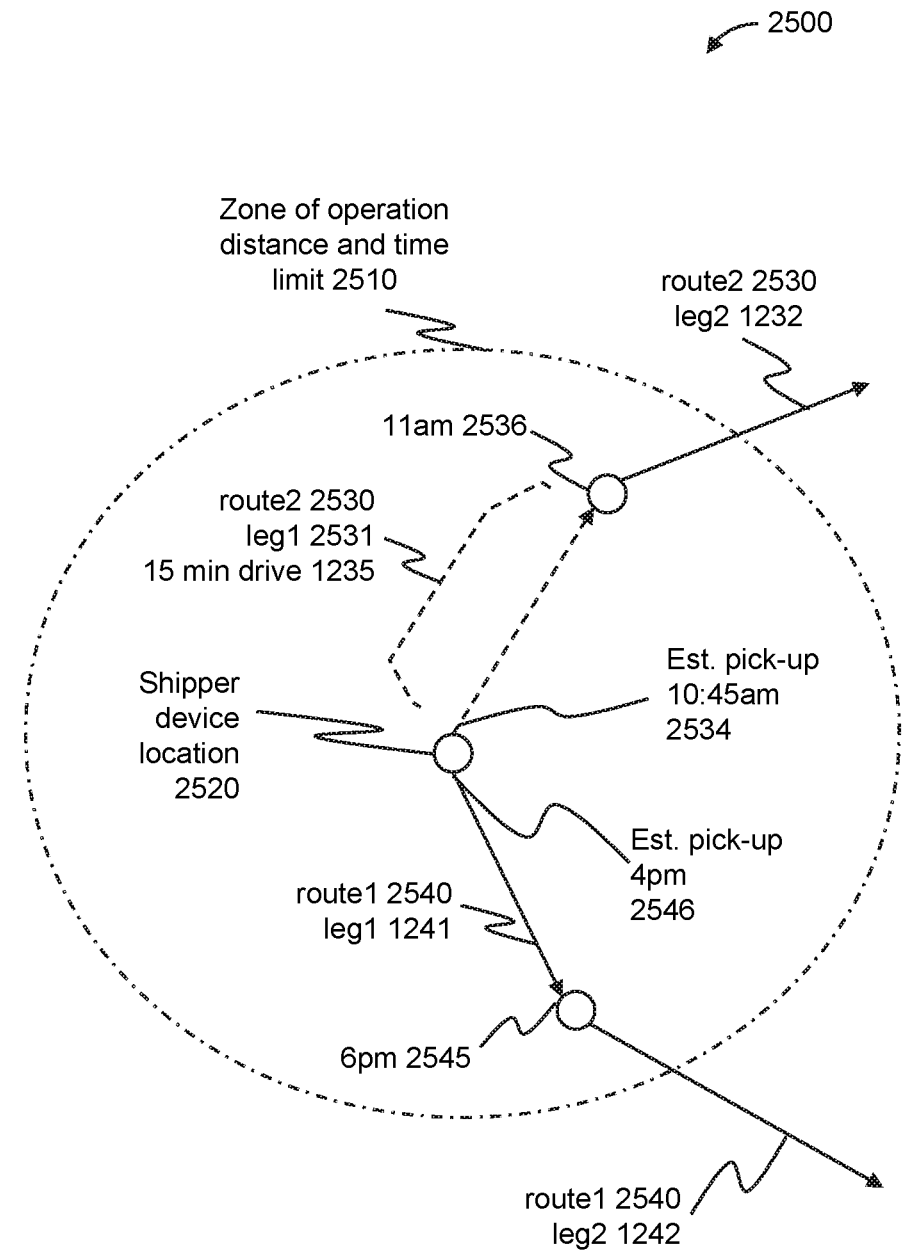
FIG. 33 illustrates a zone of operation of a shipper device, according to an embodiment.

FIG. 33 illustrates a zone of operation of a shipper device 2500, according to an embodiment. A user device 180 can be designated as a shipper device 181 and also a carrier device 182. A shipper device 181 can provide its zone of operation 2510 for drop-off, that can be utilized by system 100, to determine if it would be most efficient for the shipper device 181 to carry the package on its first leg at a position within the zone of operation 2510.

As shown in FIG. 33, the package is estimated to be picked up at 4 pm 2546 via shipper query route 1 2540. Alternatively, shipper query route 2 2530 has an estimated pick-up at 11 am 2536 from a position that is estimated to be say within 15 minutes of the shipper device's 181 location 2520. The carrier module 132, at this point, might not have found an available carrier device 182, to carry the package for shipper query route 2 2530 leg 1 2531. This shipper device 181 can be notified about the two routes, route 1 2540 and route 2 2530, and given an option to select to wait for pick-up via route 1 2540 until 4 pm or carry the package to the pick-up point 2536 of route 2 2530 leg 2 2532.

The carrier module 132 can temporarily designate a shipper device 181 as a carrier device 182 for a first shipper query route leg 2531 of a package during drop-off with a carrier device 182 or transit hub device 183. The billing/payments module 135 computes a concession to a shipper device 181 for carrying a package on a first shipper query route leg of the package. The advantage of an option to a shipper device 181 to take on the temporary designation of a carrier device 182 through the first shipper query route leg 2531 of the package makes the system 100 efficient.

Figure 34:
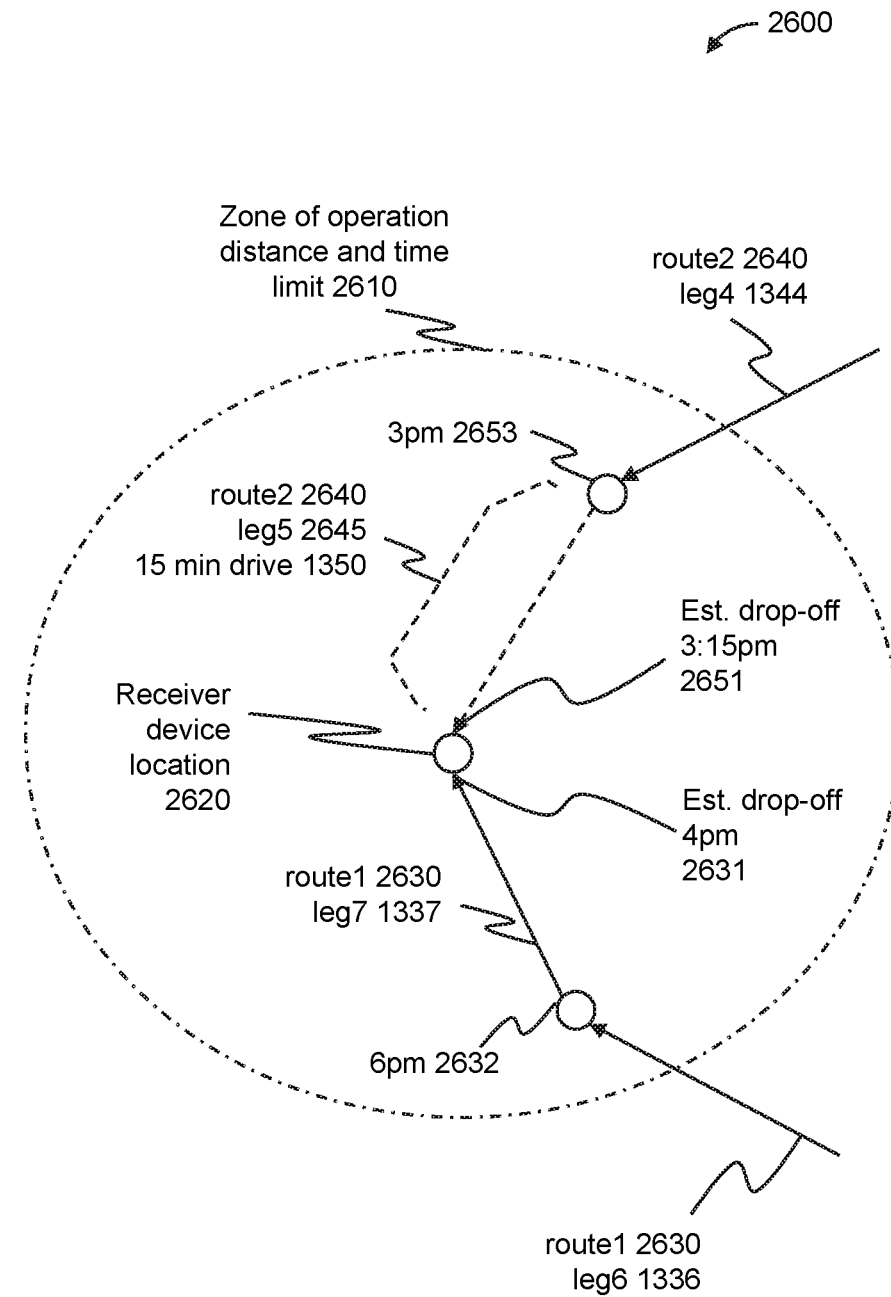
FIG. 34 illustrates a zone of operation of a receiver device, according to an embodiment.

FIG. 34 illustrates a zone of operation of a receiver device 2600, according to an embodiment. The user module 130 allows a user device 180 to be a receiver device 184 of the system 100. The shipping module 131, can allow the shipper device 181 to provide another user device 180 of the system 100, which is the receiver device 184 of the package. The carrier module 132 can accommodate the zone of operation 2610 of the receiver device 184, so as to allow the receiver device 184 to carry the package through its last leg if efficient and/or convenient. The receiver device 184 can pick up the package on its last leg 2645 from a carrier device 182 or a transit hub device 183. This is an advantage for efficient logistics at the destination of the package. The carrier module 132 temporarily designates a receiver device 184 as a carrier device 182 for a last shipper query route leg 2645 of a package during pick-up from a carrier device 182 or transit hub device 183 at 2653. The receiver device 184 may be compensated for carrying the package on its last shipper query route leg. The billing/payments module 135 computes a payment for a receiver device 184 for carrying a package on a last shipper query route leg of the package.

Although the invention has been described with reference to certain specific embodiments, various modifications thereof will be apparent to those skilled in the art without departing from the spirit and scope of the invention as outlined in the claims appended hereto.

What is claimed is:

1. A system for transport logistics service management, the system comprising at least one processing unit and a data storage, the at least one processing unit in communication with the data storage and configured to execute:
   a user module to communicate with a plurality of user devices, the plurality of user devices comprising one or more shipper devices, one or more carrier devices, one or more transit hub devices, and one or more receiver devices;
   a web server module to communicate with the plurality of user devices via a network;
   a shipping module to communicate with the one or more shipper devices, and calculate shipment options;
   a carrier module to communicate with the one or more carrier devices, register trips, and check available packages to carry on the trips;
   a transit hub module to communicate with the one or more transit hub devices, register new transit hub devices, and check available packages that need storage; and
   a package routing module to:
      track packages in real time using tracking technology, the tracking technology comprising at least one of shipping label with barcode, QR code, IOT tracker, RFID tracker, GPS tracker, and smartphone GPS;
      process package data from shipping labels that are scanned by one or more of the plurality of user devices involved at each pick-up and drop-off point in a shipper query route leg, and update package data derived from the shipping labels in a database;

periodically retrieve shipper query route legs that are due for pick-up or drop-off, and send pick-up and drop-off notifications to the plurality of user devices involved in each of the shipper query route legs;

provide the plurality of user devices with real-time package positions, estimated pick-up and drop-off times, locations, and carrier information for package pick-up, drop-off, and handover;

periodically check for deviation of every shipper query route leg from a previous known estimated time of pick-up and arrival, and notify the plurality of user devices associated with a shipper query route leg exhibiting deviation and subsequent shipper query route legs;

periodically re-route one or more delayed shipper query route legs via one or more carrier devices or one or more transit hub devices based on rules, the rules comprising at least one of statistical methods, artificial neural networks, stochastic methods, and machine learning;

update the plurality of user devices requiring updating by at least one of a smartphone app message, a voice call, an email, or a text message;

periodically update and share GPS locations in real time on at least one of the plurality of user devices associated with a pick-up or drop-off for every shipper query route leg;

coordinate pick-up and drop-off for every shipper query route leg for each one or more of the plurality of user devices involved in a pick-up or drop-off;

predict and suggest one or more pick-up times and locations for the one or more shipper devices based on the rules;

predict and suggest a drop-off time and location for the one or more receiver devices based on the rules;

provide flexibility of pick-up in real time at a location of the one or more shipper devices using GPS technology;

provide flexibility of drop-off in real-time at a location of the one or more receiver devices using GPS technology;

dynamically compute a position of a transfer point in real time for at least two carrier devices involved in a carrier-to-carrier direct transfer or multi-way exchange based on real-time GPS tracking and the rules; and a billing/payments module to calculate shipping estimates and calculate payments due to the plurality of user devices.

2. The system of claim 1, wherein the user module is further executable to:

designate which of the plurality of user devices are shipper devices, carrier devices, transit hub devices, and receiver devices; and register new user devices, authenticate the new user devices, register the new user devices that got authenticated, store user device data in the database, and log in registered user devices.

3. The system of claim 1, wherein the shipping module is further executable to:

provide a shipping estimate by:

obtaining package data from a user interface of a smartphone app of the one or more shipper devices; storing the package data in the database;

obtaining one or more shipper query routes and associated shipper query route steps for each of the one or more shipper query routes from one or more network cloud mapping services;

storing the one or more shipper query routes and the associated shipper query route steps in the database; and update the shipper query status by:

periodically checking if all the associated shipper query route steps have an assigned carrier trip of a carrier device;

periodically checking if one or more of the associated shipper query route steps that need storage at an end of one of the associated shipper query route steps have one or more assigned transit hub devices among the one or more transit hub devices;

periodically updating a shipper status of every shipper query based on assigned carrier trips of carrier devices and the one or more assigned transit hub devices for each associated shipper query route step, and storing the shipper status in the database; and periodically, in communication with the carrier module, updating a carrier status of every carrier trip route of carrier devices that carries one or more associated carrier trip route steps of one of a plurality of booked shipper query routes for the shipper query of shipper devices, and storing the carrier status in the database.

4. The system of claim 1, wherein the carrier module is further executable to:

obtain upcoming carrier trip data from the one or more carrier devices, and store the upcoming carrier trip data in a database;

obtain one or more carrier trip routes and associated carrier trip route steps for each carrier trip route of the one or more carrier devices from one or more network cloud mapping services, and store the one or more carrier trip routes and the associated carrier trip route steps in the database;

find carrier trip routes for carrying shipper query route legs by:

periodically checking if any of the associated carrier trip route steps of carrier devices can carry a shipper query route step by applying rules, the rules comprising at least one of statistical methods, artificial neural networks, stochastic methods, and machine learning;

computing a shipper query route leg that consists of one or more consecutive shipper query route steps for a given shipper query route, that can be carried by one or more carrier trip route steps of a carrier device, and storing the shipper query route leg in the database;

periodically computing shipper query route legs that can be carried on carrier trips of carrier devices, and storing the shipper query route legs in the database;

periodically identifying one or more packages from different shipper query routes that can be carried on a carrier trip of a carrier device;

dynamically compute, select, and update a most efficient carrier trip route among all the carrier trip routes of one or more carrier devices that are available, including newly available carrier trip routes of carrier devices, for all available shipper query route steps based on the rules;

compute and coordinate a carrier-to-carrier direct transfer of a package from a first one or more carrier trip routes of carrier devices to a next one or more carrier trip routes of carrier devices without intermediate storage with a transit hub device;

compute and coordinate a multi-way exchange of two or more packages between at least two of the one or more carrier trip routes of carrier devices without intermediate storage with a transit hub device;

compute and communicate a carrier hold time for a shipper query route leg carried on a carrier trip route of a carrier device and availability of the carrier trip route of the carrier device;

compute one or more shipper query legs that can be carried by the one or more carrier devices identified as a regular carrier within a zone of operation associated with the regular carrier;

compute one or more shipper query route legs that can be carried by recurring carrier trips of one or more carrier devices;

temporarily designate one of the one or more shipper devices as a carrier device for a first shipper query route leg of a package during drop-off with a carrier device or transit hub device;

temporarily designate one of the one or more receiver devices as a carrier device for a last shipper query route leg of a package during pick-up from a carrier device or a transit hub device;

provide one or more carrier devices with available shipper query route legs to carry on trips and an estimate for payment based on the rules; and proactively predict and suggest when the one or more carrier devices can be available for a carrier trip based on rules.

5. The system of claim 1, wherein the transit hub module is further executable to:

obtain new transit hub data from the user interface of the smartphone app of the one or more transit hub devices, and store the new transit hub data in the database;

find transit hub devices for storage at the end of shipper query route legs by:

periodically computing whether an end of every shipper query route leg needs storage with a transit hub device at least in part based on a next shipper query route leg;

periodically checking availabilities of the one or more transit hub devices for a shipper query route leg that needs storage, and select a transit hub device among the one or more transit hub devices that are available by applying rules, the rules comprising at least one of statistical methods, artificial neural networks, stochastic methods, and machine learning;

periodically updating a transit hub status for each of the one or more transit hub devices assigned to a shipper query route leg, and storing the transit hub status in the database;

periodically compute a best position at a given time for the one or more transit hub devices identified as a mobile transit hub device within a zone of operation of the mobile transit hub device, based on the rules; and provide the user interface of the smartphone app of the one or more transit hub devices with incoming packages for storage and an estimate for payment based on the rules; and proactively predict and suggest when the one or more transit hub devices can be available for storage based on the rules.

6. The system of claim 1, wherein the billing/payments module is further executable to:

estimate a shipping charge for a shipper query of one or more shipper devices based on package details and rules;

compute a payment for at least one of:

the one or more carrier devices that has recorded successfully carrying one or more packages through one or more shipper query route legs assigned to the one or more carrier devices based on rules, the rules comprising at least one of statistical methods, artificial neural networks, stochastic methods, and machine learning;

the one or more transit hub devices that have successfully stored and transferred one or more packages on an onward journey based on the rules;

the one or more carrier devices based on bulk capacity offered on a carrier trip for carrying shipments;

the one or more transit hub devices based on bulk capacity offered by the one or more transit hub devices for storing shipments;

the one or more carrier devices identified as a regular carrier device based on a zone of operation of the regular carrier device;

the one or more transit hub devices identified as a mobile transit hub device based on a zone of operation of the mobile transit hub device;

the one or more receiver devices for carrying a package on a last shipper query route leg of the package;

compute a concession to the one or more shipper devices for carrying a package on a first shipper query route leg of the package;

dynamically compute shipping estimates for shipper queries of the one or more shipper devices based on supply and demand;

dynamically compute payments of the one or more carrier devices and the one or more transit hub devices based on supply and demand; and communicate with the at least one payment gateway to receive payments from the plurality of user devices from which payment is due, send payments to the plurality of user devices to which payment is due, and store sensitive user information in communication with the at least one payment gateway.

7. The system of claim 1, wherein the at least one payment gateway is further executable to:

handle and store sensitive user information obtained from the one or more user devices; and process bills and payments for the plurality of user devices from and to which payment is due.

8. The system of claim 4, wherein the carrier module is further executable to:

give priority to eliminating need of storage at a transit hub device for the end of every shipper query route leg of a shipper device by:

identifying a next one or more carrier devices in the carrier-to-carrier direct transfer of a package;

identifying a next one or more carrier devices that has a possibility of carrier hold in the carrier-to-carrier direct transfer of a package;

identify at least two carrier devices for the multi-way exchange of two or more packages.

9. The system of claim 4, wherein the shipping module and the carrier module are further executable to:

compute one or more routes, in communication with one or more network cloud mapping services, that are available for a shipper query of a shipper device or a carrier trip of a carrier device from origin to destination;

compute route steps for a shipper query route of a shipper device or a carrier trip route of a carrier device, in communication with the one or more network cloud mapping services, based on route division, the route division comprising at least one of change in travel path, grid of squares on a map, travel distance, travel time, diversions, and rules, the rules comprising at least one of statistical methods, artificial neural networks, stochastic methods, and machine learning; and compute one or more route steps that can be common to the one or more shipper query routes of the one or more shipper devices or one or more carrier trip routes of the one or more carrier devices.

10. The system of claim 1, wherein the shipping module is further executable to:

obtain a selection of one of a plurality of booked shipper query routes from a user interface of a smartphone app of the one or more shipper devices;

determine an original best route from the plurality of booked shipper query routes of one or more shipper devices based on rules, the rules comprising at least one of statistical methods, artificial neural networks, stochastic methods, and machine learning;

periodically compute a better shipper query route for the shipper query of shipper devices, based at least in part on newly available carrier trip routes of carrier devices, newly available transit hubs of transit hub devices, shipper query routes of shipper devices, and the rules;

provide from the one or more shipper devices an estimate and a discount for a recurring shipment query based on the rules;

provide the one or more shipper devices with a selection of shipper query routes and an estimate for payment;

provide flexibility of pick-up in real time at a location of the one or more shipper devices using GPS technology in communication with the package routing module; and proactively predict and suggest one or more pick-up times and locations for the one or more shipper devices, in communication with the package routing module, based on rules.

11. A method for transport logistics service management comprising:

communicating via a user module with a plurality of user devices, the plurality of user devices comprising one or more shipper devices, one or more carrier devices, one or more transit hub devices, and one or more receiver devices;

communicating via a web server module with the plurality of user devices via a network;

communicate via a shipping module with the one or more shipper devices, and calculate shipment options;

communicating via a carrier module with the one or more carrier devices, register trips, and check available packages to carry on the trips;

communicating via a transit hub module with the one or more transit hub devices, register new transit hub devices, and check available packages that need storage; and operating a package routing module to:

track packages in real time using tracking technology, the tracking technology comprising at least one of shipping label with barcode, QR code, IOT tracker, RFID tracker, GPS tracker, and smartphone GPS;

process package data from shipping labels that are scanned by one or more of the plurality of user devices involved at each pick-up and drop-off point in a shipper query route leg, and update package data derived from the shipping labels in a database;

periodically retrieve shipper query route legs that are due for pick-up or drop-off, and send pick-up and drop-off notifications to the plurality of user devices involved in each of the shipper query route legs;

provide the plurality of user devices with real-time package positions, estimated pick-up and drop-off times, locations, and carrier information for package pick-up, drop-off, and handover;

periodically check for deviation of every shipper query route leg from a previous known estimated time of pick-up and arrival, and notify the plurality of user devices associated with a shipper query route leg exhibiting deviation and subsequent shipper query route legs;

periodically re-route one or more delayed shipper query route legs via one or more carrier devices or one or more transit hub devices based on rules, the rules comprising at least one of statistical methods, artificial neural networks, stochastic methods, and machine learning;

update the plurality of user devices requiring updating by at least one of a smartphone app message, a voice call, an email, or a text message;

periodically update and share GPS locations in real time on at least one of the plurality of user devices associated with a pick-up or drop-off for every shipper query route leg;

coordinate pick-up and drop-off for every shipper query route leg for each one or more of the plurality of user devices involved in a pick-up or drop-off;

predict and suggest one or more pick-up times and locations for the one or more shipper devices based on the rules;

predict and suggest a drop-off time and location for the one or more receiver devices based on the rules;

provide flexibility of pick-up in real time at a location of the one or more shipper devices using GPS technology;

provide flexibility of drop-off in real-time at a location of the one or more receiver devices using GPS technology;

dynamically compute a position of a transfer point in real time for at least two carrier devices involved in a carrier-to-carrier direct transfer or multi-way exchange based on real-time GPS tracking and the rules; and calculating via a billing/payments module shipping estimates and calculate payments due to the plurality of user devices.

12. The method of claim 11, further comprising:

designating which of the plurality of user devices are shipper devices, carrier devices, transit hub devices, and receiver devices; and registering new user devices, authenticating the new user devices, registering the new user devices that got authenticated, storing user device data in the database, and logging in registered user devices.

13. The method of claim 11, further comprising:

providing a shipping estimate by:

obtaining package data from a user interface of a smartphone app of the one or more shipper devices;

storing the package data in the database;

obtaining one or more shipper query routes and associated shipper query route steps for each of the one or more shipper query routes from one or more network cloud mapping services;
storing the one or more shipper query routes and the associated shipper query route steps in the database; and
updating the shipper query status by:
periodically checking if all the associated shipper query route steps have an assigned carrier trip of a carrier device;
periodically checking if one or more of the associated shipper query route steps that need storage at an end of one of the associated shipper query route steps have one or more assigned transit hub devices among the one or more transit hub devices;
periodically updating a shipper status of every shipper query based on assigned carrier trips of carrier devices and the one or more assigned transit hub devices for each associated shipper query route step, and storing the shipper status in the database; and
periodically, in communication with the carrier module, updating a carrier status of every carrier trip route of carrier devices that carries one or more associated carrier trip route steps of one of a plurality of booked shipper query routes for the shipper query of shipper devices, and storing the carrier status in the database.

14. The method of claim 11, further comprising:
obtaining upcoming carrier trip data from the one or more carrier devices, and storing the upcoming carrier trip data in a database;
obtaining one or more carrier trip routes and associated carrier trip route steps for each carrier trip route of the one or more carrier devices from one or more network cloud mapping services, and storing the one or more carrier trip routes and the associated carrier trip route steps in the database;
finding carrier trip routes for carrying shipper query route legs by:
periodically checking if any of the associated carrier trip route steps of carrier devices can carry a shipper query route step by applying rules, the rules comprising at least one of statistical methods, artificial neural networks, stochastic methods, and machine learning;
computing a shipper query route leg that consists of one or more consecutive shipper query route steps for a given shipper query route, that can be carried by one or more carrier trip route steps of a carrier device, and storing the shipper query route leg in the database;
periodically computing shipper query route legs that can be carried on carrier trips of carrier devices, and storing the shipper query route legs in the database;
periodically identifying one or more packages from different shipper query routes that can be carried on a carrier trip of a carrier device;
dynamically computing, selecting, and updating a most efficient carrier trip route among all the carrier trip routes of one or more carrier devices that are available, including newly available carrier trip routes of carrier devices, for all available shipper query route steps based on the rules;
computing and coordinating a carrier-to-carrier direct transfer of a package from a first one or more carrier trip routes of carrier devices to a next one or more carrier trip routes of carrier devices without intermediate storage with a transit hub device;
computing and coordinating a multi-way exchange of two or more packages between at least two of the one or more carrier trip routes of carrier devices without intermediate storage with a transit hub device;
computing and communicating a carrier hold time for a shipper query route leg carried on a carrier trip route of a carrier device and availability of the carrier trip route of the carrier device;
computing one or more shipper query legs that can be carried by the one or more carrier devices identified as a regular carrier within a zone of operation associated with the regular carrier;
computing one or more shipper query route legs that can be carried by recurring carrier trips of one or more carrier devices;
temporarily designating one of the one or more shipper devices as a carrier device for a first shipper query route leg of a package during drop-off with a carrier device or transit hub device;
temporarily designating one of the one or more receiver devices as a carrier device for a last shipper query route leg of a package during pick-up from a carrier device or a transit hub device;
providing one or more carrier devices with available shipper query route legs to carry on trips and an estimate for payment based on the rules; and
proactively predicting and suggesting when the one or more carrier devices can be available for a carrier trip based on the rules.

15. The method of claim 11, further comprising:
obtaining new transit hub data from the user interface of the smartphone app of the one or more transit hub devices, and storing the new transit hub data in the database;
finding transit hub devices for storage at the end of shipper query route legs by:
periodically computing whether an end of every shipper query route leg needs storage with a transit hub device at least in part based on a next shipper query route leg;
periodically checking availabilities of the one or more transit hub devices for a shipper query route leg that needs storage, and select a transit hub device among the one or more transit hub devices that are available by applying rules, the rules comprising at least one of statistical methods, artificial neural networks, stochastic methods, and machine learning;
periodically updating a transit hub status for each of the one or more transit hub devices assigned to a shipper query route leg, and storing the transit hub status in the database;
periodically computing a best position at a given time for the one or more transit hub devices identified as a mobile transit hub device within a zone of operation of the mobile transit hub device, based on the rules; and
providing the user interface of the smartphone app of the one or more transit hub devices with incoming packages for storage and an estimate for payment based on the rules; and
proactively predicting and suggesting when the one or more transit hub devices can be available for storage based on the rules.

16. The method of claim 11, further comprising:
estimating a shipping charge for a shipper query of one or more shipper devices based on package details and rules;
computing a payment for at least one of:

the one or more carrier devices that has recorded successfully carrying one or more packages through one or more shipper query route legs assigned to the one or more carrier devices based on rules, the rules comprising at least one of statistical methods, artificial neural networks, stochastic methods, and machine learning;

the one or more transit hub devices that have successfully stored and transferred one or more packages on an onward journey based on the rules;

the one or more carrier devices based on bulk capacity offered on a carrier trip for carrying shipments;

the one or more transit hub devices based on bulk capacity offered by the one or more transit hub devices for storing shipments;

the one or more carrier devices identified as a regular carrier device based on a zone of operation of the regular carrier device;

the one or more transit hub devices identified as a mobile transit hub device based on a zone of operation of the mobile transit hub device;

the one or more receiver devices for carrying a package on a last shipper query route leg of the package;

computing a concession to the one or more shipper devices for carrying a package on a first shipper query route leg of the package;

dynamically computing shipping estimates for shipper queries of the one or more shipper devices based on supply and demand;

dynamically computing payments of the one or more carrier devices and the one or more transit hub devices based on supply and demand; and communicating with the at least one payment gateway to receive payments from the plurality of user devices from which payment is due, sending payments to the plurality of user devices to which payment is due, and storing sensitive user information in communication with the at least one payment gateway.

17. The method of claim 11, further comprising:
handling and storing sensitive user information obtained from the one or more user devices; and
processing bills and payments for the plurality of user devices from and to which payment is due.

18. The method of claim 14, further comprising:
giving priority to eliminating need of storage at a transit hub device for the end of every shipper query route leg of a shipper device by:
  identifying a next one or more carrier devices in the carrier-to-carrier direct transfer of a package;
  identifying a next one or more carrier devices that has a possibility of carrier hold in the carrier-to-carrier direct transfer of a package;
  identifying at least two carrier devices for the multi-way exchange of two or more packages.

19. The method of claim 14, further comprising:
computing one or more routes, in communication with one or more network cloud mapping services, that are available for a shipper query of a shipper device or a carrier trip of a carrier device from origin to destination;

computing route steps for a shipper query route of a shipper device or a carrier trip route of a carrier device, in communication with the one or more network cloud mapping services, based on route division, the route division comprising at least one of change in travel path, grid of squares on a map, travel distance, travel time, diversions, and rules, the rules comprising at least one of statistical methods, artificial neural networks, stochastic methods, and machine learning; and computing one or more route steps that can be common to the one or more shipper query routes of the one or more shipper devices or one or more carrier trip routes of the one or more carrier devices.

20. The method of claim 11, further comprising:
obtaining a selection of one of a plurality of booked shipper query routes from a user interface of a smartphone app of the one or more shipper devices;

determining an original best route from the plurality of booked shipper query routes of one or more shipper devices based on rules, the rules comprising at least one of statistical methods, artificial neural networks, stochastic methods, and machine learning;

periodically computing a better shipper query route for the shipper query of shipper devices, based at least in part on newly available carrier trip routes of carrier devices, newly available transit hubs of transit hub devices, shipper query routes of shipper devices, and the rules;

providing from the one or more shipper devices an estimate and a discount for a recurring shipment query based on the rules;

providing the one or more shipper devices with a selection of shipper query routes and an estimate for payment;

providing flexibility of pick-up in real time at a location of the one or more shipper devices using GPS technology in communication with the package routing module; and proactively predicting and suggesting one or more pick-up times and locations for the one or more shipper devices, in communication with the package routing module, based on rules.

* * * * *